(12) United States Patent
Matsuura et al.

(10) Patent No.: US 11,520,019 B2
(45) Date of Patent: Dec. 6, 2022

(54) LIGHT SIGNAL DETECTION DEVICE, RANGE FINDING DEVICE, AND DETECTION METHOD

(71) Applicants: Kazuma Matsuura, Kanagawa (JP); Yuuta Yoshino, Kanagawa (JP); Takefumi Takizawa, Kanagawa (JP); Soichiro Yokota, Kanagawa (JP); Jun Kishiwada, Kanagawa (JP); Hiroyoshi Sekiguchi, Kanagawa (JP); Tadashi Nakamura, Kanagawa (JP)

(72) Inventors: Kazuma Matsuura, Kanagawa (JP); Yuuta Yoshino, Kanagawa (JP); Takefumi Takizawa, Kanagawa (JP); Soichiro Yokota, Kanagawa (JP); Jun Kishiwada, Kanagawa (JP); Hiroyoshi Sekiguchi, Kanagawa (JP); Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 412 days.

(21) Appl. No.: 16/818,154

(22) Filed: Mar. 13, 2020

(65) Prior Publication Data
US 2020/0300984 A1 Sep. 24, 2020

(30) Foreign Application Priority Data
Mar. 19, 2019 (JP) .............. JP2019-052007

(51) Int. Cl.
*G01S 7/4861* (2020.01)
*G01S 7/481* (2006.01)
*G01S 7/4865* (2020.01)

(52) U.S. Cl.
CPC .......... *G01S 7/4861* (2013.01); *G01S 7/4817* (2013.01); *G01S 7/4865* (2013.01)

(58) Field of Classification Search
CPC .... G01S 7/4861; G01S 7/4817; G01S 7/4865; G01S 17/931; G01S 7/487; G01S 17/86
See application file for complete search history.

(56) References Cited

U.S. PATENT DOCUMENTS 6,717,129 B1 * 4/2004 Mizuhara ............. H03K 17/941
250/214 R
2013/0010106 A1 1/2013 Yokota
(Continued)

FOREIGN PATENT DOCUMENTS

| EP | 3147690 | 3/2017 |
|---|---|---|
| JP | 7-320199 | 12/1995 |
| JP | 2018-021776 | 2/2018 |

OTHER PUBLICATIONS

Extended European Search Report for 20162414.5 dated Aug. 5, 2020.

*Primary Examiner* — Thanh Luu
*Assistant Examiner* — Monica T Taba
(74) *Attorney, Agent, or Firm* — IPUSA, PLLC

(57) ABSTRACT

A light signal detection device includes a light receiving optical system configured to receive a reflection signal reflected from an object when irradiation light emitted from an irradiation unit hits the object and reflects from the object; and circuitry configured to binarize the received reflection signal using a first threshold value, based on a determination of whether the reflection signal is equal to or greater than the first threshold value; binarize the received reflection signal using a second threshold value set with a given value similar to a noise signal value, based on a determination of whether the reflection signal is equal to or greater than the second threshold value; and measure a time difference between a time of emitting the irradiation light from the irradiation unit (Continued)

and a time of receiving a reflection signal equal to or greater than the first threshold value or the second threshold value.

11 Claims, 38 Drawing Sheets

(56) References Cited

U.S. PATENT DOCUMENTS

| | | |
|---|---|---|
| 2014/0009747 A1 | 1/2014 | Suzuki et al. |
| 2014/0036071 A1 | 2/2014 | Nakamura et al. |
| 2015/0268343 A1* | 9/2015 | Uehira .................... G01S 17/10 |
| | | 356/5.01 |
| 2015/0332103 A1 | 11/2015 | Yokota et al. |
| 2016/0349371 A1 | 12/2016 | Suzuki et al. |
| 2017/0123063 A1 | 5/2017 | Yamashita et al. |
| 2017/0273161 A1* | 9/2017 | Nakamura ........... G02B 26/105 |
| 2018/0120108 A1 | 5/2018 | Takahashi et al. |
| 2018/0165834 A1 | 6/2018 | Sekiguchi et al. |
| 2018/0268229 A1 | 9/2018 | Nakata et al. |
| 2018/0357783 A1 | 12/2018 | Takahashi et al. |
| 2019/0228537 A1 | 7/2019 | Sekiguchi et al. |
| 2019/0391244 A1 | 12/2019 | Sekiguchi et al. |

* cited by examiner

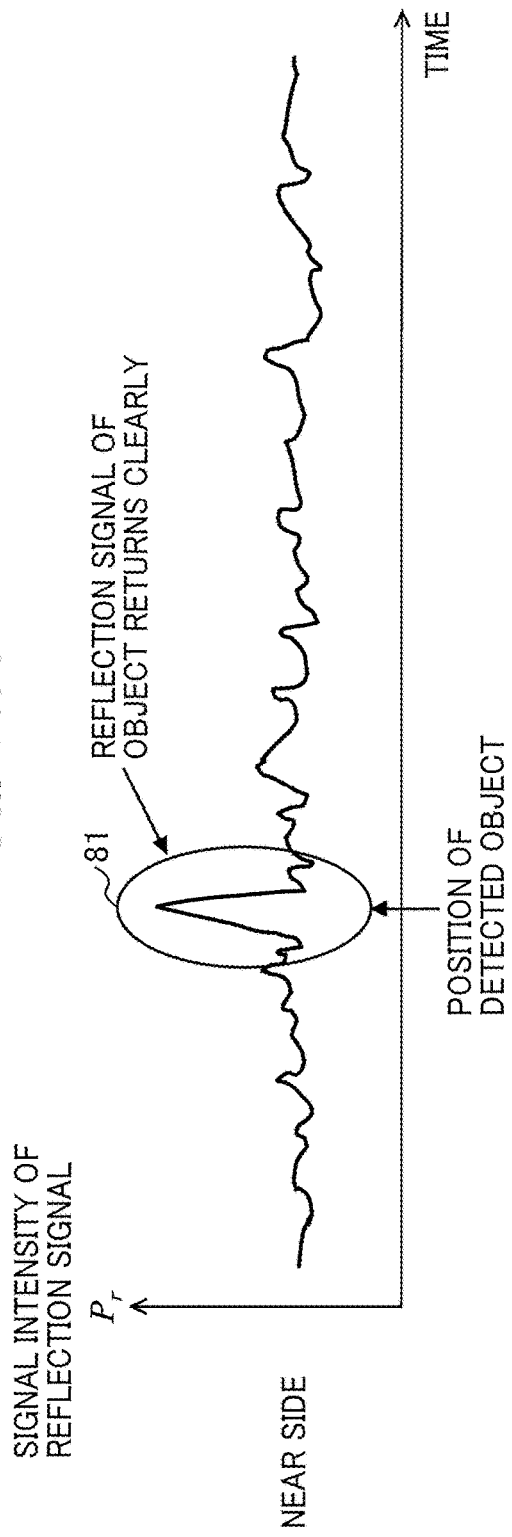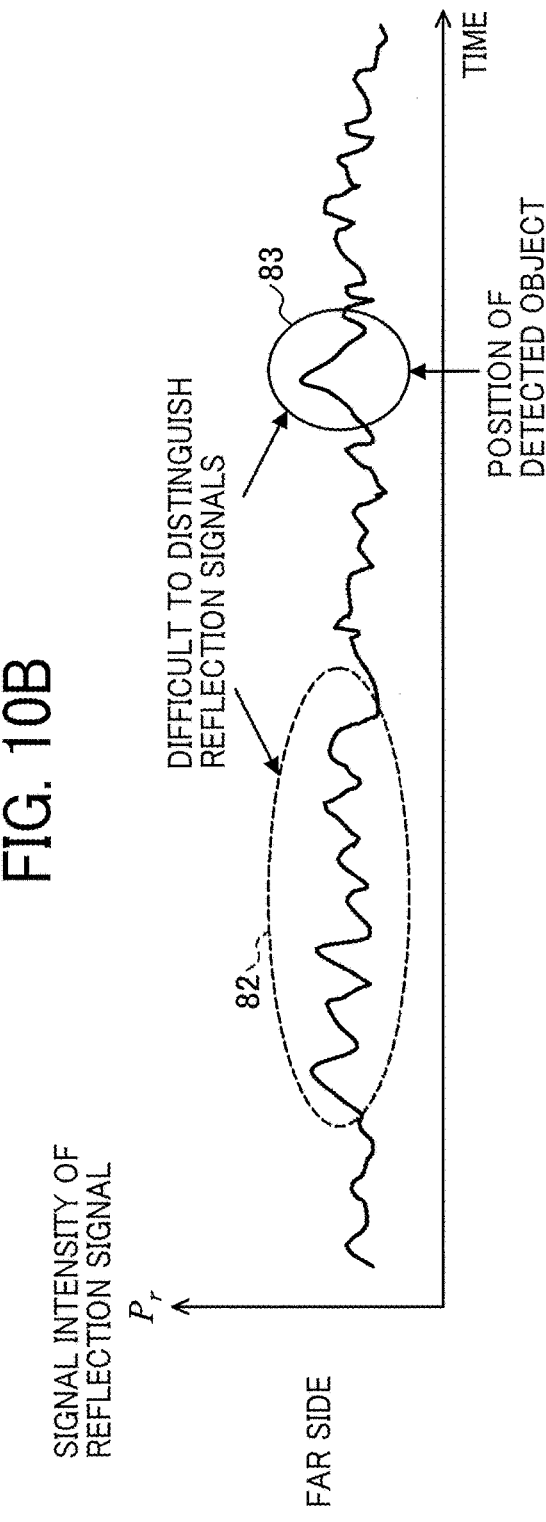

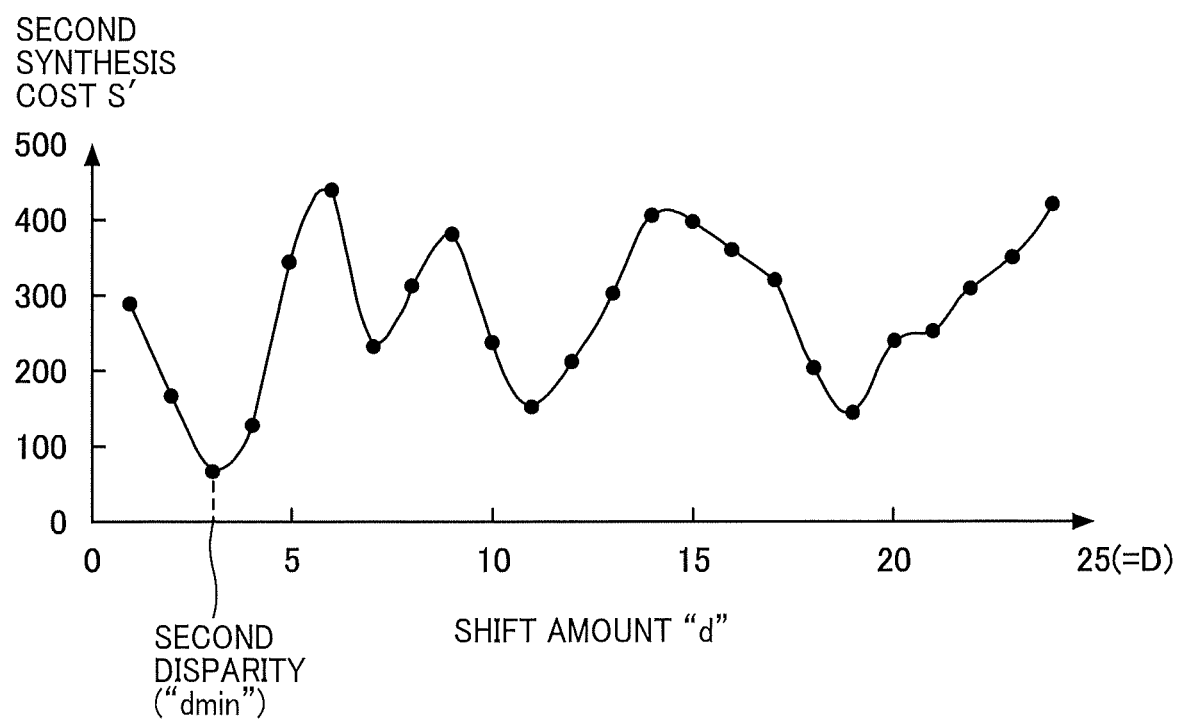

FIG. 22A
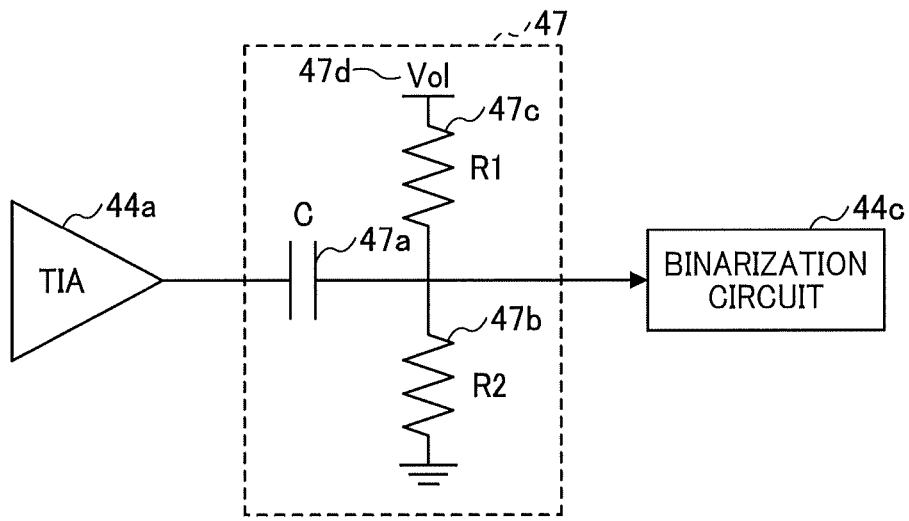
FIG. 22B
REFLECTION SIGNAL
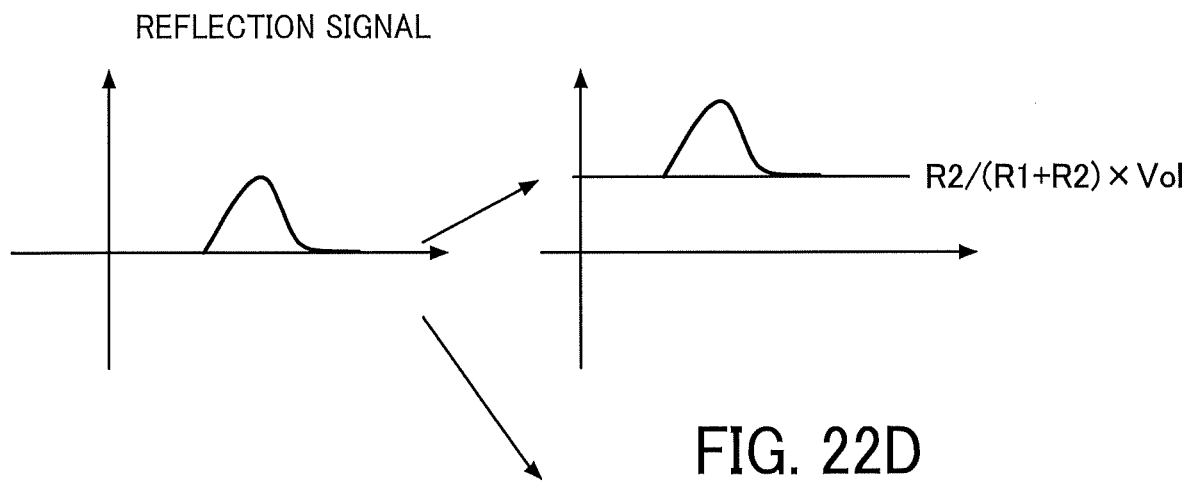
WHEN BANDWIDTH OF HIGH-PASS
FILTER AND BANDWIDTH OF INPUT
SIGNAL ARE CLOSE TO EACH OTHER
FIG. 22C
FIG. 22D
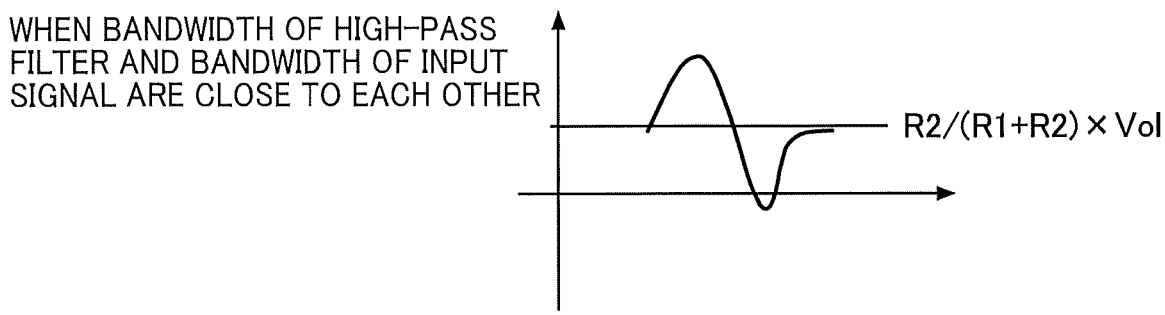

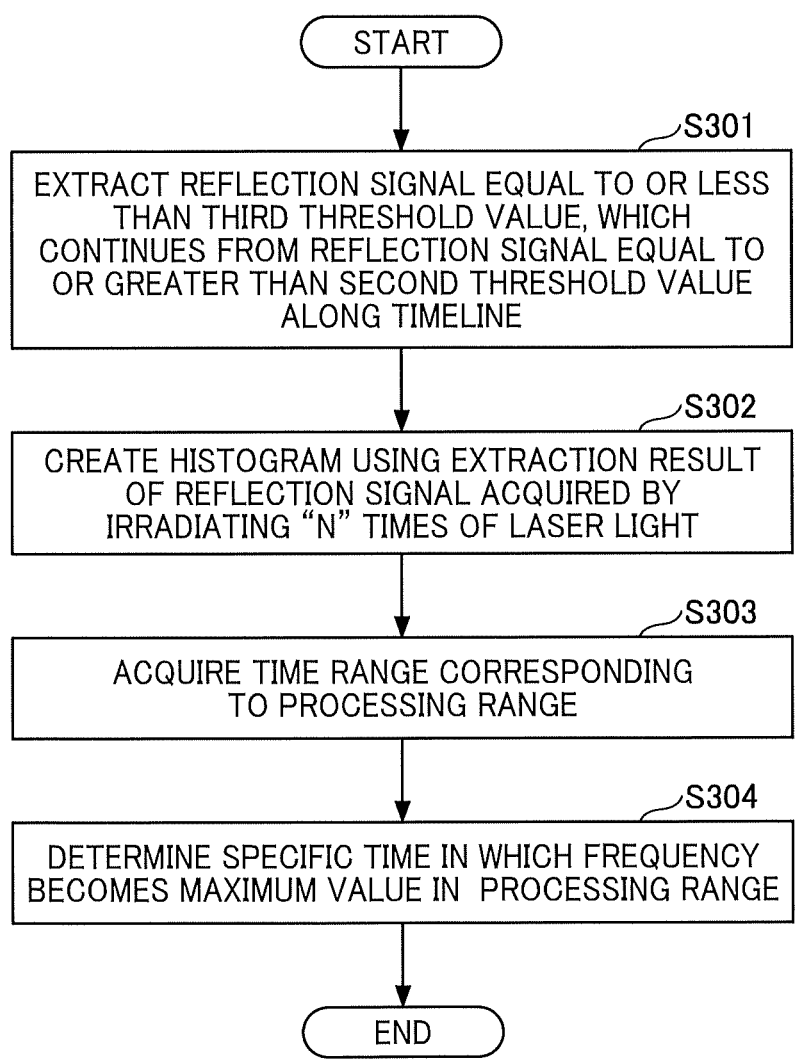

LIGHT SIGNAL DETECTION DEVICE, RANGE FINDING DEVICE, AND DETECTION METHOD

CROSS-REFERENCE TO RELATED APPLICATION

This application claims priority pursuant to 35 U.S.C. § 119(a) to Japanese Patent Application No. 2019-052007, filed on Mar. 19, 2019 in the Japan Patent Office, the disclosure of which is incorporated by reference herein in its entirety.

BACKGROUND

Technical Field

This disclosure relates to a light signal detection device, a range finding device, and a detection method.

Background Art

Stereo cameras capture two image data for one scene, and calculate disparity of each pixel of the two image data using a disparity computation algorithm. The disparity calculation algorithm is a method of voting the cost to the search disparity space, in which the disparity value that causes the minimum cost value is obtained as an integer disparity value "d," the sub-pixel disparity value is estimated from the integer disparity value "d," and the integer disparity value "d" and the sub-pixel disparity value are obtained as the disparity estimation value D. Then, the distance corresponding to each pixel is calculated using a formula of "Z=BF/D" that defines a relation of disparity estimation value "D" and distance "Z," in which "B" represents the baseline length, and "F" represents the focal length.

However, when the cost in the disparity space is calculated using the voting method, it is difficult to obtain a good enough distance resolution at a far distant region where the integer disparity value "d" becomes smaller (or distance "Z" becomes longer), and further, fluctuation or variance of the disparity calculation result greatly affects fluctuation or variance of the measured distance.

Further, the stereo cameras have been applied to various industries, such as automobile industry. In the automobile industry, an improvement of the range finding performance at the far distant region is being further demanded as the development of autonomous driving operation has been researched and developed, and reducing the cost and size of the stereo camera and an improvement of the environmental robustness performance are demanded.

To compensate the issue of stereo cameras, there is an attempt of using the light detection and ranging or laser imaging detection and ranging (LIDAR) having lower spatial resolution and higher distance resolution. The LiDAR is a measurement method that calculates a distance to an object based on the time difference between a time of emitting the laser light to the object and a time receiving the reflection light returned from the object. In one method, an object can be identified using the reflection signals that are received continuously, in which a method of detecting the peak of reflection signals is proposed. The measurement result of the stereo camera having higher spatial resolution and lower distance resolution can be integrated or fused with the measurement result of the LiDAR having lower spatial resolution and higher distance resolution to utilize the advantages of the two methods.

In the LiDAR, a technology for improving the distance accuracy is known. This technology discloses a method of increasing the range finding accuracy of LiDAR by intentionally generating an undershoot to the reflection signals of the laser light reflected from the object and making the falling portion of the reflection signals of object steep.

However, conventional technologies may not detect weak reflection signals. For example, if the reflection signals reflected from a distant object may exist with the surrounding noise signals, such as the external light, it is difficult to distinguish the reflection signals from the noise signals, so that the range finding or detection accuracy of the distant object may be reduced.

SUMMARY

In one aspect of the present invention, a light signal detection device is devised. The light signal detection device includes a light receiving optical system configured to receive a reflection signal reflected from an object when irradiation light emitted from an irradiation unit hits the object and reflects from the object; and circuitry configured to binarize the reflection signal received by the light receiving optical system using a first threshold value, based on a determination of whether the reflection signal is equal to or greater than the first threshold value; binarize the reflection signal received by the light receiving optical system using a second threshold value set with a given value similar to a noise signal value, based on a determination of whether the reflection signal is equal to or greater than the second threshold value; and measure a time difference between a time of emitting the irradiation light from the irradiation unit and a time of receiving a reflection signal equal to or greater than the first threshold value or the second threshold value.

In another aspect of the present invention, a method is devised. The method includes receiving, using a light receiving optical system, a reflection signal reflected from an object when irradiation light emitted from an irradiation unit hits the object and reflects from the object; binarizing the reflection signal received by the light receiving optical system using a first threshold value, based on a determination of whether the reflection signal is equal to or greater than the first threshold value; binarizing the reflection signal received by the light receiving optical system using a second threshold value set with a given value similar to a noise signal value, based on a determination of whether the reflection signal is equal to or greater than the second threshold value; and measuring a time difference between a time of emitting the irradiation light from the irradiation unit and a time of receiving a reflection signal equal to or greater than the first threshold value or the second threshold value.

In another aspect of the present invention, A non-transitory computer readable storage medium storing one or more instructions that, when performed by one or more processors, cause the one or more processors to execute a method is devised. The method includes receiving, using a light receiving optical system, a reflection signal reflected from an object when irradiation light emitted from an irradiation unit hits the object and reflects from the object; binarizing the reflection signal received by the light receiving optical system using a first threshold value, based on a determination of whether the reflection signal is equal to or greater than the first threshold value; binarizing the reflection signal received by the light receiving optical system using a second threshold value set with a given value similar to a noise signal value, based on a determination of whether the reflection signal is equal to or greater than the second threshold value; and measuring a time difference between a time of emitting the irradiation light from the irradiation unit and a time of receiving a reflection signal equal to or greater than the first threshold value or the second threshold value.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIGS. 10A and 10B illustrate an example of a difference in intensity of signal received from a nearby side and far side according to an embodiment;

FIG. 18 illustrates a calculation result of a second synthesis cost S' in the reference pixel region "p" according to an embodiment;

FIGS. 22A, 22B, 22C and 22D illustrate another configuration of an undershoot addition circuit, and an output signal according to an embodiment;

FIG. 33 is an example of a flowchart illustrating a procedure of processing the PD output detection unit in the configuration of FIG. 31 according to an embodiment;

Figure 1:
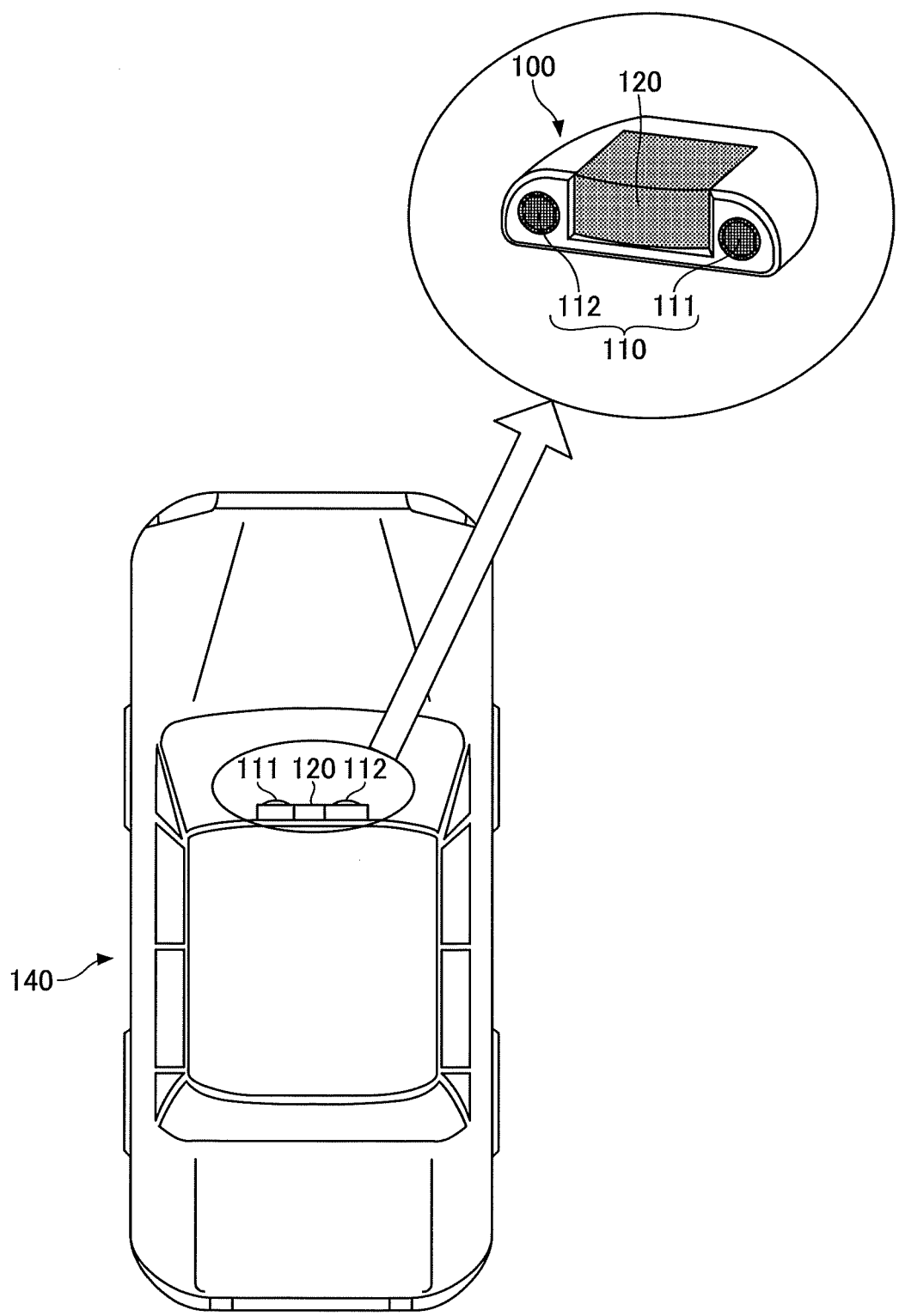
FIG. 1 is an example of an external appearance and mounting of a range finding device according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

A description is now given of exemplary embodiments of the present disclosures. It should be noted that although such terms as first, second, etc., may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present disclosures.

In addition, it should be noted that the terminology used herein is for the purpose of describing particular embodiments only and is not intended to be limiting of the present disclosures. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a range finding device and a time measurement method performed by the range finding device of an embodiment with reference to the drawings.

Terms

The undershoot can be set to detection signals of a detection target as follows when a profile of detection signals of the detection target is obtained. When the profile of detection signals of the detection target is obtained, the profile has many signals having different values along the timeline, such as a curved profile having one or more peak values along the timeline, in which a pulse may rises as a peak value and then falls to a given value, such as base value (e.g. zero). If such curved profile is obtained, a given signal is applied to the curved profile to set a "undershoot portion" where the signal value becomes less than the base value (e.g. zero), and the signal value returns to the base value after the undershoot portion (see FIG. 21B). For example, if the base value of the curved profile is zero (0), a value at the undershoot portion becomes a negative value, but if the base value of the curved profile is adjusted, a value at the undershoot portion may not become a negative value. The undershoot processing is also referred to as the inversion processing.

The base voltage is a reference voltage, such as zero (0). The base voltage can become a positive voltage or a negative voltage by applying a positive voltage or negative voltage to reflection signals.

The range finding device includes a laser radar ranging unit and a stereo camera unit, which will be described later, and thereby the range finding device may also be referred to as a range finding system. The range finding device may also be referred to as a distance finding apparatus, a range finder or the like.

(External Appearance and Mounting of Range Finding Device)

Hereinafter, a description is given of an example of an external appearance and mounting of a range finding device 100 with reference to FIG. 1. FIG. 1 is an example of an external appearance and mounting of the range finding device 100.

As illustrated in FIG. 1, the range finding device 100 includes, for example, a stereo camera unit 110 and a laser radar ranging unit 120. The stereo camera unit 110 includes, for example, a right camera 112 (first imaging device) and a left camera 111 (second imaging device), and the laser radar ranging unit 120 is disposed between the right camera 112 and the left camera 111. By integrating (fusing) measurement results of the laser radar ranging unit 120 and measurement results of the stereo camera unit 110, three dimensional information of a surrounding environment can be obtained with higher precision.

The right camera 112 and the left camera 111 perform the image capturing operation by synchronizing the image capturing operation timing with each other at a given frame cycle to generate image data.

The laser radar ranging unit 120 measures a distance to an irradiation position (an object existing in an irradiation direction) using the time-of-flight (TOF) method by irradiating the laser light and receiving the reflection light from the object.

For example, the range finding device 100 is mounted on the center part of a front window of a vehicle 140 (movable apparatus) at the ceiling. In this case, both the stereo camera unit 110 and the laser radar ranging unit 120 are mounted toward the forward direction of the vehicle 140. In other words, when the range finding device 100 is mounted on the vehicle 140, the optical axis of the stereo camera unit 110 and the center of the laser light irradiation direction of the laser radar ranging unit 120 are set in the same direction.

The mounting position of FIG. 1 is just one example. The range finding device 100 can be mounted on a dashboard, a roof, a bumper or the like of the vehicle 140. Further, the mounting position of FIG. 1 is for acquiring three dimensional information in front of the vehicle 140. The range finding device 100 can be mounted at other positions to acquire three dimensional information of a right side, a left side or a rear side of the vehicle 140.

(Hardware Configuration of Range Finding Device)

Figure 2:
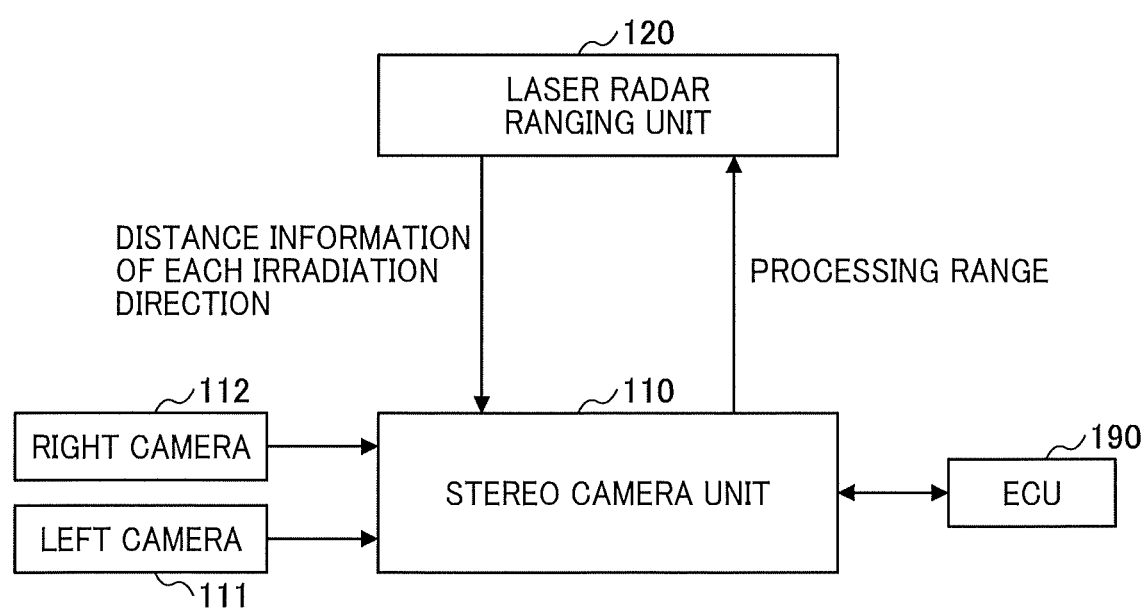
FIG. 2 illustrates an example of an overall configuration of a range finding device according to an embodiment.

Hereinafter, a description is given of overall configuration of the range finding device 100 with reference to FIG. 2. FIG. 2 illustrates an example of an overall configuration of the range finding device 100.

The range finding device 100 is configured so that the laser radar ranging unit 120 and the stereo camera unit 110 can transmit and receive necessary information with each other. In addition to the right camera and the left camera, the stereo camera unit 110 includes a stereo image processing unit 250 (see FIG. 3) that outputs a distance image by processing a reference image and a comparative image.

To be described later, the laser radar ranging unit 120 obtains a processing range from the stereo camera unit 110 to narrow a processing range for capturing signals coming from an object, and outputs distance information in each irradiation direction acquired by narrowing the processing range, to the stereo camera unit 110. The stereo camera unit 110 generates a detailed distance image using the distance information of each irradiation direction, and outputs the distance image to an electronic control unit (ECU) 190. By fusing measurement results of the laser radar ranging unit 120 and the stereo camera unit 110, three dimensional information can be acquired with higher precision.

In an example case of FIG. 2, a distance image and a reference image are transmitted to the ECU 190. The ECU 190 is an electronic control unit of the vehicle 140. The range finding device 100 mounted on the vehicle 140 is referred to as a vehicle-mounted device. The ECU 190 performs various driving assistance operation based on the distance image and the reference image output by the range finding device 100. As to the reference image, various pattern matching is performed to recognize the state of preceding vehicles, pedestrians, white lines, traffic signals or the like.

The drive assistance operation varies depending on the movable apparatus. For example, the warning and braking are performed in accordance with the time-to-collision (TTC) calculated from the distance and the relative speed when a side position of a target object overlaps with the width of the movable apparatus. Further, if it is difficult to stop the movable apparatus (e.g., vehicle) to evade the collision, the ECU 190 controls the steering in a direction that can evade the collision.

Further, the ECU 190 controls vehicle-to-vehicle distance to drive the vehicle by following the preceding vehicle by keeping the vehicle-to-vehicle distance based on the vehicle speed. For example, when the preceding vehicle stops, the ECU 190 stops the movable apparatus, and when the preceding car starts to move, the ECU 190 starts to move the movable apparatus. Further, if the ECU 190 performs a white line recognition, the ECU 190 can perform a lane keeping control to make the movable apparatus running on the center of the lane, and when the movable apparatus is to deviate from the running lane, the ECU 190 performs a deviation prevention control to change the traveling direction to the center of the running lane.

Further, if an obstacle exists in the traveling direction when the movable apparatus is being stopped, the ECU 190 can prevent the sudden start of the movable apparatus. For example, if the obstacle exists in the traveling direction of the movable apparatus determined by an operation position of a shift lever and an operation amount of accelerator pedal is greater, the ECU 190 restricts the engine output and outputs the warning to reduce or prevent damages.

Figure 3:
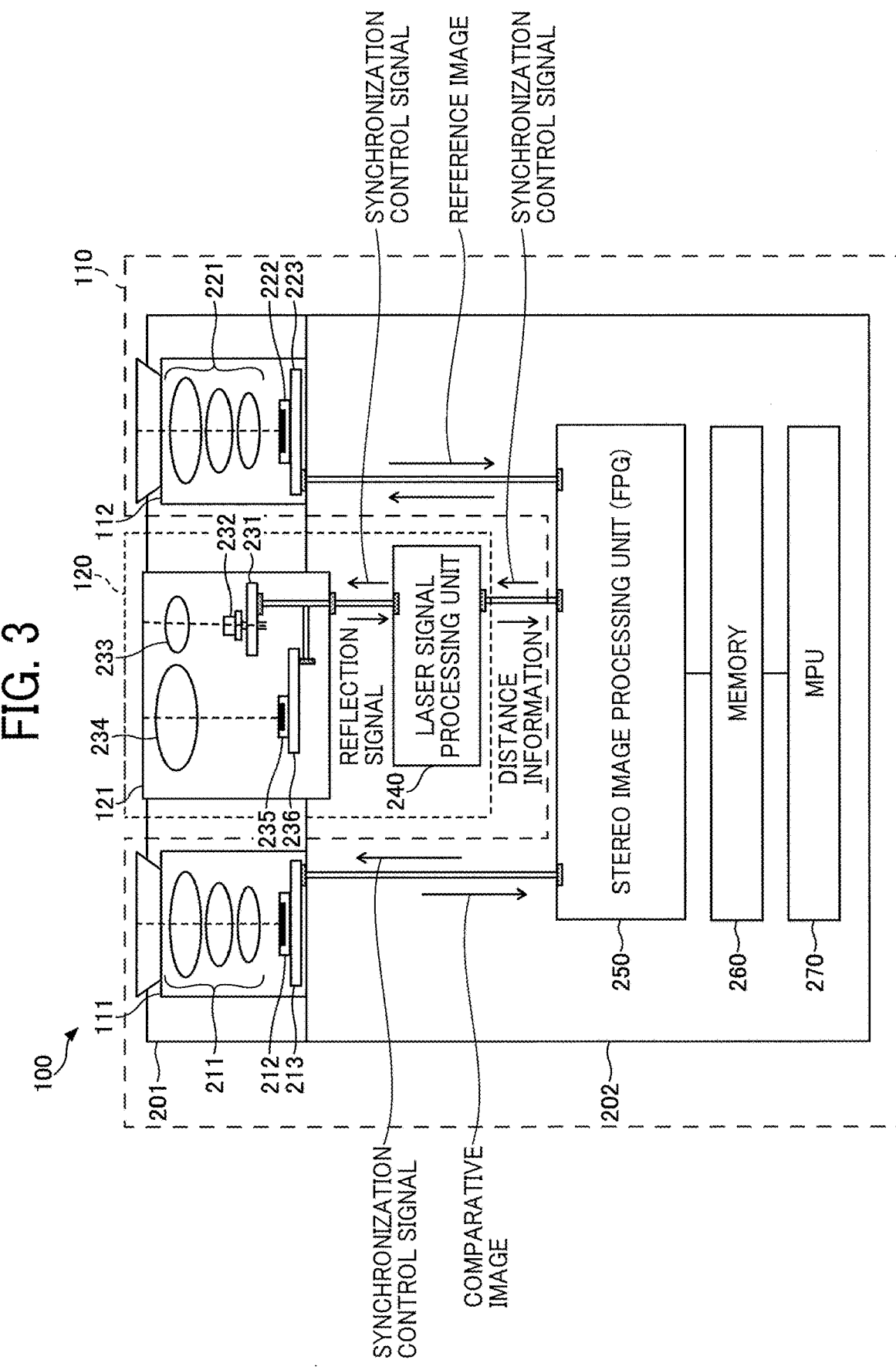
FIG. 3 illustrates an example of a hardware block diagram of a range finding device according to an embodiment.

FIG. 3 illustrates an example of a hardware block diagram of the range finding device 100. The range finding device 100 includes, for example, a sensor stay 201 and a control board housing 202. The left camera 111, the right camera 112, and an optical processing unit 121 are attached to the sensor stay 201. By disposing the optical processing unit 121 on a straight line between the left camera 111 and the right camera 112, the size and cost reduction of the range finding device 100 can be achieved. The distance between the left camera 111 and the right camera 112 is referred to as the baseline length. The longer the baseline length, the greater the disparity. To reduce the size of the range finding device 100, the baseline length is required to be set shorter without deteriorating the detection precision.

The control board housing 202 accommodates, for example, a laser signal processing unit 240, a stereo image processing unit 250, a memory 260, and a micro processing unit (MPU) 270. By providing the laser signal processing unit 240 and the optical processing unit 121 as separate units, the degree of freedom of design of the range finding device 100 can be increased, and thereby the size of the range finding device 100 can be reduced.

Thus, in the embodiment, the laser radar ranging unit 120 having the optical processing unit 121 and the laser signal processing unit 240 is disposed between the left camera 111 and the right camera 112.

In an example case of FIG. 3, the laser signal processing unit 240 and the stereo image processing unit 250 are configured as different circuit boards, but the laser signal processing unit 240 and the stereo image processing unit 250 can be configured on a common circuit board. By reducing the number of circuit boards, the cost of circuit boards can be reduced.

Hereinafter, a description is given of each unit disposed on the sensor stay 201 with reference to FIG. 3. As illustrated in FIG. 3, the left camera 111 includes, for example, a camera lens 211, an imaging element 212, and a sensor substrate 213. The external light incident through the camera lens 211 is received by the imaging element 212 and is photoelectrically converted into signals with a given frame cycle. The signals acquired by photoelectric conversion are processed by the sensor substrate 213 to generate captured image data for each frame. The generated captured image data are sequentially transmitted to the stereo image processing unit 250 as the comparative image.

Further, the right camera 112 has the same configuration as the left camera 111, and image data are captured using the right camera 112 synchronously with the image data captured using the left camera 111 based on the synchronization control signals. The image data captured using the right camera 112 are sequentially transmitted to the stereo image processing unit 250 as the reference image.

As illustrated in FIG. 3, the optical processing unit 121 includes, for example, a light source drive circuit 231, a laser light source 232, and an irradiation lens 233. The light source drive circuit 231 operates based on the synchronization control signals received from the laser signal processing unit 240, and applies a modulated current (light emission signal of light source) to the laser light source 232. Then, the laser light source 232 emits a laser light. The laser light emitted by the laser light source 232 is irradiated to the outside via the irradiation lens 233.

In the embodiment, an infrared semiconductor laser diode (LD) may be used as the laser light source 232, and it can be assumed that the laser light source 232 emits an infrared light having a wavelength range of 800 nm to 950 nm as the laser light. Further, it can be assumed that the laser light source 232 emits a laser light having a pulse waveform periodically in accordance with a modulation current (light emission signal of light source) applied by the light source drive circuit 231. Further, it can be assumed that the laser light source 232 emits a pulse laser light having a short pulse width of several nanoseconds to several hundred nanoseconds periodically. However, the wavelength and the pulse width of the laser light are not limited thereto.

The pulse laser light emitted from the laser light source 232 is irradiated to the outside as an irradiation beam through the irradiation lens 233 and then irradiated onto an object existing in the irradiation direction of the laser light. Since the laser light emitted from the laser light source 232 is collimated by the irradiation lens 233 to substantially parallel light, the irradiation range on the irradiated object can be limited to a pre-set smaller area.

The optical processing unit 121 further includes, for example, a light receiving lens 234, a light receiving element 235 (an example of a light receiving unit), and a received light signal amplification circuit 236. The laser light irradiated to the object existing in the irradiation direction is scattered omnidirectionally and uniformly. Then, only the optical component reflected along the optical path that follows the same optical path as the laser light emitted from the optical processing unit 121 is guided to the light receiving element 235 via the light receiving lens 234 as the reflection light.

In the embodiment, a silicon PIN photodiode and an avalanche photodiode can be used as the light receiving element 235. The light receiving element 235 generates reflection signals (hereinafter, reflection signal) by performing the photoelectric conversion of the reflection light. Then, the received light signal amplification circuit 236 amplifies the generated reflection signal and transmits the reflection signal to the laser signal processing unit 240.

Hereinafter, a description is given of each unit of the control board housing 202 with reference to FIG. 3. The laser signal processing unit 240 calculates a distance to the object existing in the irradiation direction based on the reflection signal transmitted from the optical processing unit 121, and transmits the calculated distance information to the stereo image processing unit 250.

For example, the stereo image processing unit 250 can be configured by a dedicated integrated circuit, such as field programmable gate array (FPGA) and application specific integrated circuit (ASIC). The stereo image processing unit 250 outputs synchronization control signals for controlling the image capture timing and the light projection timing and light reception timing of the laser light to the left camera 111, the right camera 112 and the laser signal processing unit 240.

Further, the stereo image processing unit 250 generates a disparity image based on the comparative image transmitted from the left camera 111, the reference image transmitted from the right camera 112, and the distance information transmitted from the laser signal processing unit 240. Then, the stereo image processing unit 250 stores the generated disparity image in the memory 260.

The memory 260 stores the disparity image generated by the stereo image processing unit 250. Further, the memory 260 provides a work area when the stereo image processing unit 250 and the MPU 270 perform various processing.

The MPU 270 controls the respective units or parts accommodated in the control board housing 202 and analyzes the disparity image stored in the memory 260.

(Range Finding Using Stereo Camera)

Figure 4:
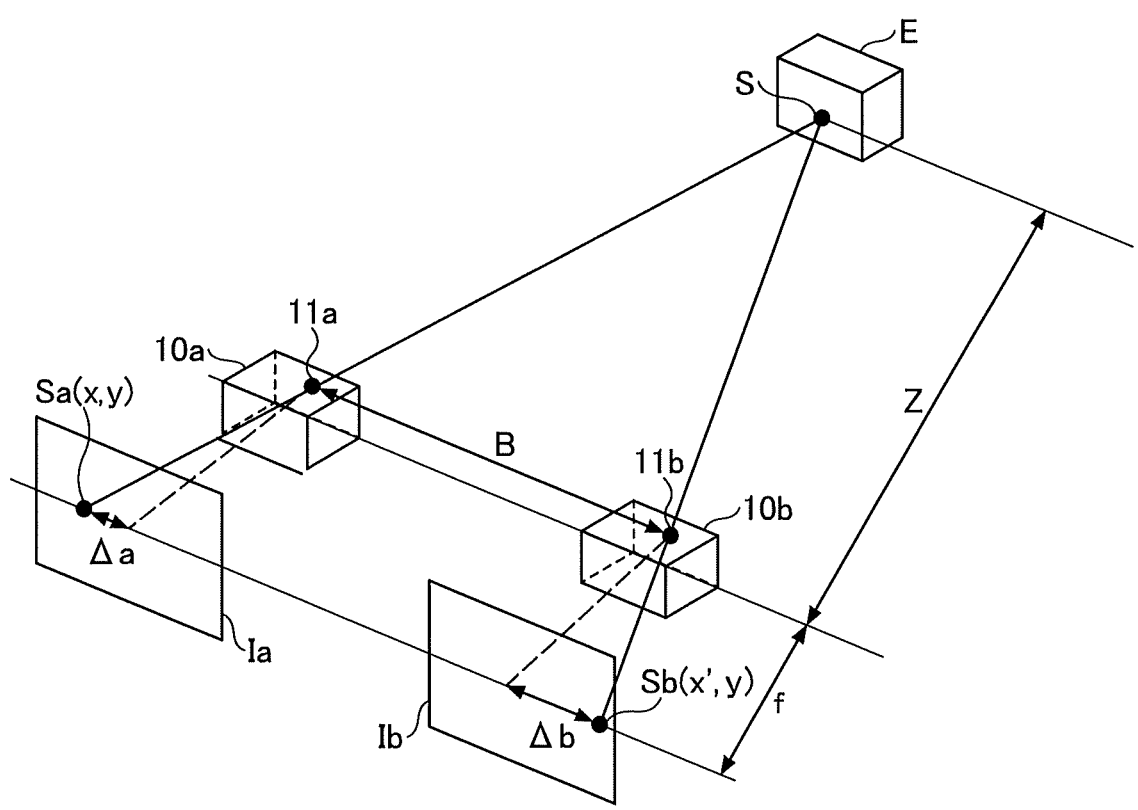
FIG. 4 is a schematic diagram illustrating a principle of deriving a disparity value from a comparative image and a reference image using the triangulation and measuring a distance from the range finding device to an object using the disparity value according to an embodiment.

Hereinafter, a description is given of a range finding principle using the stereo camera with reference to FIG. 4. FIG. 4 is a schematic diagram illustrating a principle of deriving a disparity value from a comparative image and a reference image using the triangulation and measuring a distance from the range finding device 100 to an object using the disparity value.

At first, it is assumed that the right camera 112 and the left camera 111 are installed at positions parallel to each other. A point S on an object E in the three dimensional space is mapped to positions on the same horizontal line extending between the right camera 112 and the left camera 111. That is, the point S in each image is imaged at the point Sa(x,y) in a comparative image "Ia" and the point Sb(x',y) in a reference image "Ib." In this case, a disparity value "d" (the integer disparity value in this case) is expressed as indicated in a formula (1) using the point Sa(x,y) and the point Sb(x',y).

$$d = x' - x \qquad (1)$$

As illustrated in FIG. 4, when a distance between the point Sa(x,y) in the comparative image "Ia" and the intersection of the vertical line from the left camera 111 to the image capturing plane is set as "Δa," and a distance between the point Sb(x',y) in the reference image "Ib" and the intersection of the vertical line from the right camera 112 to the image capturing plane is set as "Δb", the disparity value d=Δa+Δb is set.

By using the disparity value "d", the distance Z between the right camera 112, the left camera 111 and the object E can be calculated. Specifically, the distance Z is a distance from a plane including the focal position of the camera lens 211 and the focal position of camera lens 221 to the point S on the object E. If the focal length of the camera lens 211 and the camera lens 221, the baseline length B that is the length between the camera lens 211 and the camera lens 221, and the disparity value "d" are known, the distance Z can be calculated using a formula (2).

$$Z = (B \times f)/d \qquad (2)$$

As indicated in the formula (2), the larger the disparity value "d", the smaller the distance Z, and the smaller the disparity value "d", the larger the distance Z. Further, as indicated in the formula (2), the smaller the camera (the smaller the baseline length B), the greater the distance per one integer disparity.

Figure 5:
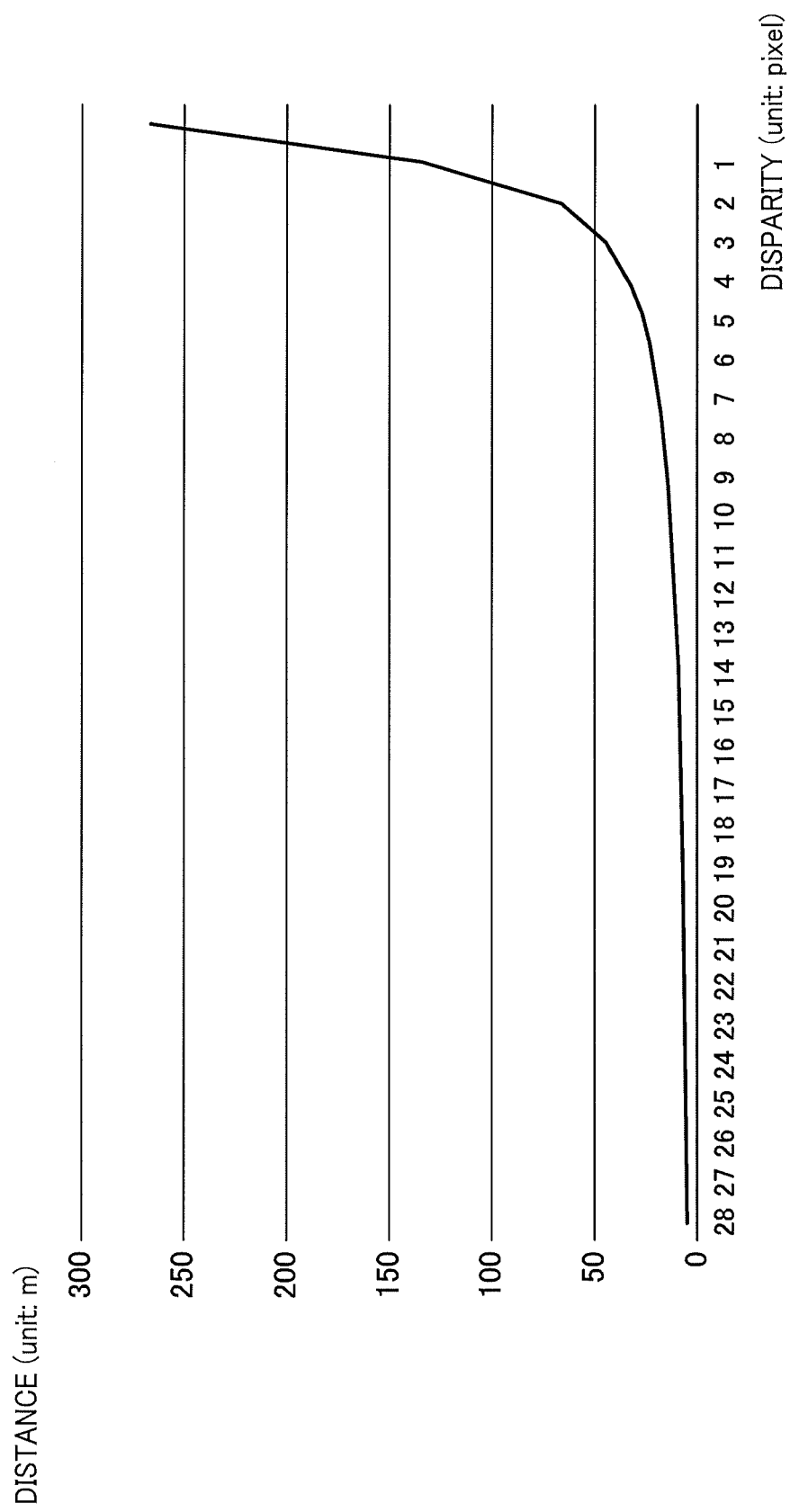
FIG. 5 illustrates a profile indicating a relationship between disparity values and distance according to an embodiment.

FIG. 5 illustrates a profile indicating a relationship between disparity values and distance. In an example case of FIG. 5, the baseline length B=80 mm, the focal length f=5 mm, and the cell size (pixel pitch)=3 um of the imaging element 212 and 222 are set. As indicated in FIG. 5, when the disparity value "d" becomes smaller and smaller, the distance rapidly increases when the integer disparity changes by one. This means that the distance resolution becomes rapidly deteriorates as the object is farther away (as the disparity value "d" becomes smaller).

(Calculation of Integer Disparity by Block Matching)

Figure 6:
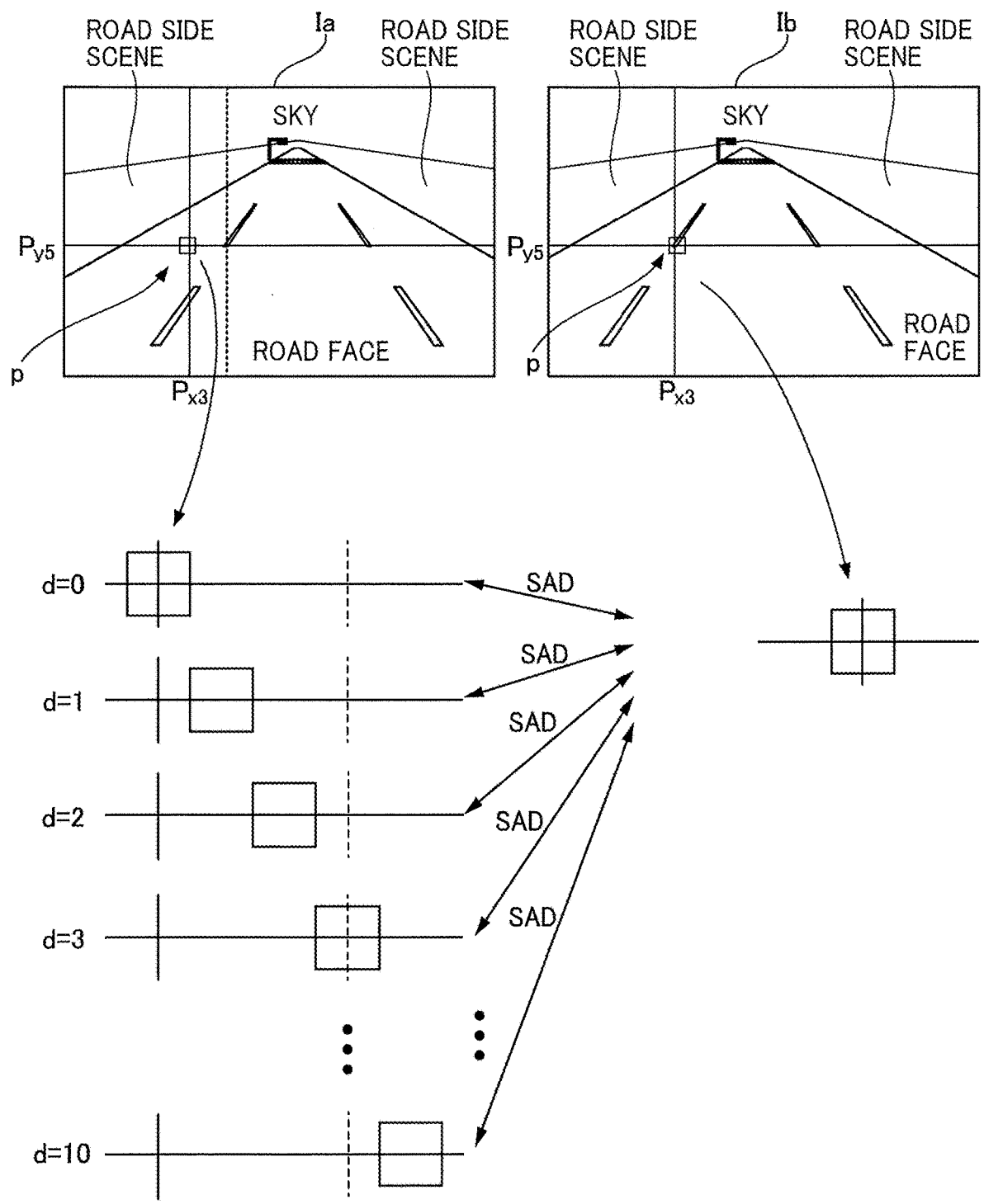
FIG. 6 is an example of a diagram illustrating a calculation of integer disparity by performing a block matching according to an embodiment.

Hereinafter, a description is given of a method of calculating a disparity value with reference to FIG. 6. FIG. 6 is an example of a diagram illustrating a calculation of integer disparity by performing a block matching. FIG. 6 illustrates an example a calculation of integer disparity, in which the sum of absolute difference (SAD) is calculated as the cost of the concerned pixel p=(Px3, Py5) in the comparative image "Ia" captured by the right camera 112 and the reference image "Ib" captured by and the left camera 111.

Since the image capturing position of the reference image "Ib" and the image capturing position of the comparative image "Ia" are different, the concerned pixel p=(Px3, Py5) at the same position on the captured images "Ib" and "Ia" do not point to the same object but indicate the positions displaced in the left and right directions. Therefore, when a block size is set to one-by-one pixel, a difference between the luminance value of the concerned pixel p=(Px3, Py5) in the reference image "Ib" and the luminance value of the concerned pixel p=(Px3, Py5) in the comparative image "Ia" becomes a larger value.

Then, the concerned pixel p in the comparative image "Ia" is shifted to the right by one pixel. That is, a SAD value is calculated by setting the disparity value "d"=1. Specifically, a difference value between the luminance value of the concerned pixel p=(Px3+1, Py5) in the comparative image "Ia" and the luminance value of the concerned pixel p=(Px3, Py5) in the reference image "Ib" is calculated.

Similarly, in the same manner, the disparity values are changed, such as d=2, 3, . . . to calculate the SAD for each disparity value. In an example case of FIG. 6, when the disparity "d"=3 is used, the object indicated by the concerned pixel "p"=(Px3, Py5) in the reference image "Ib" and the object indicated by the concerned pixel "p"=(Px3+3, Py5) in the comparative image "Ia" become the same.

Therefore, the SAD value corresponding to the disparity "d"=3 becomes smaller than the SAD value corresponding to any disparity "d" other than the disparity "d"=3. The calculated SAD is referred to as the cost, and among the costs that are calculated by changing d=1, 2, 3 . . . in a given certain search range (e.g., 64 pixels), the disparity corresponding to lowest cost becomes the disparity value (integer disparity). Thereafter, the decimal disparity can be obtained using known calculation methods, such as higher-order polynomial estimation or a parabolic fitting.

(Time Measurement by Laser Signal Processing Unit)

Figure 7A:
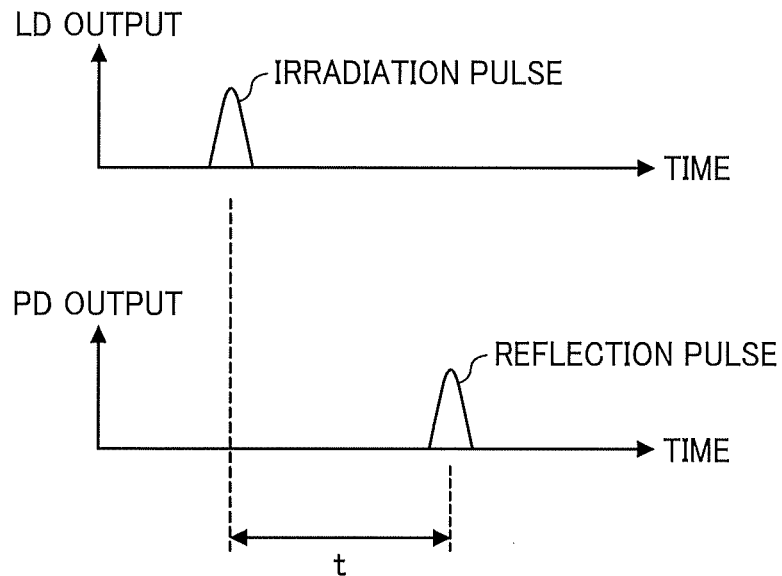
FIGS. 7A and 7B schematically illustrates a measurement of time "t" that is a time difference between a time that emits a laser light and a time that receives a reflection light from an object according to an embodiment.
Figure 7B:
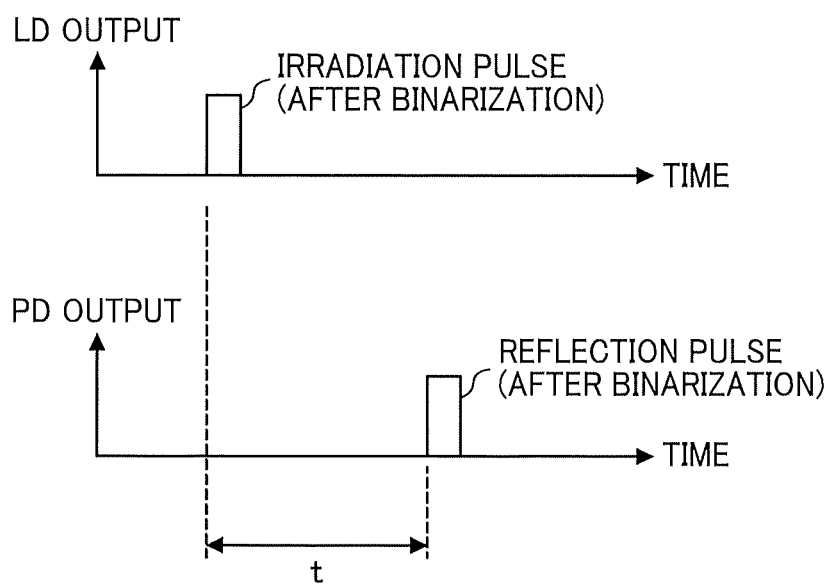

Hereinafter, a description is given of principle of the time measurement by the laser signal processing unit 240 with reference to FIG. 7. FIG. 7 schematically illustrates a measurement of time "t" that is a time difference between a time that emits the laser light and a time that receives the reflection light from an object. FIG. 7A schematically illustrates an analog signal, and FIG. 7B schematically illustrates a digital signal. As illustrated in FIG. 7A, a pulse laser light is irradiated at a given time, and the pulse reflection light is received later at the time "t." Therefore, the distance to the object in the irradiation direction can be calculated by multiplying the time "t" and the speed of the light in the air.

As illustrated in FIG. 7B, a pulse laser light is irradiated at a given time, and the pulse reflection light is received later at the time "t," similar to FIG. 7A. FIG. 7B illustrates a case that the irradiation light and the reflection light are binarized. Since the laser radar ranging unit 120 receives the noise other than the reflection light, it is rare that the laser radar ranging unit 120 receives the reflection light alone as illustrated in FIG. 7A. Therefore, typically, the signal received by the laser radar ranging unit 120 is compared with a threshold value, and the signal exceeding the threshold value is detected as a reflection signal. Since the laser signal processing unit 240 converts signals of the received light into the binary values using the threshold value, the signals of 0 or 1 can be acquired as illustrated in FIG. 7B.

(Configuration of Laser Signal Processing Unit)

Figure 8:
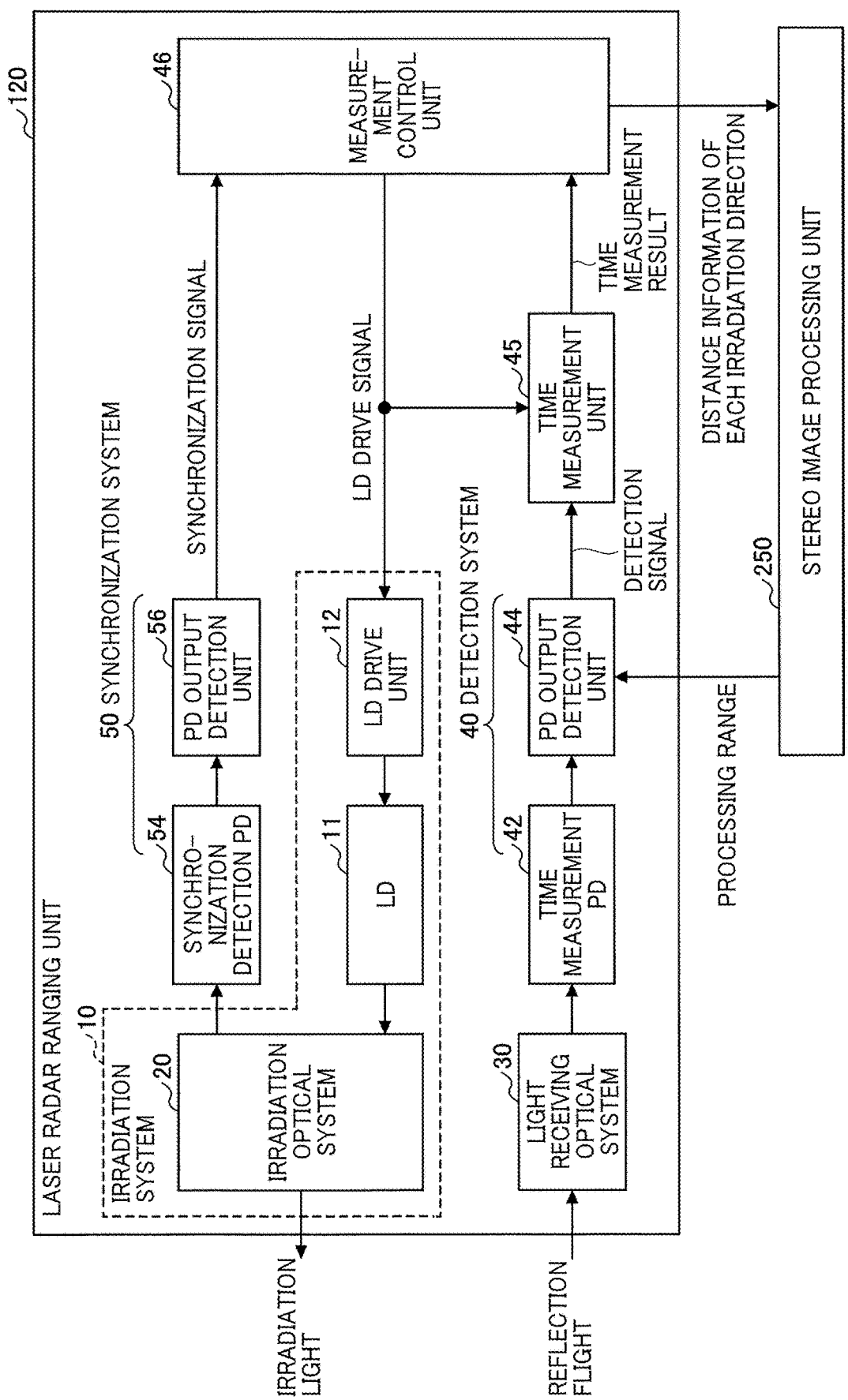
FIG. 8 is an example of a functional block diagram of a laser radar ranging unit according to an embodiment.

Hereinafter, a description is given of an example of a configuration of the laser radar ranging unit 120 with reference to FIG. 8. FIG. 8 is an example of a functional block diagram of the laser radar ranging unit 120.

The range finding device 100, for example, is mounted on the vehicle that is an example of movable apparatus. The range finding device 100 emits light, and receives the light reflected (dispersed) from an object (e.g., front vehicle, stopped vehicle, obstacle, pedestrian) to detect information about the object, such as whether the object exists or not and the distance to the object. The laser radar ranging unit 120 receives power supply, for example, from a battery (storage battery) of the vehicle.

As illustrated in FIG. 8, the laser radar ranging unit 120 includes, for example, an irradiation system 10, a light receiving optical system 30, a detection system 40, a time measurement unit 45, a synchronization system 50, and a measurement control unit 46.

The irradiation system 10 (an example of irradiation unit) includes, for example, a laser diode (LD) 11 as a light source, an LD drive unit 12, and an irradiation optical system 20. In the embodiment, the LD 11 is used as the light source, but is not limited to thereto. For example, other light-emitting elements such as surface-emitting laser using vertical cavity surface emitting laser (VCSEL), an organic electro-luminescence (OEL) element, and a light-emitting diode (LED) may be used.

The LD 11 corresponding to the laser light source 232 is driven by the LD drive unit 12 to irradiate a pulse laser light with a given cycle. The LD drive unit 12 drives the LD 11 to emit the light using LD drive signals (rectangular pulse signal) output from the measurement control unit 46. The LD drive unit 12 includes, for example, a capacitor connected to the LD 11 used for supplying the current, a transistor for switching conduction and non-conduction between the capacitor and the LD 11, a charging unit capable of charging the capacitor, and the like.

In the embodiment, for example, a reflection mirror is rotated to scan the light beam. The synchronous system 50 includes, for example, a synchronization detection PD 54 and a PD output detection unit 56. The synchronization detection PD 54 is disposed on an optical path of the light beam coming from the LD 11 and reflected by the reflection mirror set with a given angle, using this operation method. The PD output detection unit 56 detects a voltage signal (received light signal) based on an output current (photocurrent) of the synchronization detection PD 54. The angle of reflection mirror can be detected based on the signal received from the synchronization detection PD 54, with which the scanning direction of the system can be synchronized. That is, the irradiation direction of each laser light is determined based on the angle of the reflection mirror when the synchronization signal is acquired.

The detection system 40 includes, for example, a time measurement PD 42 (photodiode) and a PD output detection unit 44. The time measurement PD 42 receives the light emitted from the irradiation optical system 20 corresponding to the irradiation lens 233, and then reflected and scattered by an object through the light receiving optical system 30 corresponding to the light receiving lens 234. The PD output detection unit 44 detects a voltage signal (received light signal) based on an output current (photocurrent) of the time measurement PD 42. The light receiving element can employ, for example, photodiode (PD) and avalanche photodiode (APD), geiger mode APD such as single photon avalanche diode (SPAD) or the like.

The time measurement PD 42 corresponding to the light receiving element 235 receives light reflecting from the object, background light or the like.

The PD output detection unit 44 (an example of light signal detection device) amplifies analog signals (output voltages) received from the time measurement PD 42 as needed, binarizes the analog signals using a threshold voltage as a reference voltage, and outputs the binarized signals (digital signals) to the time measurement unit 45. The binarization refers to the conversion of the reflection signals into the signals of 1 or 0 by comparing the reflection signals and the threshold value. The PD output detection unit 44 has a characteristic configuration of the embodiment, and will be described in detail later.

The time measurement unit 45 measures the round-trip time of the light to the object based on the rising timing of the LD drive signal and the light reception timing from the binarized signal, and outputs the measured value to the measurement control unit 46 as a result of the time measurement. That is, the time measurement unit 45 converts the time difference between the time of emitting the laser light and the time of detecting the peak of the reflection signal after the laser light is irradiated, into the distance information of the object.

The measurement control unit 46 receives the measurement control signals (e.g., measurement start signal, measurement stop signal) from the vehicle-mounted device to perform the measurement start operation and the measurement stop operation. The measurement control unit 46 generates the LD drive signal based on the synchronization signal, and outputs the LD drive signal to the LD drive unit 12 and the time measurement unit 45. Further, the time measurement unit 45 converts the time measurement result into the distance to calculate the round-trip distance of the light to the object, outputs a half of the round-trip distance of the light to the object to the stereo image processing unit 250 as distance information of the object.

(Function of Stereo Image Processing Unit)

Figure 9:
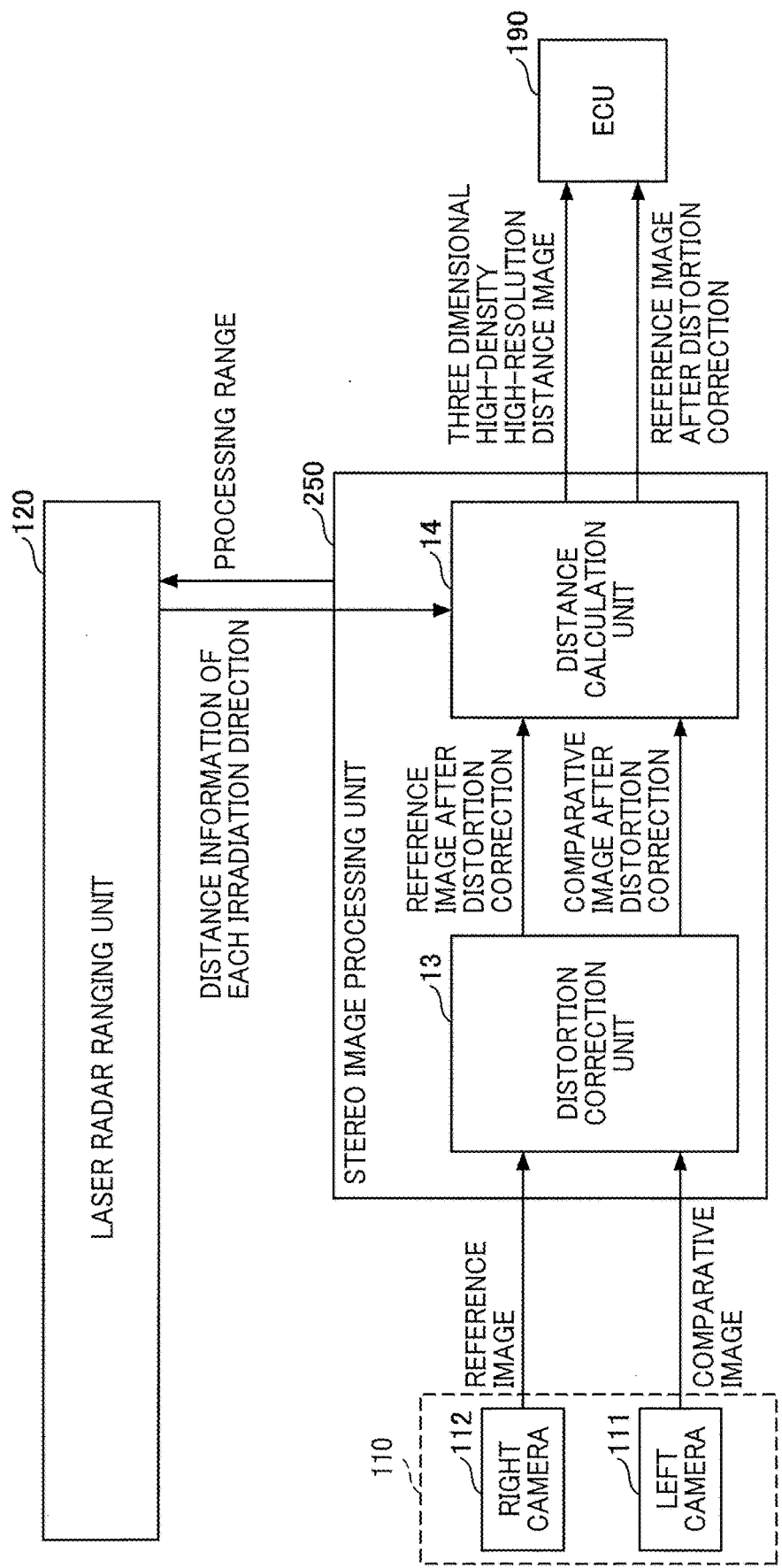
FIG. 9 is an example of a functional block diagram of a stereo image processing unit according to an embodiment.

FIG. 9 is an example of a functional block diagram of the stereo image processing unit 250. As illustrated in FIG. 9, the stereo image processing unit 250 includes, for example, a distortion correction unit 13, and a distance calculation unit 14. As described above, the stereo camera unit 110 includes the right camera 112 and the left camera 111. In the embodiment, an image captured by the right camera 112 is used as the reference image, and an image captured by the left camera 111 is used as a comparative image.

The distortion correction unit 13 and the distance calculation unit 14 may be implemented by using a dedicated electronic circuit, or implemented when the CPU (computer) executes the programs. Therefore, the stereo image processing unit 250 has a function of information processing apparatus. Further, the stereo image processing unit 250 also functions an image processing apparatus because the stereo image processing unit 250 processes image data.

The distortion correction unit 13 performs the distortion correction to the reference image and the comparative image. By performing the image correction such as the distortion correction, the reference image and the comparative image are corrected so that the difference between the reference image and the comparative image is the disparity alone. The image correction can be performed based on a pre-correction calibration. When the left camera 111 and the right camera 112 are disposed, for example, an image of object used for calibration (e.g., checkerboard pattern) is captured using the left camera 111 and the right camera 112. By comparing the image captured using the left camera 111 and the image captured the right camera 112, a geometric transformation look-up table (LUT) is generated to convert the image data while minimizing the internal error factors related to the hardware, such as lens distortion, optical axis deviation, focal distance deviation, and imaging element distortion. The distortion correction unit 13 performs the image correction by referring to the LUT.

The distance calculation unit 14 calculates disparity by applying an algorithm, such as the block matching and semi global matching (SGM) propagation method to the reference image and the comparative image. Further, as to be described later in detail, the distance calculation unit 14 sets a weight to the cost and the matching cost of each pixel calculated from the distance information, output by the laser radar ranging unit 120, to calculate the final cost. The matching cost is the degree of matching in the block matching. The matching cost is also referred to as the matching evaluation value.

The configuration of FIG. 9 is just one example. For example, the laser radar ranging unit 120 and the stereo image processing unit 250 can be integrated as one unit. Further, the ECU 190 may have a function of the stereo image processing unit 250.

(Issue of Range Finding Method of TOF Method)

The distance is measured using the time difference between the time of emitting the laser light and the time of detecting the reflection light. However, it is known that the intensity of reflection signal received by the time measurement PD 42 becomes smaller in inversely proportional to the square of the distance. For example, when the distance to the object becomes two times (e.g., from 10 [m] to 20 [m]), the signal intensity becomes a fourth (¼). Therefore, the signal intensity decreases rapidly as the distance to the object becomes farther away. There are some methods, such as increasing the intensity of transmission wave, increasing the optical utilization efficiency, and increasing an area of the light receiving element. However, if the intensity of transmission wave is increased, the signal becomes too strong in the nearby side, causing the saturation and the peak to become vague, and the cost becomes higher. If the optical utilization efficiency is increased, the module becomes larger, and the improvement may not be expected even if the area of the light receiving element is increased.

FIG. 10 illustrates an example of a difference in intensity of signal received from nearby side and far side. FIG. 10A illustrates a reflection signal received from an object at the nearby side (nearby object). The reflection signal indicating the distance to the object corresponds to a portion 81 indicating a peak, and other portions indicate noise. As illustrated in FIG. 10A, the signal intensity of the nearby object can be detected separately from the noise. Then, the distance to the object is calculated using the time difference between the time of emitting the laser light and the time of detecting the reflection light coming from the object. The reflection signal indicating the distance to the object can be determined using various methods. For example, one method detects the maximum peak position, and another method detects a plurality of positions greater than a threshold value (i.e., multi-detection).

FIG. 10B illustrates a reflection signal received from an object at the far side (distant object). The signal intensity of the distant object is weak, in which the signal intensity of a reflection signal 83 of the distant object becomes almost the same as the signal intensity of a noise signal 82. In such a situation, the reflection signal 83 of the distant object is difficult to detect using either one method detecting the maximum peak position or another method detecting the signal intensity exceeding the threshold value.

Typically, there is a method in which the signal coming from the nearby side and having a value equal to or greater than a given threshold value is regarded as the reflection signal indicating the distance to the object, and one or more peak positions of the reflection signal coming from the nearby side is regarded as the reflection signal indicating the distance to the object. However, in an example case of FIG. 10B, the intensity of the reflection signal 83 is substantially the same as the intensity of the noise signal 82 that is detected before detecting the reflection signal 83, in which it is difficult to detect the reflection signal 83 by the laser radar ranging unit 120. Typically, the laser radar ranging unit 120 has such issue. Thus, in the embodiment, the stereo image processing unit 250 calculates a processing range to assist the laser radar ranging unit 120 to detect a weaker reflection signal coming from the distant object.

(Function of Stereo Image Processing Unit)

Figure 11:
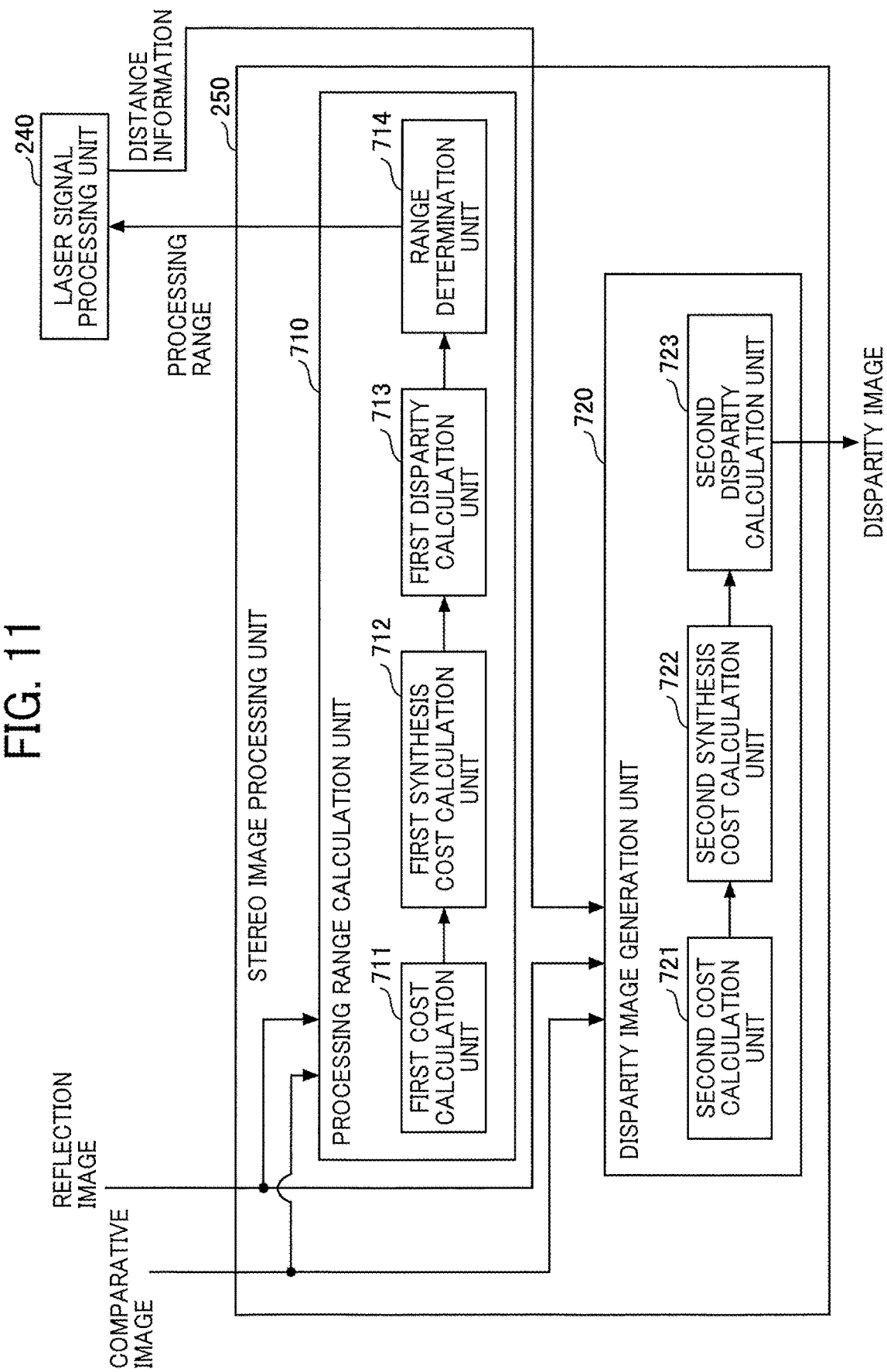
FIG. 11 is an example of a functional block diagram of a stereo image processing unit in detail according to an embodiment.

FIG. 11 is an example of a functional block diagram of the stereo image processing unit 250. In FIG. 11, the functional configuration of the stereo image processing unit 250 for implementing the disparity calculation operation is illustrated, and other functional configuration (e.g., function for transmitting synchronization control signals) is omitted.

As illustrated in FIG. 11, the stereo image processing unit 250 includes, for example, a processing range calculation unit 710 and a disparity image generation unit 720. Further, the processing range calculation unit 710 includes, for example, a first cost calculation unit 711, a first synthesis cost calculation unit 712, a first disparity calculation unit 713, and a range determination unit 714.

Further, the disparity image generation unit 720 includes, for example, a second cost calculation unit 721, a second synthesis cost calculation unit 722, and a second disparity calculation unit 723. Hereinafter, a description is given of details of the processing range calculation unit 710 and the disparity image generation unit 720 with reference to FIG. 11.

(Processing Range Calculation Unit)

Hereinafter, a description is given of the details of the processing range calculation unit 710 with reference to FIG. 11. Firstly, the first cost calculation unit 711 calculates the cost by performing the block matching as described with reference to FIG. 6. This cost is referred to as the first cost.

The first synthesis cost calculation unit 712 synthesizes the cost C(p,d) of each pixel region received from the first cost calculation unit 711 to calculate the first synthesis cost S, and then obtain a synthesis result. The first synthesis cost calculation unit 712 calculates a plurality of first path cost Lr using a given processing method, such as semi-global matching (SGM method), and calculates the first synthesis cost S by aggregating the first path cost Lr for the reference pixel region "p".

Figure 12:
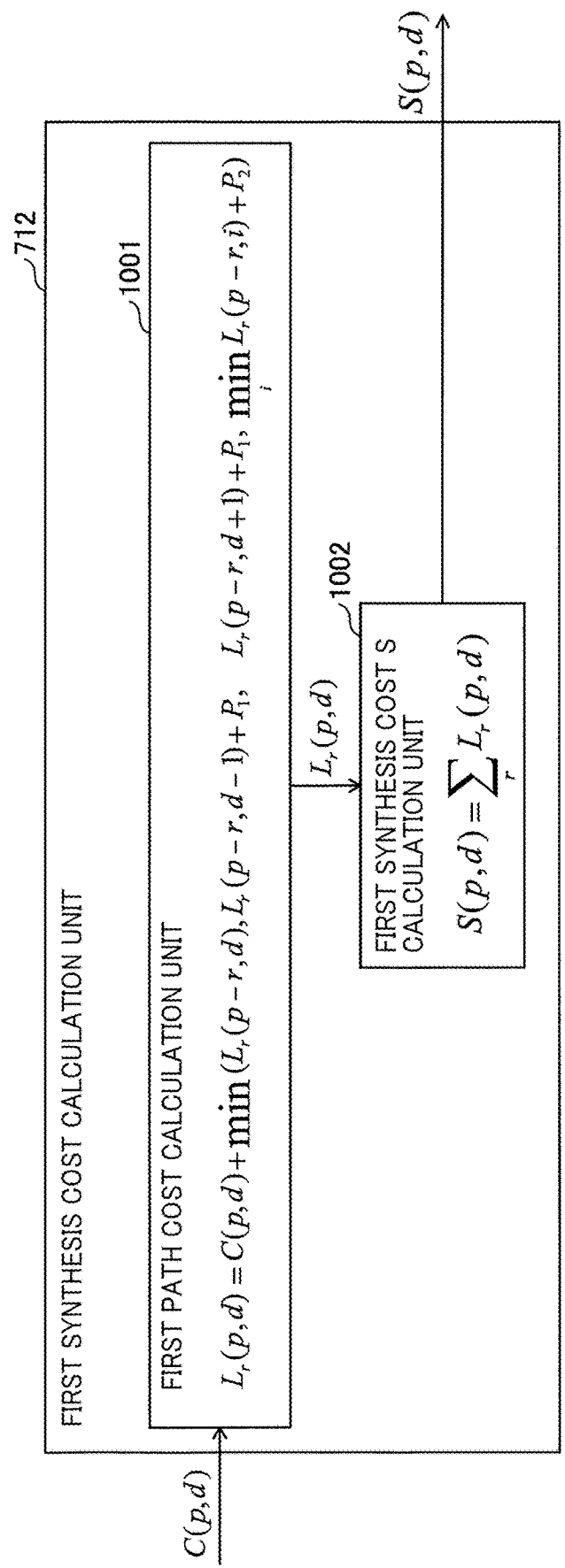
FIG. 12 illustrates a functional block diagram of a first synthesis cost calculation unit according to an embodiment.

FIG. 12 illustrates a functional block diagram of the first synthesis cost calculation unit 712. As illustrated in FIG. 12, the first synthesis cost calculation unit 712 includes, for example, a first path cost calculation unit 1001, and a first synthesis cost S calculation unit 1002. When the first path cost calculation unit 1001 acquires the cost C(p, d) from the first cost calculation unit 711, the first path cost calculation unit 1001 calculates the first path cost Lr(p, d) using a following formula (3).

$$L_r(p,d) = C(p,d) + \min(L_r(p-r,d), L_r(p-r,d-1)+P_1, L_r(p-r,d+1)+P_1, \min_i L_r(p-r,i)+P_2) \quad (3)$$

The above formula (3) is a general expression of the path cost Lr using SGM. Further, in the above formula (3), P1 and P2 are fixed parameters.

Figure 13:
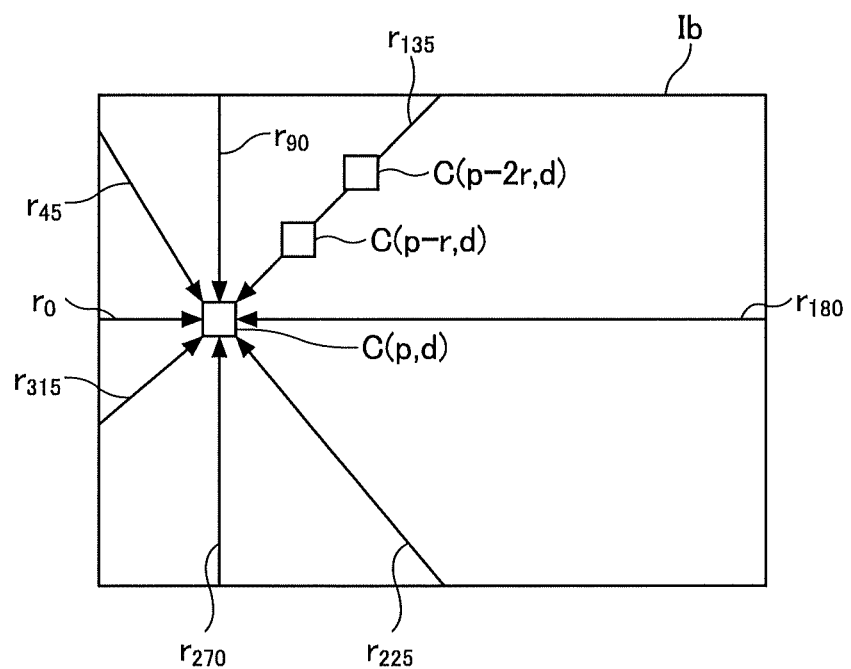
FIG. 13 is a diagram illustrating "r" direction used for calculating a first path cost Lr(p,d) according to an embodiment.

Using the above formula (3), the first path cost calculation unit 1001 adds the minimum value of the first path cost Lr in each pixel region in the "r" direction illustrated in FIG. 13 to the cost C(p,d) of the reference pixel region "p" to calculate the first path cost Lr(p,d). FIG. 13 is a diagram illustrating the "r" direction used for calculating the first path cost Lr(p,d).

As illustrated in FIG. 13, the first path cost calculation unit 1001 calculates the first path cost Lr (e.g., Lr135(p−2r, d)) in the farthest end pixel region in the "r" direction (e.g., r135 direction) of the reference pixel region "p". Subsequently, the first path cost calculation unit 1001 calculates the first path cost Lr (Lr135(p−r, d)) along the "r" direction. In the embodiment, the first path cost calculation unit 1001 calculates the first path cost Lr (e.g., Lr135(p,d)) acquired by repeating these processes for eight directions to obtain the first path cost Lr0(p,d) to Lr315(p,d).

The first synthesis cost S calculation unit 1002 calculates the first synthesis cost S(p,d) based on the first path cost Lr0(p,d) to Lr315(p,d) acquired by the first path cost calculation unit 1001 in the eight directions using a following formula (4).

$$S(p, d) = \sum_r L_r(p, d) \quad (4)$$

The first synthesis cost S calculation unit 1002 notifies the calculated first synthesis cost S(p,d) to the first disparity calculation unit 713.

Then, the first disparity calculation unit 713 extracts the corresponding pixel region in the comparative image "Ia" corresponding to the reference pixel region "p" based on the first synthesis cost S(p,d) calculated by the first synthesis cost calculation unit 712, and then calculates the disparity of the reference pixel region "p". Further, the first cost calculation unit 711 and the first synthesis cost calculation unit 712 also perform the same processing for other reference pixel regions in the reference image "Ib." Then, the first disparity calculation unit 713 calculates the respective disparity (first disparity) in each of the reference pixel regions, and notifies the calculation results to the range determination unit 714.

Then, the range determination unit 714 extracts the disparity of the reference pixel region "p" and the disparity of other pixel region near the reference pixel region "p" based on the disparity (first disparity) received from the first disparity calculation unit 713 to determine the processing range. Hereinafter, a description is given of the determination of processing range with reference to FIG. 14.

Figure 14:
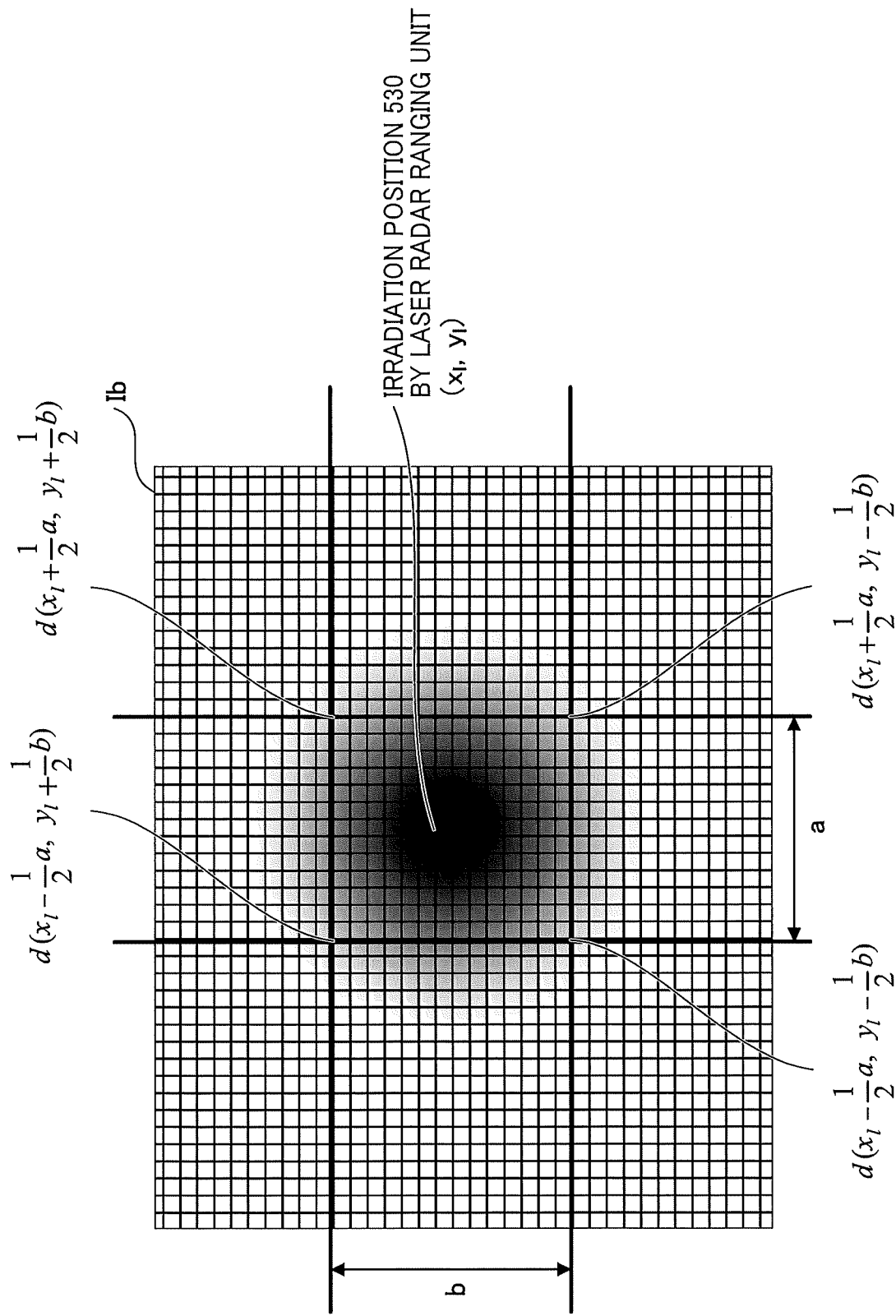
FIG. 14 illustrates a method of determining a processing range by a range determination unit according to an embodiment.

FIG. 14 illustrates a method of determining the processing range by the range determination unit 714, and illustrates an irradiation position of a point 530 and pixel regions near the irradiation position of the point 530 (irradiation position 530), in the reference image "Ib," irradiated with the laser light by the laser radar ranging unit 120.

As illustrated in FIG. 14, it is assumed that the laser light is irradiated to an object existing in the real space corresponding to a position specified by coordinates (x1,y1) of the point 530 in the reference image "Ib." The coordinates (x1,y1) may match the coordinates (x,y) of the reference pixel region "p," or may be slightly shifted.

In this case, the range determination unit 714 extracts pixel regions having ±(½)a pixels in the horizontal direction and ±(½)b pixels in the vertical direction by setting the irradiation position 530 (x1,y1) as the center used for the extraction.

Then, the range determination unit 714 extracts the disparity calculated for the extracted pixel region from the disparity calculated by the first disparity calculation unit 713. In an example case of FIG. 14, among the disparity calculated for the range determination unit 714, the disparity calculated for the left upper pixel region, the disparity calculated for the right upper pixel region, the disparity calculated for the left lower pixel region, and the disparity calculated for the right lower pixel region are illustrated for the simplicity of the drawing.

Then, the range determination unit 714 extracts a disparity having the maximum frequency of processing from the extracted disparities. Then, the range determination unit 714 determines a distance corresponding to ±1 pixel of the disparity of the maximum frequency of processing as a processing range when the laser signal processing unit 240 processes the received laser light signals.

Specifically, among the extracted disparities, the range determination unit 714 determines a given range that is from the minimum distance corresponding to +1 pixel of the disparity of the maximum frequency of processing to the maximum distance corresponding to −1 pixel of the disparity of the maximum frequency of processing as the processing range for processing the received laser light signals. The formula (2) is used to convert the disparity into the distance.

Then, the range determination unit 714 notifies the determined processing range to the laser signal processing unit 240. Then, the laser signal processing unit 240 detects a signal indicating the reflection from an object with respect to the received laser light signals corresponding to the notified processing range, and calculates, for example, the distance information of the point 530. Further, the laser signal processing unit 240 divides the minimum distance with the light speed and the maximum distance with the light speed to convert the processing range from the distance range information into the time range information, and then detects signals indicating the reflection from the object within the time range information.

FIG. 15 illustrates example cases of the processing range determined by the range determination unit 714. In an example case of FIG. 15, the horizontal axis represents the response time counted from the time of emitting the laser light to the time of receiving the reflection light, and the vertical axis represents the signal intensity of the received signal such as laser light signal. In example cases of FIG. 15, processing ranges 1310 and 1320 are determined by the range determination unit 714, which are converted into the time ranges. As illustrated in FIG. 15, many light signals are received and detected along the timeline, in which some light signal may be reflected from an object (target object) and some light signal may not reflected from the object.

Figure 15A:
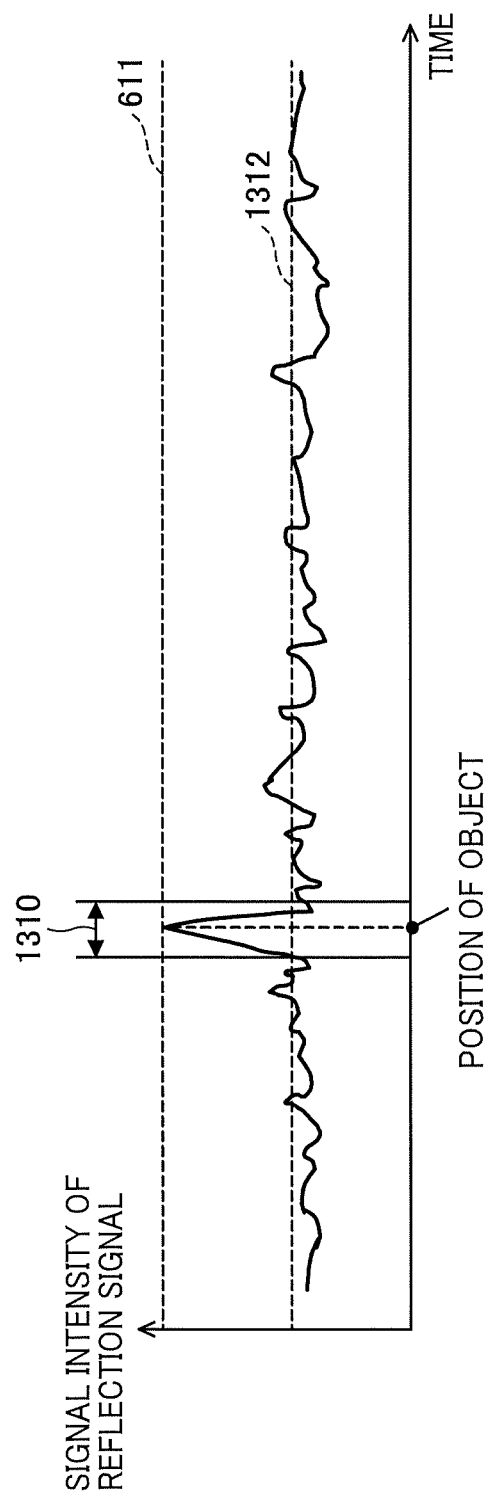
FIGS. 15A and 15B illustrate examples of processing range determined by the range determination unit according to an embodiment.

FIG. 15A illustrates an example case of the received laser light signal when the distance L to an object irradiated with the laser light is short. As illustrated in FIG. 15A, when the distance L to the object irradiated with the laser light is short, a difference between a first-level signal intensity 611 of the signal indicating the reflection from the object and a second-level signal intensity 1312 of the signal indicating reflection not from the object becomes greater. This makes it easier to detect the reflection signal indicating the reflection from the object.

Figure 15B:
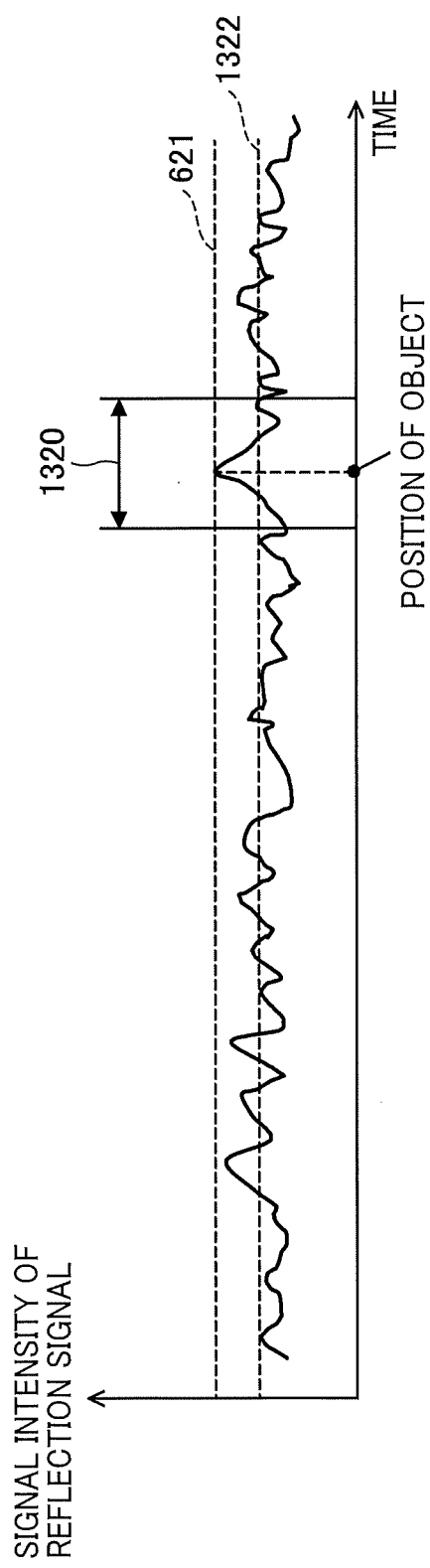

FIG. 15B illustrates another example case of the received laser light signal when the distance L to the object irradiated with the laser light is long. As illustrated in FIG. 15B, even if the distance L to the object irradiated with the laser light is long (if the point 530 is at a far side), a difference between a third-level signal intensity 621 of the signal indicating the reflection from the object and a fourth-level signal intensity 1322 of the signal indicating the reflection not from the object can be set greater. That is, the difference between the signal intensity of the reflection signal indicating the reflection from the object and the signal intensity of the signal that is not reflected from the object can be increased. Therefore, the reflection signal indicating the reflection from the object can be easily detected, and the possibility of erroneously detecting the signal that is not reflected from the object as the reflection signal indicating reflection from the object can be reduced.

In the above description, among the extracted disparities, the range determination unit 714 determines the distance corresponding to ±1 pixel of the disparity of the maximum frequency of processing as the processing range, but the method of determining the processing range is not limited to thereto. For example, the range determination unit 714 can determine the processing range corresponding to a disparity that is calculated using a following formula (5).

$$[d_{min}, d_{max}] = d_{mode} \pm w \sqrt{\frac{1}{n'} \sum_{i=1}^{n'} (d'_i - d_{mode})} \quad (5)$$

In the formula (5), "dmode" represents the disparity having the maximum frequency of processing among the disparities calculated for the reference pixel region "p" and the pixel region around the reference pixel region "p". "w" represents a coefficient indicating how to set a width for the standard deviation from the disparity having the maximum frequency of processing. "n'" represents the number of disparities existing within ±1 pixel with respect to the disparity having the maximum frequency of processing among the disparities calculated for the reference pixel region "p" and the surrounding pixel region. "d'" represents the disparity existing within ±1 pixel of the disparity having the maximum frequency of processing among the integer disparities calculated for the reference pixel region "p" and the surrounding pixel region.

By using the formula (5), when the disparity fluctuation is large, the processing range can be set wider, and when the disparity fluctuation is small, the processing range can be set narrower.

(Disparity Image Generation Unit)

Hereinafter, a description is given of a functional configuration of the disparity image generation unit 720 with reference to FIG. 16.

Figure 16:
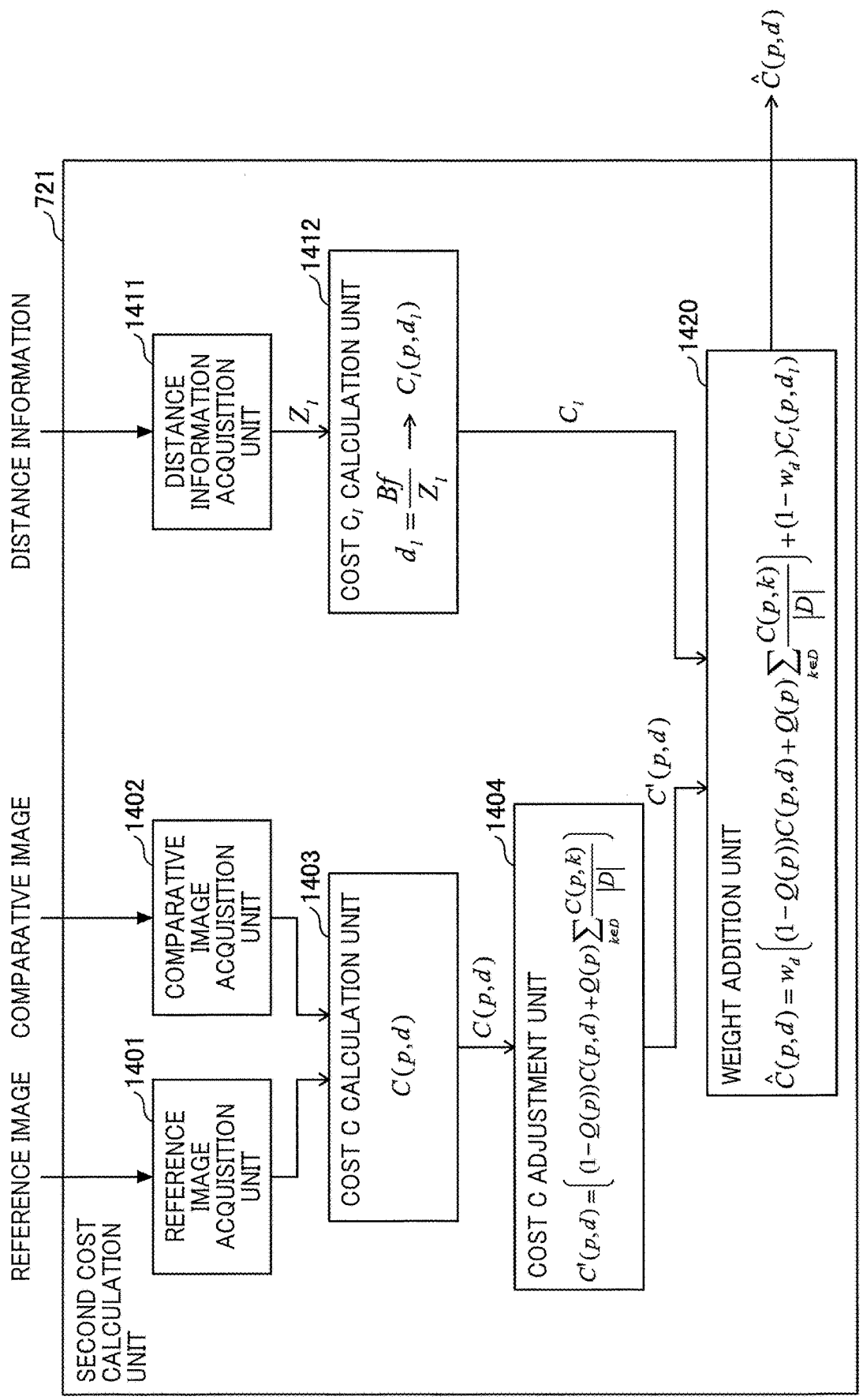
FIG. 16 illustrates a functional block diagram of a second cost calculation unit according to an embodiment.

FIG. 16 illustrates a functional block diagram of the second cost calculation unit 721. The second cost calculation unit 721 includes, for example, a reference image acquisition unit 1401, a comparative image acquisition unit 1402, a cost C calculation unit 1403, and a cost C adjustment unit 1404. The second cost calculation unit 721 further includes, for example, a distance information acquisition unit 1411, a cost $C_l$ calculation unit 1412, and a weight addition unit 1420.

The reference image acquisition unit 1401 acquires the reference image "Ib" from the right camera 112. The reference image acquisition unit 1401 extracts the reference pixel region "p" from the acquired reference image "Ib." Further, the comparative image acquisition unit 1402 acquires the comparative image "Ia" from the left camera 111.

The cost C calculation unit 1403 calculates the cost C(p,d) of the reference pixel region "p." The calculation method of the cost C(p,d) is above described with reference to FIG. 6.

The cost C adjustment unit 1404 adjusts the cost C(p,d) of the reference pixel region "p" calculated by the cost C calculation unit 1403 based on the reliability. The cost C adjustment unit 1404 adjusts the cost C(p, d) of the reference pixel region "p" using a following formula (6) to obtain an adjusted cost C'(p,d).

$$C'(p, d) = \left( (1 - Q(p))C(p, d) + Q(p) \sum_{k \in D} \frac{C(p, k)}{|D|} \right) \quad (6)$$

In the formula (6), "D" represents the maximum value of the shift amount (disparity). "k" represents a count value of the shift amount. Further, Q(p) indicates the reliability of the cost C(p,d) of the reference pixel region "p." The reliability Q(p) can be calculated, for example, using a following formula (7).

$$Q(p) = \frac{C_{min\,2}}{C_{min\,1}} \quad (7)$$

In the formula (7), "Cmin1" and "Cmin2" respectively represent the lowest cost and the second lowest cost among a plurality of cost C(p,d) calculated by changing the shift amount "d" in a given range of "0 to D." The reliability Q(p), calculated based on the "Cmin1" and "Cmin2" using the above formula (7), is normalized to values from "0 to less than 1.0" by setting the values closer to 1.0 as higher the reliability, and then the reliability Q(p) is used in the above formula (6).

For example, the adjusted cost C'(p,d), which is calculated by the cost C adjustment unit 1404, has the reference pixel region "p" in a region where the texture is less (a region where pixel values between adjacent pixel regions change less). The lower the reliability Q(p) is, the adjusted cost C'(p,d) becomes larger.

The distance information acquisition unit 1411 acquires distance information from the laser signal processing unit 240. The distance information acquired from the laser signal processing unit 240 is the distance information, in which the possibility of erroneous detection is reduced by limiting the processing range. The distance information acquired from the laser signal processing unit 240 is referred to as "$Z_l$." Then, the distance information acquisition unit 1411 notifies the acquired distance information "$Z_l$" to the cost $C_l$ calculation unit 1412.

Then, the cost $C_l$ calculation unit 1412 calculates the cost $C_l$ based on the distance information "$Z_l$" received from the distance information acquisition unit 1411. The cost $C_l$ is a parameter indicating a non-similarity degree or level between a specific pixel region in the comparative image "Ia" and the reference pixel region "p" corresponding to a position calculated from the acquired distance information "$Z_l$."

Specifically, the cost $C_l$ calculation unit 1412 calculates a shift amount "$d_l$" based on the distance information "$Z_l$" using a following formula (8). Then, the specific pixel region, existing at the position calculated from the distance information "$Z_l$," in the comparative image "Ia" is extracted.

$$d_l = \frac{Bf}{Z_l} \quad (8)$$

In the formula (8), "B" represents the baseline length between the camera lens 211 and the camera lens 221. "f" represents a focal length of the camera lens 211 and the camera lens 221.

Then, the cost $C_l$ calculation unit 1412 calculates the cost $C_l(p, d_l)$ for the shift amount "$d_l$." Similarly to the above calculation of the cost C(p,d), the cost $C_l$ calculation unit 1412 calculates the cost $C_l(p,d_l)$ as the non-similarity degree or level between a pixel value of the specific pixel region and the pixel value of the reference pixel region "p" at the position of the shift amount "$d_l$."

Then, the weight addition unit 1420 applies a weight to the cost C'(p,d), calculated by the cost C adjustment unit 1404, and a weight to the cost $C_l(p,d_l)$, calculated by the cost $C_1$ calculation unit 1412, to calculate a weighted cost using a following formula (9).

$$\hat{C}(p,d) = \quad (9)$$
$$w_d\left((1-Q(p))C(p,d) + Q(p)\sum_{k \in D}\frac{C(p,k)}{|D|}\right) + (1-w_d)C_l(p,d_l)$$

In the formula (9), "wd" represents a weight coefficient indicating which of the adjusted cost C'(p,d), calculated by the cost C adjustment unit 1404, and the cost $C_l(p,d_l)$, calculated by the cost $C_l$ calculation unit 1412, is set with a higher priority. When the adjusted cost C'(p,d), calculated by the cost C adjustment unit 1404, is set with a higher priority, the value of "wd" is increased. On the other hand, when the cost $C_l(p,d_l)$, calculated by the cost $C_l$ calculation unit 1412, is set with a higher priority, the value of "wd" is reduced.

Specifically, in a case of the shift amount "d" and shift amount "$d_l$" are different (shift amount "d"≠shift amount "$d_l$"), the value of "wd" is increased. Thus, in the specific pixel region in the comparative image "Ia," the weighted cost of the pixel region where the shift amount "d"≠shift amount "$d_l$" can be increased. The adjusted cost C'(p,d) has a larger value, for example, in a region where the texture is less, and the weighted cost of the pixel region where the shift amount "d"≠shift amount "$d_l$" becomes larger by setting the value of "wd" larger for setting the higher priority to the adjusted cost C'(p,d).

On the other hand, in a case of the shift amount "d" and shift amount "$d_l$" are the same (shift amount "d"=shift amount "$d_l$"), the value of "wd" is reduced. Thus, in the specific pixel region of the comparative image "Ia," the weighted cost of the pixel region where the shift amount "d"=shift amount "$d_l$" can be set smaller. The cost $C_l(p,d_l)$ calculated by the cost $C_l$ calculation unit 1412 becomes smaller than the adjusted cost C'(p,d) calculated by the cost C adjustment unit 1404. Therefore, by reducing the value of "wd" and setting the higher priority to the cost $C_l(p,d_l)$ calculated by the cost $C_l$ calculation unit 1412, the weighted cost of the pixel region where the shift amount "d"=shift amount "$d_l$" becomes a smaller value.

In other words, by using the above formula (9), the difference in the cost between the pixel region where the shift amount "d"=shift amount "$d_l$" and other pixel regions where the shift amount "d"≠shift amount "$d_l$" can be further distinguished as the weighted cost.

As a result, when extracting the corresponding pixel region from the second synthesis cost S' calculated by the second synthesis cost calculation unit 722, the pixel region where the shift amount "d" and shift amount "$d_l$" are the same ("d=$d_l$") in the comparative image "Ia" can be extracted easily. In other words, a position 512 of the corresponding pixel region corresponding to the reference pixel region "p" can be extracted with a higher precision.

In the above formula (9), the value of "wd" may be a fixed value, or may be changed in accordance with the value of distance information "$Z_l$." Alternatively, the value of "wd" may be changed in accordance with the ambient environment (e.g., depending on day or night).

The weight addition unit 1420 notifies the weighted cost, calculated using the above formula (9), to the second synthesis cost calculation unit 722.

Figure 17:
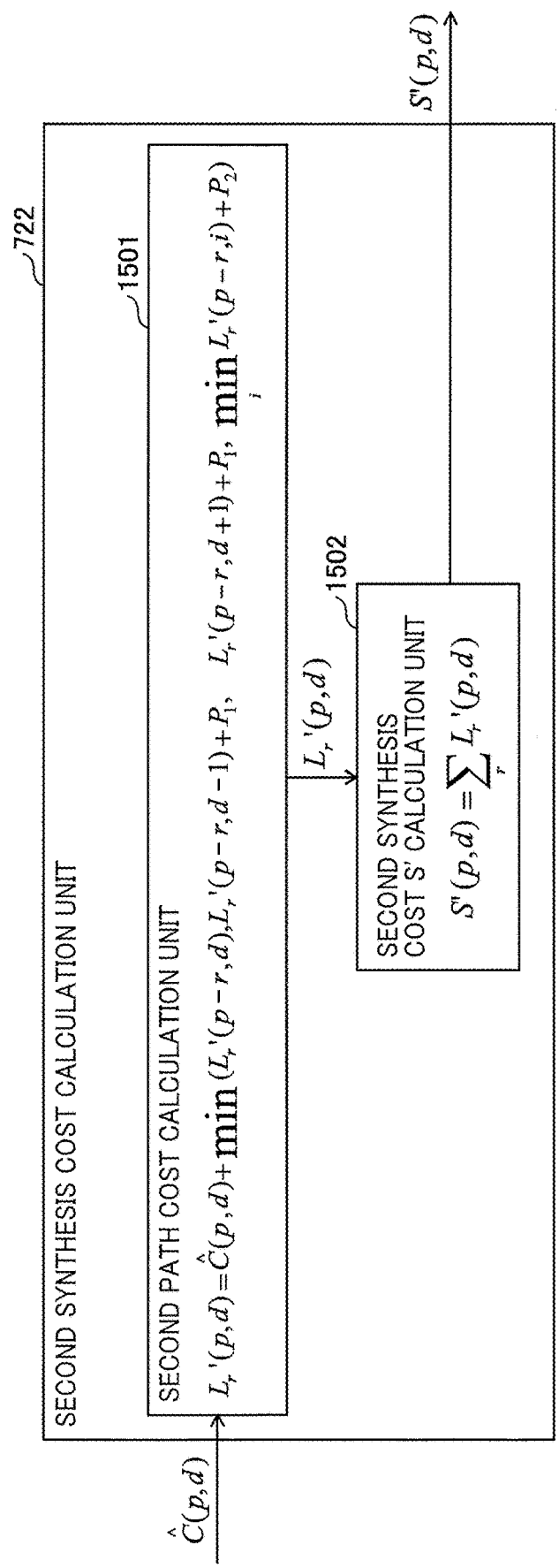
FIG. 17 illustrates a functional block diagram of a second synthesis cost calculation unit according to an embodiment.

FIG. 17 illustrates a functional block diagram of the second synthesis cost calculation unit 722. As illustrated in FIG. 17, the second synthesis cost calculation unit 722 includes, for example, a second path cost calculation unit 1501, and a second synthesis cost S' calculation unit 1502.

The second synthesis cost calculation unit 722 synthesizes the weighted cost of each pixel region received from the second cost calculation unit 721 to calculate the second synthesis cost S' to obtain a synthesis result. The second synthesis cost calculation unit 722 calculates a plurality of second path cost Lr' using a given processing method, such as semi-global matching (SGM), and calculates the second synthesis cost S' by aggregating the second path cost Lr' for the reference pixel region "p".

When the second synthesis cost calculation unit 722 acquires the weighted cost, the second synthesis cost calculation unit 722 calculates the second path cost Lr'(p,d) using a following formula (10).

$$L_r'(p,d) = \hat{C}(p,d) + \min(L_r'(p-r,d), L_r'(p-r,d-1)+P_1,$$
$$L_r'(p-r,d+1)+P_1, \min_i L_r'(p-r,i)+P_2) \quad (10)$$

The formula (10) is set by replacing the cost C(p,d) in a general formula of the path cost using the SGM with the weighted cost. Further, in the above formula (10), P1 and P2 are fixed parameters.

By using the formula (10), the second synthesis cost calculation unit 722 calculates the second path cost Lr'(p, d) in the "r" direction by adding the minimum value of the second path cost Lr' in each pixel region in the "r" direction to the weighted cost of the reference pixel region "p." The second synthesis cost calculation unit 722 calculates the second path cost in each of the "r0" to "r315" directions to obtain the second path cost Lr0'(p,d) to Lr315'(p,d).

The second synthesis cost calculation unit 722 calculates the second synthesis cost S'(p,d) based on the second path cost Lr0'(p,d) to Lr315'(p,d) in the eight directions using a following formula (11).

$$S'(p,d) = \sum_r L_r'(p,d) \quad (11)$$

The second disparity calculation unit 723 extracts the corresponding pixel region in the comparative image "Ia" corresponding to the reference pixel region "p" based on the second synthesis cost S' calculated by the second synthesis cost calculation unit 722, and re-calculates the disparity of the reference pixel region "p."

FIG. 18 illustrates a calculation result of the second synthesis cost S' in the reference pixel region "p." In a given range from "0" to "D" of the shift amount "d," the second disparity calculation unit 723 calculates the shift amount "dmin" in which the second synthesis cost S'(p,d) becomes the minimum, and extracts the corresponding pixel region from the comparative image "Ia." Then, the second disparity calculation unit 723 can acquire the shift amount "dmin" as the disparity (second disparity) of the extracted corresponding pixel region and the reference pixel region.

Then, the second disparity calculation unit 723 performs the same processing for other reference pixel regions in the reference image "Ib" to obtain the re-calculation result of disparity (second disparity) to generate a disparity image and store the generated disparity image in the memory 260.

(Undershoot Processing when Reflection Signal is Weak)

By detecting the reflection signal from the processing range, the laser signal processing unit 240 can increase the detection accuracy of the reflection signal in the received light signals. However, if the reflection signal of the object is too weak, it becomes difficult to detect the reflection signal of the object from the processing range. Hereinafter, a description is given of the details with reference to FIG. 19.

Figure 19B:
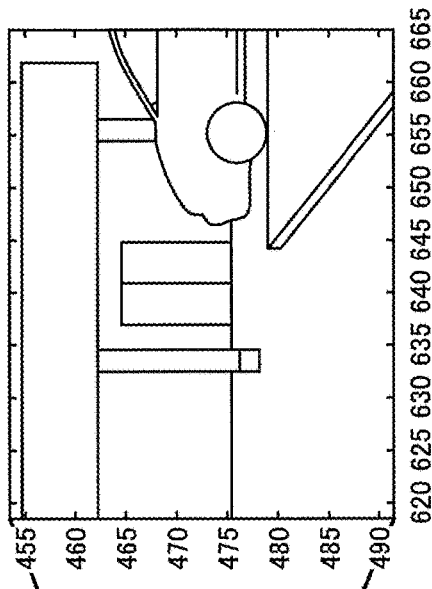
FIGS. 19A, 19B, and 19C illustrates an example of image data when a far distance scene is captured and a reflection signal coming from an object at a far distance according to an embodiment.
Figure 19A:
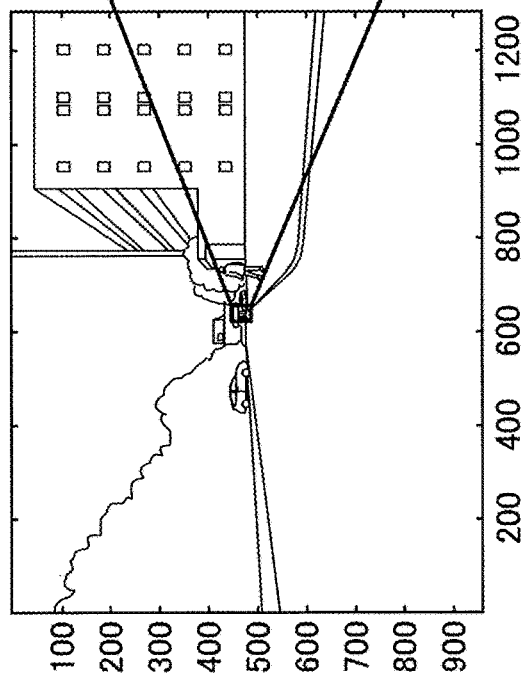

FIG. 19 illustrates an example of image data when a far distance scene is captured and a reflection signal is coming from an object at a far distance. FIG. 19A is an entire area of a reference image captured, for example, by the right camera 112. FIG. 19B is an view enlarging a part of the reference image of FIG. 19A. In FIG. 19A, an object (e.g., black object) having a low reflectance of the laser light is placed at 143-meter position, and FIG. 19B illustrates an enlarged view of the object (e.g., black object) having the low reflectance of the laser light.

Figure 19C:
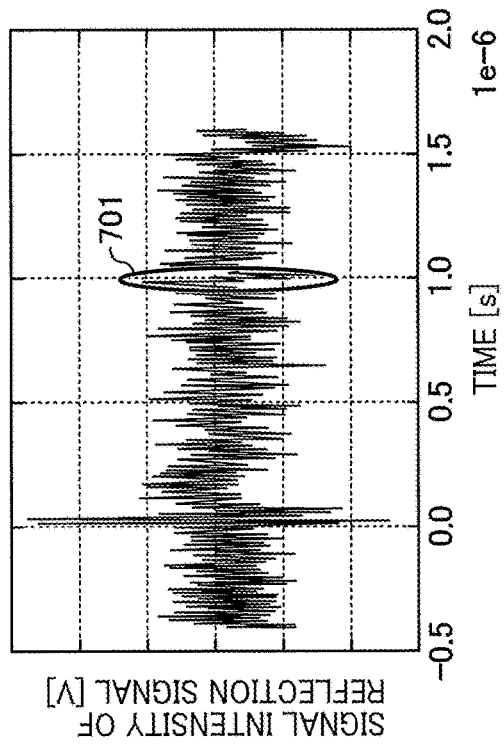

FIG. 19C illustrates a reflection signal of a laser light, in which the object (e.g., black object) having the low reflectance of the laser light is irradiated with the laser light. Since the object (e.g., black object) having the low reflectance of the laser light exists at 143-meter ahead, the peak of reflection signal appears at about $1 \times 10^{-6}$ seconds with a consideration of the round-trip time of the light. In an example case of FIG. 19C, a portion surrounded by a circle 701 indicates the reflection signal coming from the object having the low reflectance of the laser light.

As illustrated in FIG. 19C, since the reflection signal of the object exists with the surrounding noise signals and the signal intensity of the reflection signal of the object is too weak, a person cannot identify the reflection signal of the object if the person does not know where the peak of the reflection signal of the object exists in advance.

Further to the attenuation due to the far distance, in a situation where the sunlight is coming from the forward direction of a traveling direction (which occurs easily for the on-vehicle application), the noise signal becomes very large due to the sunlight (external light), and the situation deteriorates further. Hereinafter, a description is given of a technique for emphasizing the reflection signal coming from the object in such situation (see FIG. 19) with reference to FIG. 20.

Figure 20A:
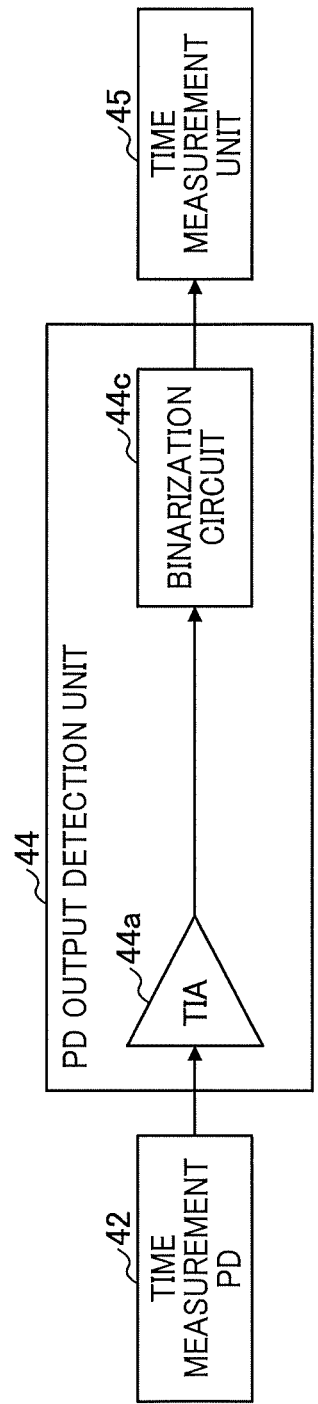
FIGS. 20A and 20B illustrate examples of typical configuration of a PD output detection unit.

FIG. 20 illustrates an example of typical configuration of the PD output detection unit 44. The PD output detection unit 44 illustrated in FIG. 20 employs a configuration that does not cause the undershoot. The PD output detection unit 44 of FIG. 20A includes, for example, a current voltage converter 44a and a binarization circuit 44c. The reflection signal coming from an object and received by the time measurement PD 42 is converted into a current value by the time measurement PD 42, and then the current value is input to the PD output detection unit 44 as the output current.

The PD output detection unit 44 includes, for example, an analog-to-digital converter (ADC) and a comparator to convert the reflection signal into a digital signal. Since the ADC and the comparator are operated by voltage, the current voltage converter 44a, such as trance-impedance-amplifier (TIA), converts the input current value into a voltage value.

Figure 20B:
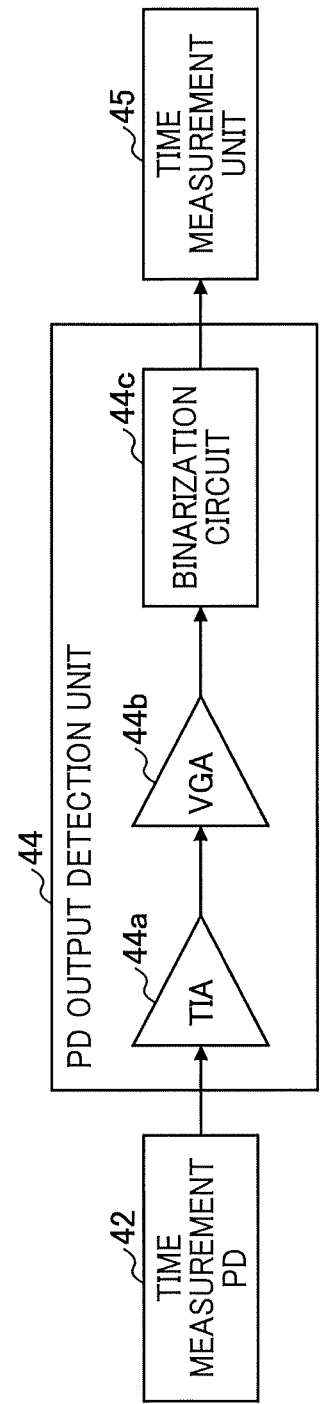

Further, in a case where the magnitude of the reflection signal is insufficient by performing the processing of the current voltage converter 44a alone, as illustrated in FIG. 20B, a voltage amplifier 44b, such as variable gain amplifier (VGA), may be further used.

Figure 21A:
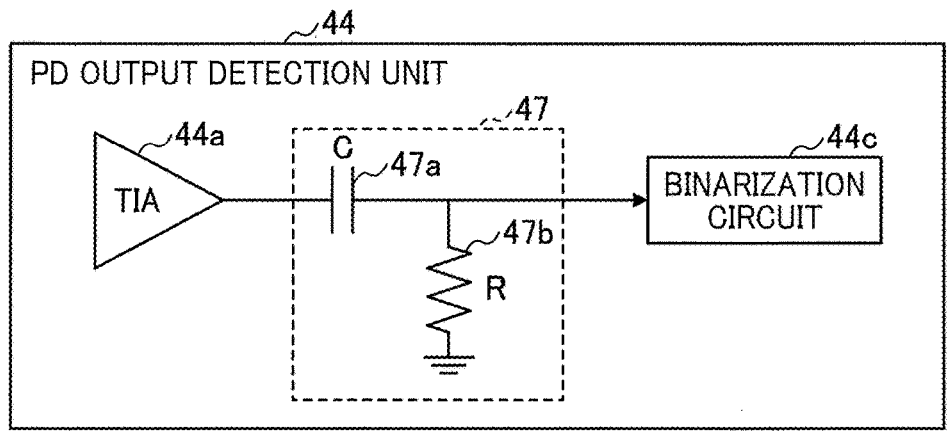
FIGS. 21A, 21B and 21C illustrate an example of configuration of a PD output detection unit having an undershoot addition circuit according to an embodiment.

Hereinafter, a description is given of a configuration of the PD output detection unit 44 used for generating the undershoot with reference to FIG. 21. FIG. 21 illustrates an example of a configuration of the PD output detection unit 44 having an undershoot addition circuit 47 (an example of an undershoot addition unit). As illustrated in FIG. 21A, the undershoot addition circuit 47 is a resistor-capacitor circuit (CR) circuit (differential circuit) including a capacitor 47a, and a resistor 47b. The output of the current voltage converter 44a is input to the capacitor 47a, and then input to the resistor 47b and the binarization circuit 44c. The CR circuit functions as a high-pass filter that passes signals having frequencies equal to or greater than a cutoff frequency.

If a bandwidth of the high-pass filter determined by the capacitor capacitance C and the resistance value R is close to a bandwidth of the input pulse, an undershoot occurs. Accordingly, a shape of the reflection signal can be changed by appropriately setting the design value of the CR circuit.

Figure 21B:
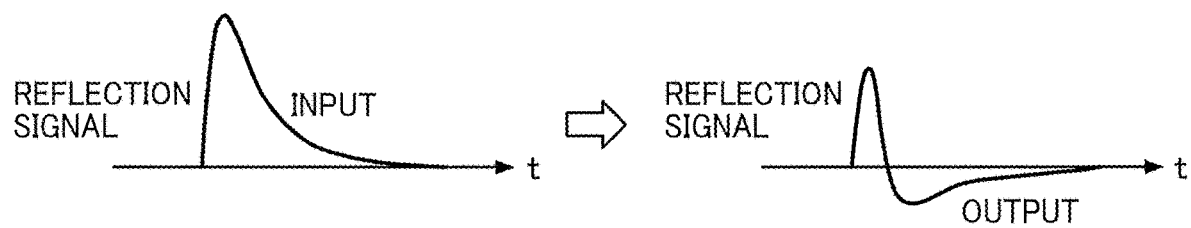

FIG. 21B illustrates an example of a signal input to the undershoot addition circuit 47 and a signal output from the undershoot additional circuit 47. As indicated in FIG. 21B, the undershoot does not occur in the input signal, but the undershoot occurs in the output signal.

Figure 21C:
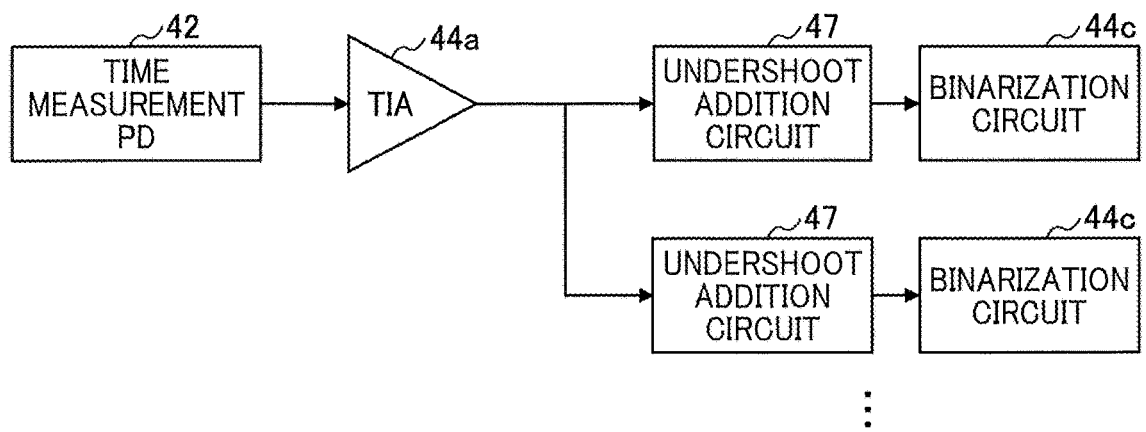

FIG. 21C illustrates an example of a configuration of the PD output detection unit 44 having a plurality of undershoot addition circuits 47. By changing the capacitance C of capacitor and the resistance value R of each of the undershoot addition circuits 47, the shape of the undershoot can be changed.

In the embodiment, the number of the undershoot addition circuits 47 can be one or more.

FIG. 22 is a diagram illustrating another configuration of the undershoot addition circuit 47, and an output signal of the undershoot addition circuit 47. In the undershoot addition circuit 47 of FIG. 22A, a power supply 47d is connected to a resistor 47b of the CR circuit via another resistor 47c, in which the voltage of the power supply 47d is applied to the reflection signal. The frequency characteristic of the circuit illustrated in FIG. 22 as the high-pass filter is determined by the capacitor capacitance C, and the resistance values R1 and R2 of the resistors 47b and 47c.

By changing at least any one of the capacitor capacitance C, the resistance value R1 and the resistance value R2, the undershoot can be generated, and the shape of the undershoot shape can be changed. Further, by applying the voltage "Vol" to the resistor 47c, the base voltage can be arbitrarily set.

FIG. 22B illustrates an example of an input signal that is input to the undershoot addition circuit 47. FIG. 22C illustrates an example of an output signal of the undershoot addition circuit 47 when the bandwidth of the high-pass filter and the bandwidth of the input pulse are not close to each other. FIG. 22D illustrates an example of an output signal of the undershoot addition circuit 47 when the bandwidth of the high-pass filter and the bandwidth of the input pulse are close to each other. As illustrated in FIG. 22D, an undershoot occurs when the bandwidth of the high-pass filter and the bandwidth of the input pulse are close to each other.

Further, as illustrated in FIG. 22C, by applying the voltage "Vol" to the resistor 47c, the base voltage that was zero (0) can be set greater than zero (0).

Thus, the undershoot can be generated and the shape of undershoot can be changed. That is, since the shape of undershoot (i.e., a portion for setting the undershoot that is counted from the previous peak, a wave width of the undershoot portion) can be set as a design value, the shape of undershoot can be calculated from the capacitor capacitance C, and the resistance values R1 and R2.

The configuration of the undershoot addition circuit 47 is not limited to the configuration illustrated in FIG. 22. For example, any circuit that can generate an undershoot can be used. For example, the received-light analog signals can be converted into digital signals, an offset can be set on the digital signals, and then the band path filter can be applied by digital signal processing to generate the undershoot.

(Processing)

The above described undershoot-included reflection signal is effective for detecting a weak signal as described below. On the other hand, to be described later, the undershoot-included reflection signal may not be effective separating a plurality of objects lined in a row. Therefore, in the embodiment, the reflection signal is processed using a plurality of processing routes as follows.

Figure 23:
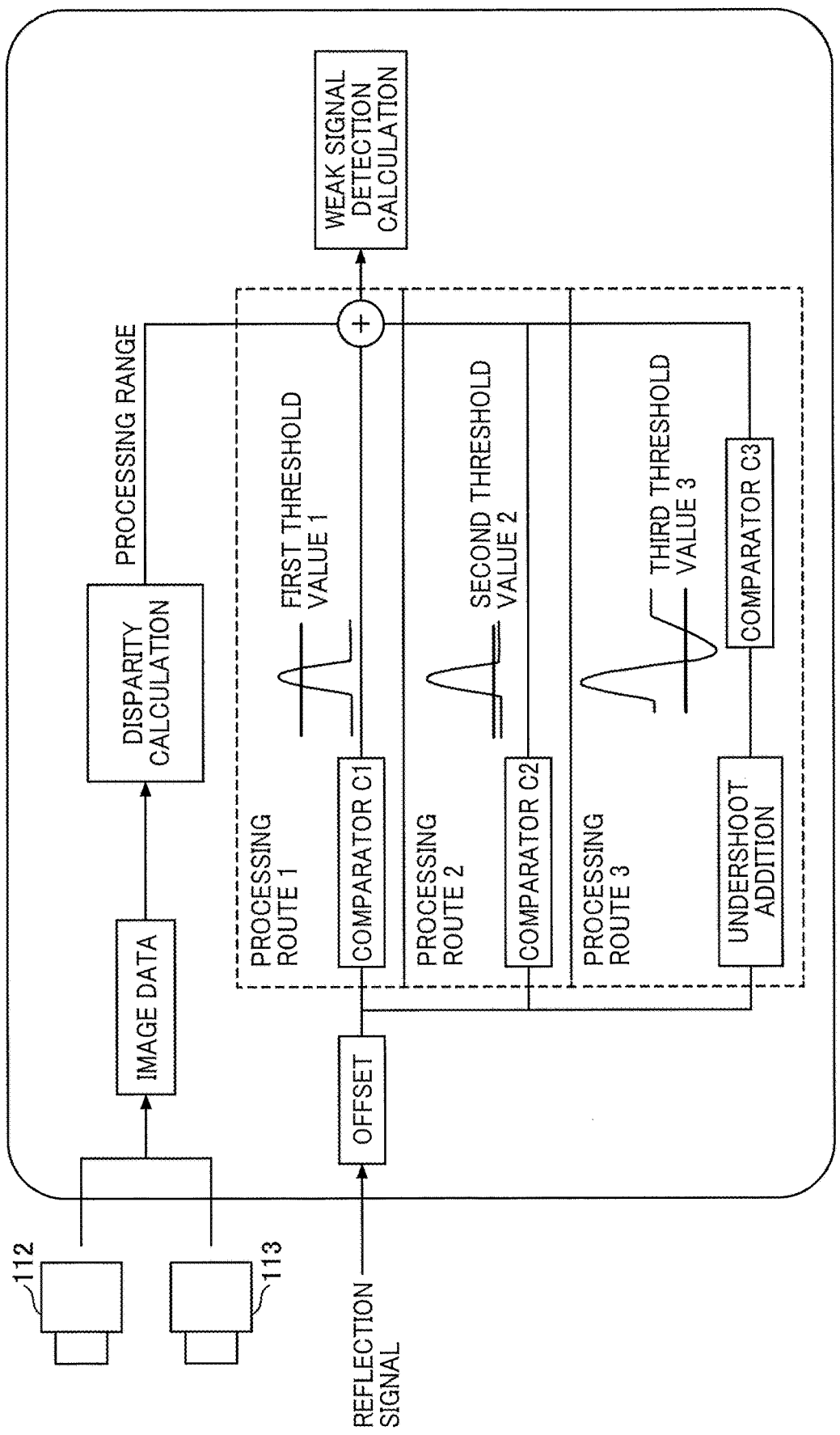
FIG. 23 illustrates an example of processing routes of reflection signal according to an embodiment.

FIG. 23 is a diagram illustrating examples of processing routes of reflection signal. As illustrated in FIG. 23, the laser radar ranging unit 120 includes comparators C1 and C2 (corresponding to the binarization circuit in FIG. 26) that binarize the reflection signals using different threshold values (processing routes 1 and 2). Since the processing routes 1 and 2 does not generate the undershoot, the separation performance of the objects lined in the row can be improved.

The laser radar ranging unit 120 also includes, for example, a processing route 3 that causes an undershoot in the reflection signal. The processing route 3 can be used to detect the weak signal existing with the surrounding noise signals.

Hereinafter, a description is given of a first threshold value and a second threshold value of the comparators C1 and C2 of the processing routes 1 and 2 with reference to FIG. 23. When determining the first threshold value and the second threshold value of the comparators C1 and C2 of the processing routes 1 and 2, the magnitude of noise signal is considered. The noise signal means any signal other than the intended target signal. In the embodiment, the noise signal is caused, for example, by background light and electrical noise. The background light noise occurs when ambient light (e.g., sunlight from west direction) enters in the light receiving optical system 30, and the electric noise signal may occur by thermal noise and shot noise of the electric circuit. Typically, the background light noise is greater than the electrical noise. Therefore, the first threshold value and the second threshold value are determined by considering the magnitude of the background light noise.

The first threshold value of the comparator C1 of the processing route 1 is set to, for example, a few times to several ten times of the noise signal because the first threshold value of the comparator C1 of the processing route 1 is used to detect a nearby object and/or an object having higher reflectance. For example, if the object locates at a nearby position or the object having higher reflectance locates at a slightly far position, these objects can be detected based on the processing of the processing route 1.

On the other hand, the second threshold value of the comparator C2 of the processing route 2 is set to a value slightly larger than the noise signal (e.g., 1.1 times to less than 2 times of the noise signal), or a value slightly smaller than the noise (e.g., 0.5 times to less than 1 time of the noise signal). Therefore, the second threshold value is set to a value of a few of the first threshold value, or a value of a few tenth of the first threshold value. The signal intensity of background light varies depending on time zones, seasons, regions, or the like. Therefore, it is preferable that the laser radar ranging unit 120 periodically monitors the signal intensity of background light without irradiating the laser light, and changes the second threshold value depending on the signal intensity of background light.

Thus, the second threshold can be used to detect the reflection signal existing with the surrounding noise signals, and can be used to detect an object that exists at a far side and/or an object having lower reflectance that exists at a slightly far position. The specific processing method of the reflection signal using the second threshold will be described later. As to conventional technologies, a threshold value used for detecting the reflection signal existing with the surrounding noise signals is not set.

Figure 24A:
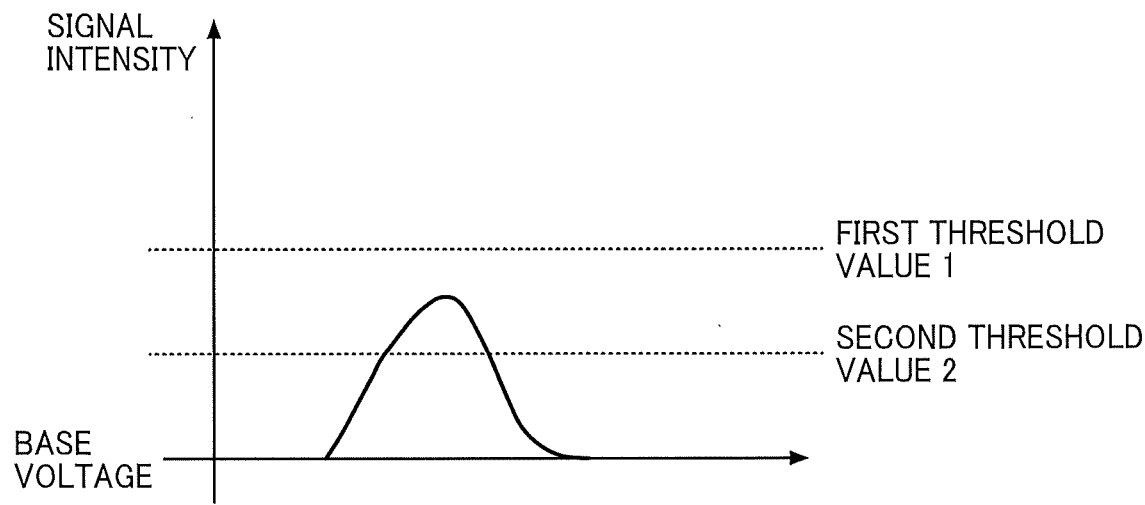
FIGS. 24A and 24B illustrate an examples of relationship between threshold values and a level of reflection signal according to an embodiment.

FIG. 24 illustrates examples of relationship between the threshold values and a level of reflection signal. FIG. 24A is an example of a diagram illustrating a relationship between the first threshold value and the second threshold value and the level of reflection signal. As illustrated in FIG. 24A, a peak of the reflection signal that cannot be detected using the first threshold value can be detected using the second threshold value.

Hereinafter, a description is given of a third threshold value of the processing route 3 with reference to FIG. 24B. Due to the generation of undershoot in the reflection signal, the third threshold value smaller than the base voltage can be set in the embodiment. That is, the waveform of undershoot portion can be detected using the third threshold value. By using the third threshold value, the system can determine whether the weak reflection signal existing with the surrounding noise signals is caused by the object or noise source.

Figure 24B:
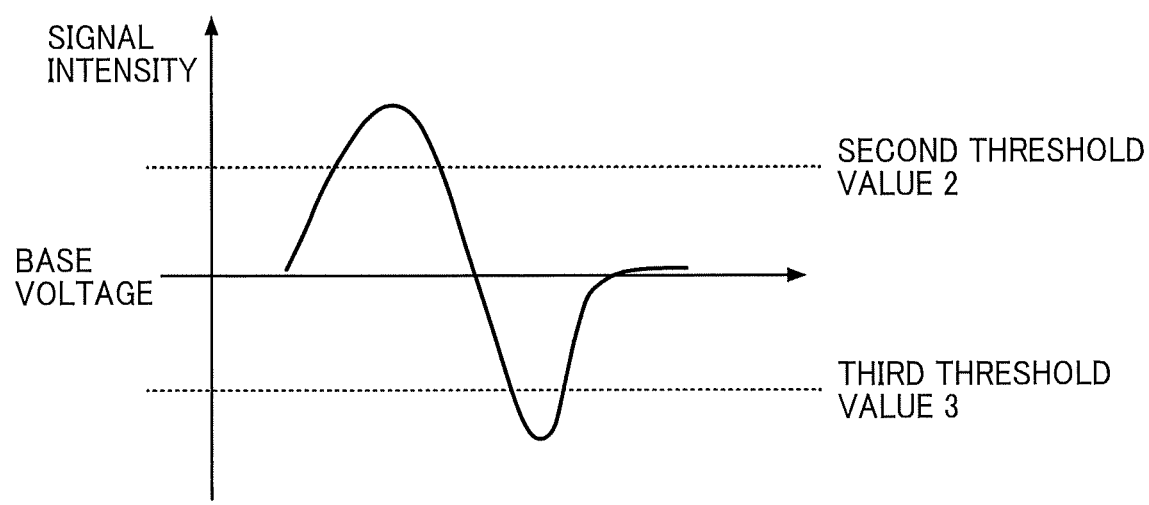

FIG. 24B is an example of a relationship between the reflection signal including the undershoot and the third threshold value that is set smaller than the base voltage. By setting the third threshold value appropriately, the reflection signal including the undershoot can be detected. The magnitude of third threshold value can be determined depending on how much amplitude is set for the weak reflection signal, existing with the surrounding noise signals, so that the undershoot portion becomes less than the base voltage. Therefore, the magnitude of third threshold value can be determined by the capacitor capacitance C, the resistance value R (one or two in the above example) of the CR circuit, and the level of the to-be-detected reflection signal. For example, the third threshold value can be set as "third threshold value=base voltage−second threshold value," and further the absolute value of third threshold value can be reduced or increased.

In an example case of FIG. 24B, the second threshold value set larger than the base voltage is also illustrated with respect to the reflection signal including the undershoot. The second threshold value is set for the processing route 2, and the processing routes 2 and 3 can set the base voltage between the second threshold value and the third threshold value. By disposing one comparator having one threshold value greater than the base voltage at one side of the base voltage and another comparator having another threshold value smaller than the base voltage at another side of the base voltage, the shape of signal can be detected efficiently, and the signal detection probability can be improved.

If the base voltage is zero (0), the second threshold value is set as a positive value, and the third threshold value is set as a negative value. Therefore, the second threshold value and the third threshold value may be referred to as a positive threshold value and a negative threshold value, respectively, but the third threshold can be set as a positive threshold value if the base voltage is set at a higher level.

Hereinafter, a description is given of the signal processing method according to the embodiment with reference to FIG. 25, in which the comparator C2 is disposed at the positive side of the reflection signal including the undershoot, and the comparator C3 is disposed at the negative side of the reflection signal including the undershoot. FIGS. 25A and 25B illustrate an effectiveness of detecting the signal using one comparator disposed at the positive side of the base voltage and another comparator disposed at the negative side of the base voltage.

Figure 25A:
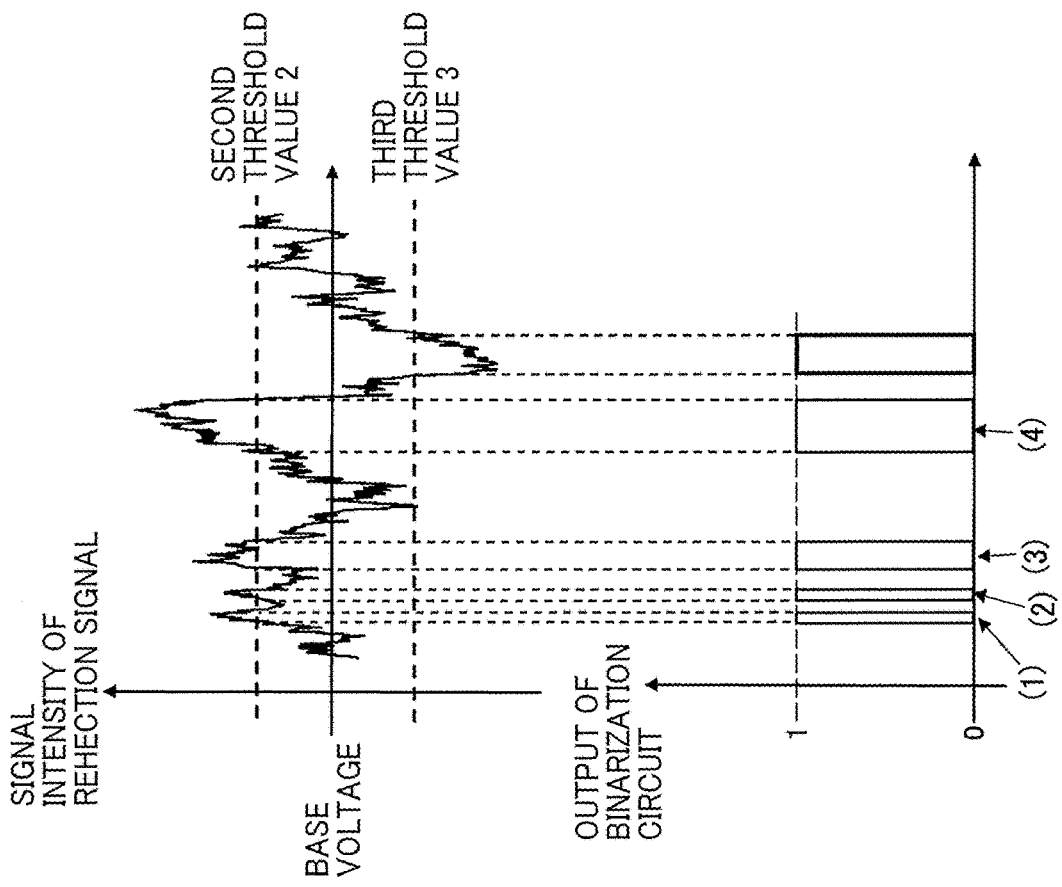
FIGS. 25A and 25B illustrate an effectiveness of detecting signals using one comparator disposed at a positive side of base voltage and another comparator disposed at a negative side of base voltage according to an embodiment.

FIG. 25A illustrates a reflection signal with less noise signals, and binarized signals. In FIG. 25A, the reflection signal equal to or greater than the second threshold value is binarized to "1" and the reflection signal equal to or less than the third threshold value is binarized to "1." Therefore, the reflection signal including the undershoot appears with a set of "1" binarized by the second threshold value and "1" binarized by the third threshold value.

Figure 25B:
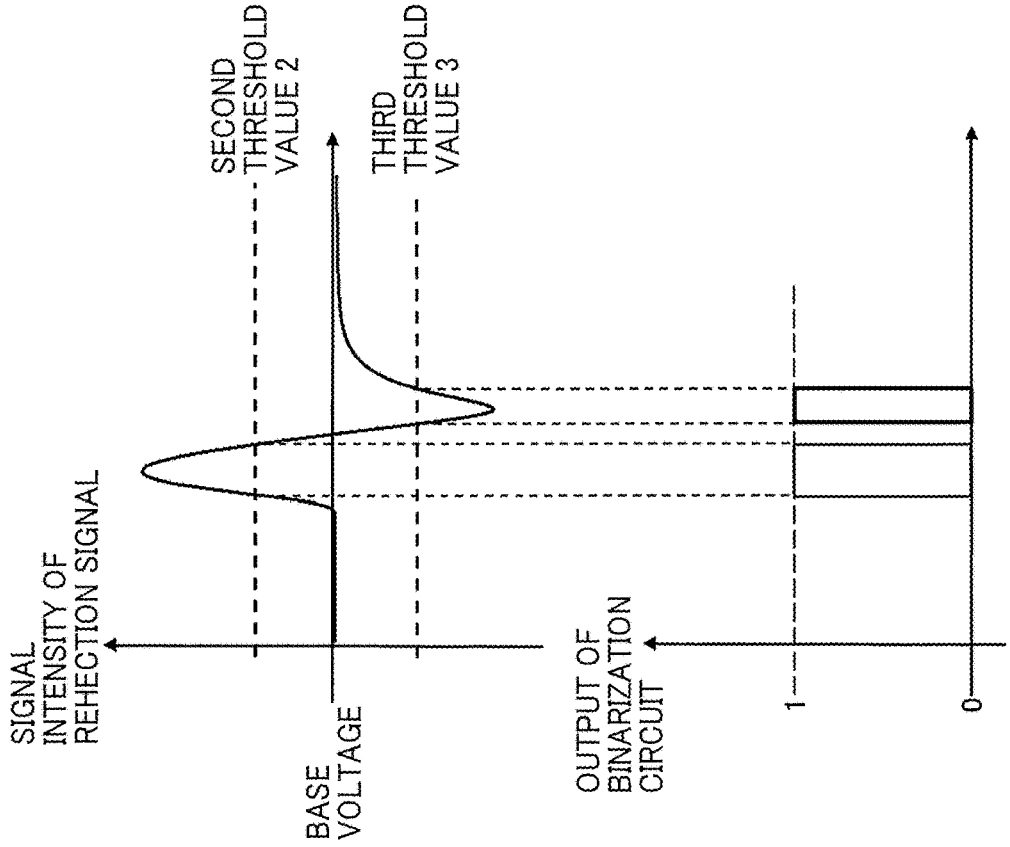

FIG. 25B illustrates a reflection signal having many noise signals, and binarized signals. The reflection signal equal to or greater than the second threshold value is binarized to "1" and the reflection signal equal to or less than the third threshold value is binarized to "1." Since many noise signals exist, the reflection signal is binarized as if there were four objects in the environment although the number of objects is actually one.

Conventionally, when the threshold value is reduced, the noise signal is erroneously detected as the object, and thereby the distance to the object cannot be accurately determined.

In the embodiment, by using the configuration of binarizing the reflection signal equal to or less than the third threshold value to "1," the system can determine which binarized signal represents the distance to the object. By disposing one comparator at the positive side and another comparator at the negative side of the reflection signal including the undershoot, even if many noise signals exist, the peak of the reflection signal caused by the object can be extracted.

(Configuration PD Output Detection Unit Having Three Processing Routes)

Figure 26:
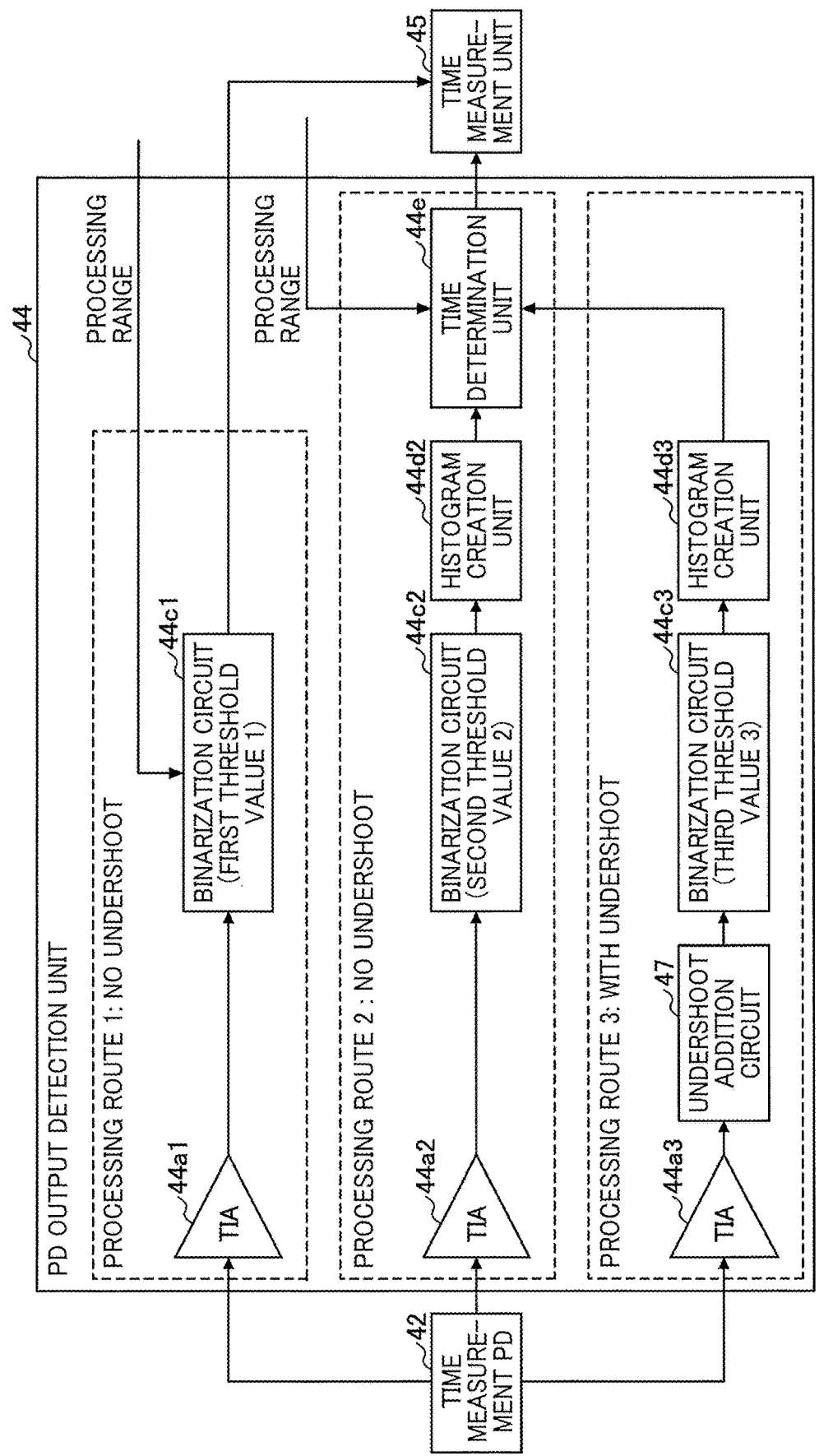
FIG. 26 illustrates an example of a configuration of a PD output detection unit, in which a comparator is set on each of positive and negative sides of reflection signal including undershoot according to an embodiment.

FIG. 26 illustrates an example of a configuration of the PD output detection unit 44, in which the comparator is set on each of the positive and negative sides of the reflection signal including the undershoot. As illustrated in FIG. 23, the PD output detection unit 44 of FIG. 26 includes three processing routes.

Processing route 1: no undershoot (first threshold value)
Processing route 2: no undershoot (second threshold value)
Processing route 3: with undershoot (third threshold value)

Since the processing route 1 has no undershoot processing and the first threshold value is a larger value, the processing route 1 is not suitable for detecting the distance to object from the weak reflection signal. However, the processing route 1 can be used to detect the peak corresponding to an object, such as the object locating at a nearby side, an object having higher reflectance locating at a slightly far side, and a plurality of objects lined in a row.

Since the processing route 2 has no undershoot processing and the second threshold is a smaller value, the processing route 2 can be used to detect the peak corresponding to an object, such as the object existing at a far side or an object having lower reflectance and existing at a slightly far side.

Further, the processing route 2 includes, for example, a histogram creation unit 44d2 (an example of first histogram creation unit) and a time determination unit 44e. The histogram creation unit 44d2 votes for the presence of object for the time (bin) in which the reflection signal is binarized to "1" using the binarization circuit 44c2 (an example of second binarization unit). The "bin" is a width (aggregated width) in which the frequency (the number of votes) is calculated along the time axis or timeline. Further, the creation of histogram requires to irradiate the laser light with "N" times, which will be described later. The frequency can be used as an indicator indicating that the reflection signal is coming from the object.

The time determination unit 44e performs the filtering, to be described later, based on a second histogram created by the histogram creation unit 44d3 (an example of second histogram creation unit) of the processing route 3, and a first histogram created by the histogram creation unit 44d2 of the processing route 2. That is, when the reflection signal binarized by the second threshold value that is greater than the base voltage and the reflection signal binarized by the third threshold value that is smaller than the base voltage have a given relationship, the time determination unit 44e determines the time when the reflection signal equal to or greater than the second threshold value is detected as the time (peak) of the reflection signal coming from the object. Thus, the reflection signal caused by the object existing with the surrounding noise signals is extracted and the correct position of the object can be estimated using the TOF.

The processing route 3 can detect an object, such as the object existing at a far side or the object having lower reflectance and existing at a slightly far side using a binarization circuit 44c3 (third binarization unit) set with the third threshold value having, for example, a negative value. Further, the processing route 3 includes, for example, a histogram creation unit 44d3. The histogram creation unit 44d3 votes for the existence of the object in the time (bin) in which the reflection signal is binarized to "1" using the binarization circuit 44c3.

Since the processing routes 2 and 3 set the comparators respectively at the positive and negative sides of the reflection signal including the undershoot, the signal caused by the object existing with the surrounding noise signals can be extracted.

The reflection signal not including the undershoot does not need to be a reflection signal not having any undershoot, but can be a reflection signal including a slight undershoot. That is, the slight undershoot is allowed if the reflection signal of each of the objects lined in the row can be separated.

The time measurement unit 45 measures the time to the object from the time when the signal is binarized to "1" by the processing route 1 and the correct position (time) of the object estimated by the time determination unit 44e. Therefore, the time (TOF) to the object at the nearby side (object with strong reflection signal) and the object at the far side (object with very weak reflection signal) can be measured. (Processing Routes 2 and 3)

Figure 27:
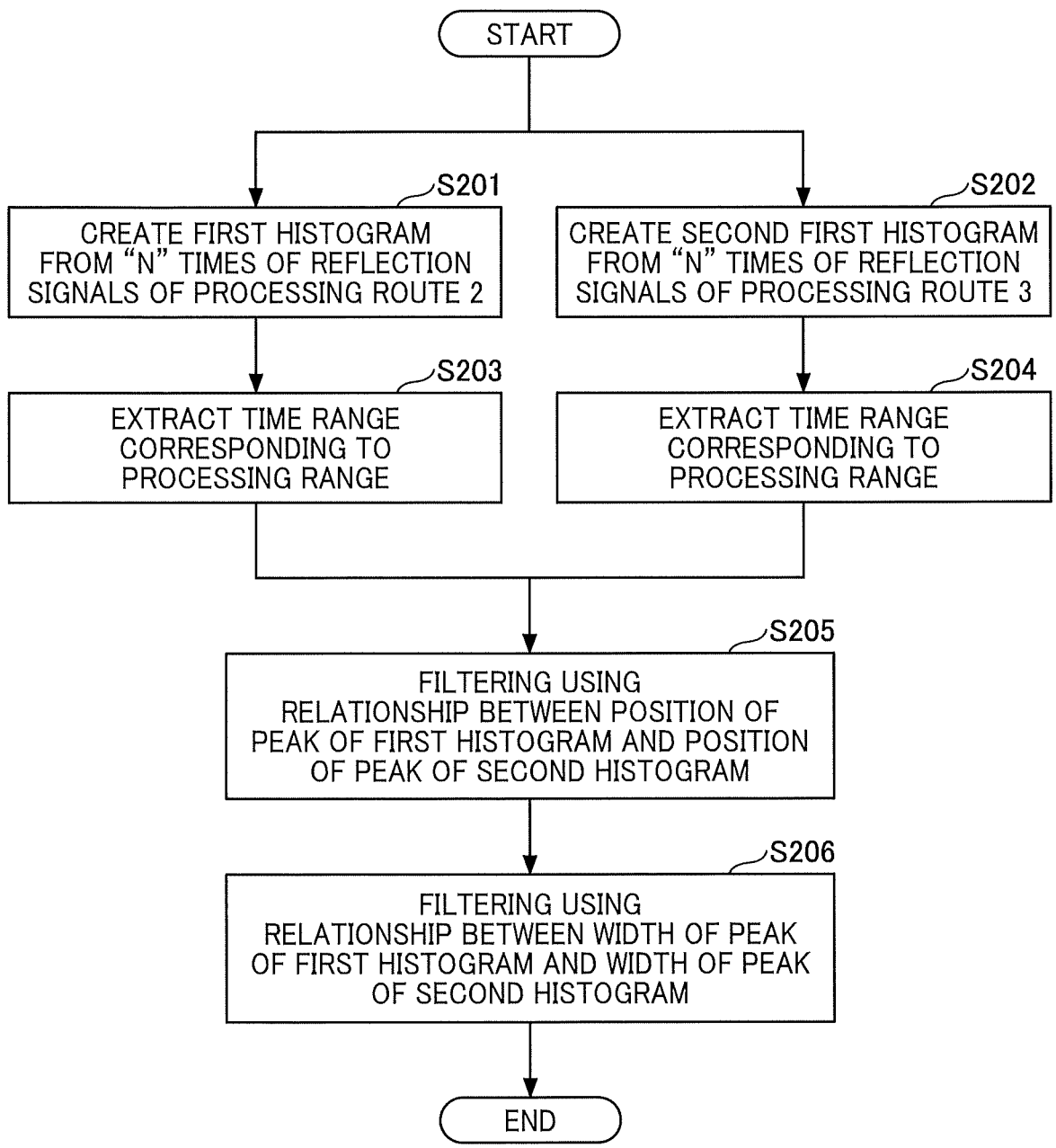
FIG. 27 is an example of a flowchart illustrating a procedure of processing of a histogram creation unit and a time determination unit according to an embodiment.

Hereinafter, a description is given of the processing of the processing routes 2 and 3 with reference to FIGS. 27 to 30 in detail. FIG. 27 is an example of a flowchart illustrating a procedure of processing of the histogram creation units 44d2 and 44d3, and the time determination unit 44e.

Steps S201 and S202: The histogram creation unit 44d2 creates a first histogram from "N" binarized signals, which are the signals that are binarized using the second threshold value, and the histogram creation unit 44d3 creates a second histogram from "N" binarized signals, which are the signals that are binarized using the third threshold value. The term of "N" denotes the number of irradiation times of laser light that is irradiated for creating the histogram.

FIG. 28 is a diagram schematically illustrating a creation processing of histogram. FIG. 28A illustrates a reflection signal acquired by a first-time laser irradiation before binarizing the reflection signal. FIG. 28B illustrates a reflection signal acquired by a second-time laser irradiation before binarizing the reflection signal. FIG. 28C illustrates the reflection signal acquired by the third-time laser irradiation before binarizing the reflection signal. The reflection signals illustrated in FIG. 28 include less noise signals for the convenience of explanation, but the actual waveform of reflection signal, which can be acquired at each moment, may include noise signals, which makes difficult to identify the reflection signal (see FIG. 19C).

The inventors have found that the reflection signal caused by the object can be separated from the noise signals by irradiating the laser light to the same object for a plurality of times for acquiring respective reflection signals, binarizing the respective reflection signals, and creating respective histograms because the frequency of the bins indicating the presence of object is increased.

Figure 28A:
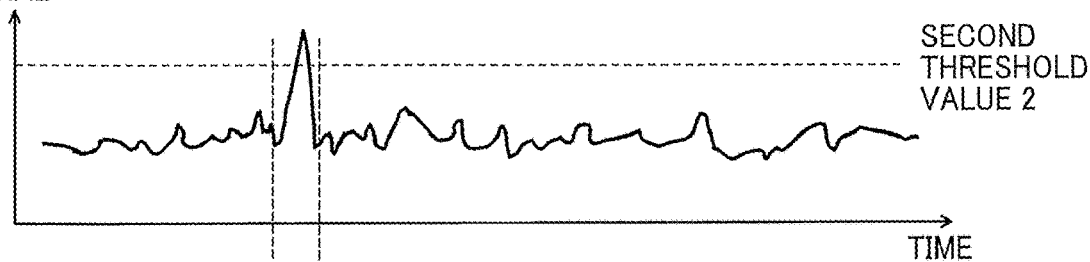
FIGS. 28A, 28B, 28C and 28D schematically illustrates a creation processing of histogram according to an embodiment.
Figure 28B:
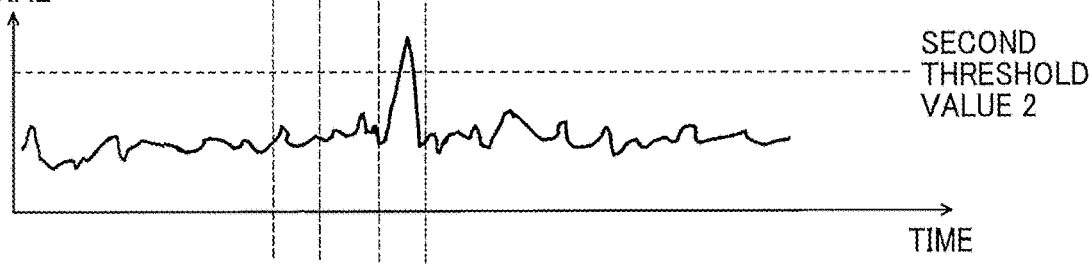
Figure 28C:
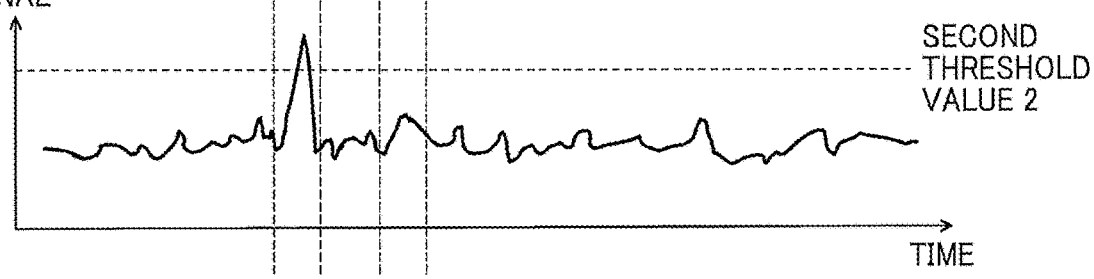
Figure 28D:
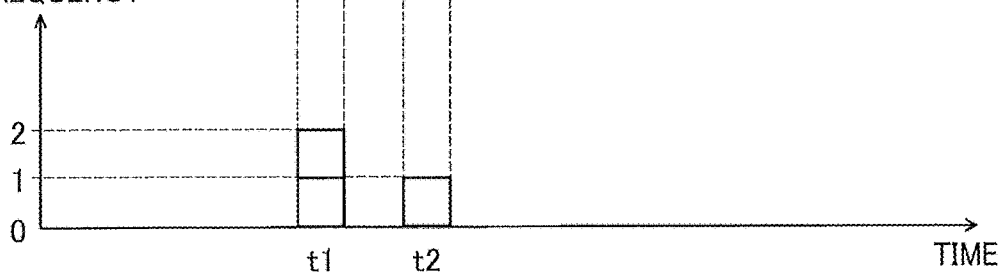

FIG. 28D is an example of a histogram, in which the vote for estimating the object position is set based on the value of "1" obtained by binarizing the respective reflection signals of FIGS. 28A, 28B, and 28C. In an example case of FIG. 28D, two is voted at time "t1" and one is voted at time "t2" as the estimated object positions.

Therefore, if the number of times of irradiating the laser light to the same object is increased, the histogram illustrated in FIG. 28D can be created, with which the distance to object can be estimated even if the magnitude of reflection signal coming from the object may be similar to the magnitude of surrounding noise signals (the reflection signal not distinguishable from the noise signals).

However, since the concerned object moves relative to the vehicle while the vehicle is traveling, it is difficult to irradiate a large number of laser lights to the same concerned object. Thus, in the embodiment, the peak of reflection signal reflected from the object is detected from the histogram created by irradiating the object with a practical number of irradiation times.

The number of irradiation times "N" of laser light is set to a practical number of irradiation times (e.g., less than 10 times), which is less affected by the relative speed of object, but can vary depending on the processing capability of the laser radar ranging unit 120.

The description continues for the sequence with reference to FIG. 27.

Steps S203 and S204: The time determination unit 44e extracts a time range corresponding to the processing range acquired from the stereo image processing unit 250.

Figure 29:
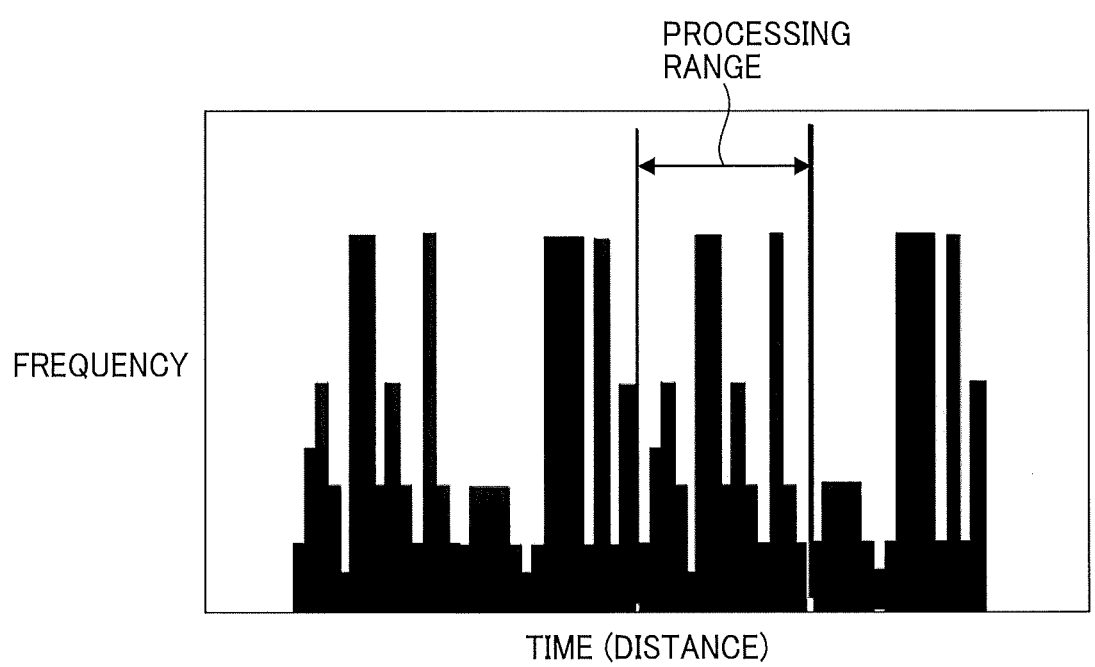
FIG. 29 illustrates an example of a relationship between a histogram and a processing range according to an embodiment.

FIG. 29 illustrates an example of a relationship between the histogram and the processing range. In an example case of FIG. 29, the histogram frequency becomes a maximum value at a plurality of times (distances). Therefore, it is difficult to uniquely identify the distance to object (target object). Therefore, at first, the time determination unit 44e determines a time information specified by the processing range in the histogram (the time information is equivalent to the distance information to object).

However, even in the processing range, the histogram frequency becomes the maximum value at a plurality of times (distances), and the correct distance to object is not obvious in the histogram. Even if the correct distance to object is not obvious in the histogram, the time determination unit 44e can filter the peak of the first histogram or the peak of the second histogram using the first histogram created using the second threshold value by the processing route 2 and the second histogram created using the third threshold value by the processing route 3.

Step S205: The time determination unit 44e filters the peak of the first histogram or the peak of the second histogram using a relationship between a position of the peak of the first histogram and a position of the peak of the second histogram. The details will be described with reference to FIG. 30.

Step S206: The time determination unit 44e filters the peak of the first histogram or the peak of the second histogram using a relationship between a width of peak of the first histogram and a width of peak of the second histogram. The details will be described with reference to FIG. 30.

By performing the filtering in steps S205 and S206, the distance to object can be estimated correctly even if it is difficult to irradiate a number of laser lights to the same object. Steps S205 and S206 can be performed from S205 to S206 or from S206 to S205, or only one of steps S205 and S206 may be performed. For example, by performing the filtering to the binarized signals including the noise signals illustrated in FIG. 25B, a set of "1" binarized by the second threshold value and "1" binarized by the third threshold value can be detected as illustrated in FIG. 25A.

Figure 30:
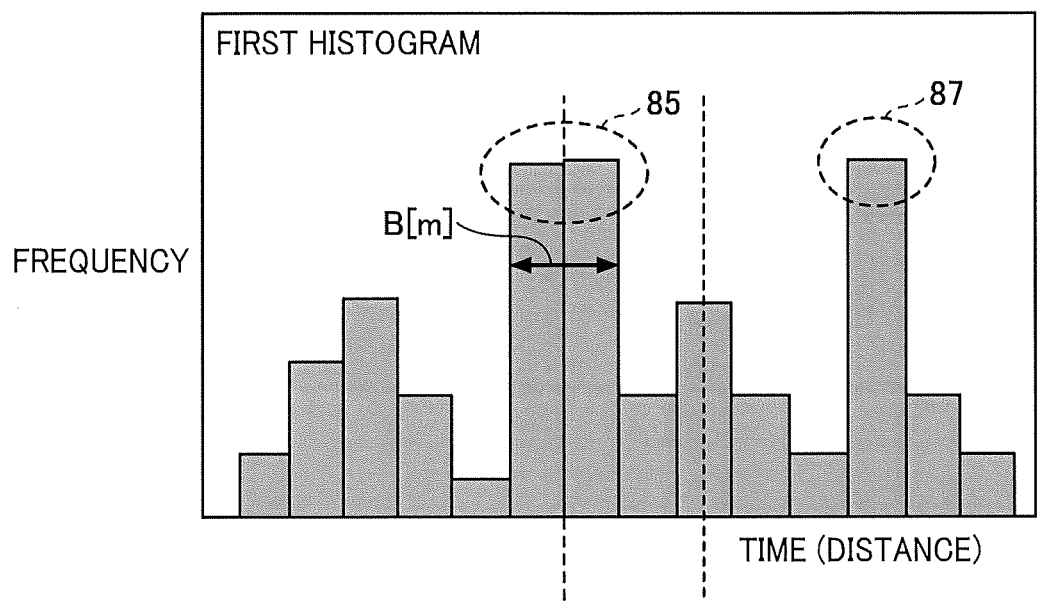
FIGS. 30A and 30B illustrate an example of a filtering processing according to an embodiment.

FIG. 30 illustrates an example of the filtering processing. FIG. 30 is a histogram illustrating the processing range alone from the histogram illustrated in FIG. 29. FIG. 30A illustrates a first histogram corresponding to a processing range acquired from the stereo image processing unit 250, and FIG. 30B illustrates a second histogram corresponding to a processing range acquired from the stereo image processing unit 250. The first histogram and the second histogram have a lot of noise signals, and the frequency takes the maximum value at a plurality of times (bins).

At first, the filtering processing in step S205 uses the positional relationship between a position of peak 85 of the first histogram acquired by using the second threshold value and a position of peak 86 of the second histogram acquired by using the third threshold value. In the filtering processing, the peak position is the center of the bin indicating the maximum value. If a plurality of consecutive bins indicates the maximum value, the center of the plurality of consecutive bins becomes the peak position.

If the peak 85 and the peak 86 are not the noise signals but are the reflection signals coming from objects, the peak 85 and the peak 86 appear spaced apart by a certain width, which is determined by a design value (e.g., A [m]) of the CR circuit. If a tolerance error of "e" [m] is set, the time determination unit 44e determines whether the peak 86 of the second histogram exists within a range of "A±e [m]" with respect to the peak 85 having the maximum frequency acquired from the first histogram. If the peak 86 of the second histogram does not satisfy this condition (the peak 86 does not exist within the range of "A±e [m]" with respect to the peak 85), the time determination unit 44e determines that the peak 86 of the second histogram is a noise signal.

The time determination unit 44e detects the peaks 86 and 88 in the second histogram, which respectively occur after the peaks 85 and 87 of the first histogram along the timeline. Then, the time determination unit 44e determines whether each peak of the second histogram exists within the range of "A±e [m]" with respect to the peak 85 in the order close from the peak 85. That is, the time determination unit 44e determines whether the peak 86 exists within the range of "A±e [m]" with respect to the position of the peak 85, or the peak 88 exists within the range of "A±e [m]" with respect to the position of the peak 85. If the peak of the second histogram is found within the range of "A±e [m]" with respect to the position of the peak 85 of the first histogram, the processing is terminated. If no peak of the second histogram is found within the range of "A±e [m]" with respect to the position of the peak 85, the same processing is performed using the peak 87.

As above described, if the peaks 85 and 87 of the first histogram and the peaks 86 and 88 of the second histogram satisfy the given condition determined by the design value of the undershoot addition circuit 47, the time determination unit 44e determines the peak 85 of the first histogram as a specific time when the reflection signal of the laser light reflected from the object exceeds the second threshold value. In an example case of FIG. 30, since the peak 85 and the peak 86 satisfy the given condition, the position of the peak 85 of the first histogram is determined as the specific time when the reflection signal of the laser light reflected from the object is received.

Further, the filtering processing in step S206 uses a relationship between a first width (B [m]) of the peak 85 of the first histogram acquired by using the second threshold value and a second width (C [m]) of the peak 86 of the second histogram acquired by using the third threshold value. Further, the peak 87 of the first histogram acquired by using the second threshold value has a third width, the peak 88 of the second histogram acquired by using the third threshold value has a fourth width. The design value of the CR circuit is set so that the second width of the peak 86 of the second histogram becomes wider than the first width of the peak 85 of the first histogram. Therefore, the time determination unit 44e determines whether a pair of the peak 85 of the first histogram and the peak 86 of the second histogram having a width relationship of "B<C" exists. If this condition of "B<C" is satisfied, the time determination unit 44e determines that the peak is the histogram of the object, and if this condition is not satisfied, the time determination unit 44e determines that the peak of the histogram is a noise signal.

The time determination unit 44e detects the peaks 86 and 88 in the second histogram, which respectively occur after the peaks 85 and 87 of the first histogram along the timeline. Then, the time determination unit 44e determines whether the width relation of "B<C" is satisfied for the peaks in the second histogram in the order close from the peak 85. The time determination unit 44e compares the first width of peak 85 and the second width of peak 86, then compares the first width of peak 85 and the fourth width of peak 88. If the peak that satisfies the width relation of "B<C" for the peak 85 is found in the second histogram, the processing is terminated. If the peak that satisfies the width relation of "B<C" for the peak 85 cannot be found in the second histogram, the same processing is performed using the peak 87 having the third width.

Thus, if the width of peak of the first histogram and the width of peak of the second histogram satisfy the given condition determined by the design value of the undershoot addition circuit 47, the time determination unit 44e determines the peak 85 of the first histogram as a specific time when the reflection signal of the laser light reflected from the object exceeds the second threshold value. In an example case of FIG. 30, since the peak 85 and the peak 86 satisfy this given condition, the position of the peak 85 of the first histogram is determined as the specific time when the reflection signal of the laser light reflected from the object is received.

Further, the peak 85 of the first histogram satisfying the given condition of step S205 alone may be subjected to the process in step S206. Further, the position of the peak satisfying any one of step S205 and step S206 alone may be determined as the specific time when the reflection signal of the laser light reflected from the object is received.

Further, the design value of the CR circuit can be set such that the width of the peak of the second histogram becomes narrower than the width of the peak of the first histogram ("B>C"). In this case, the time determination unit 44e determines whether a pair of the peak of the first histogram and the peak of the second histogram satisfying the width relationship of "B>C" exists. If the condition of "B>C" is satisfied, the time determination unit 44e determines that the peak of the histogram is caused by the object, and if the condition of "B>C" is not satisfied, the time determination unit 44e determines that the peak of the histogram is a noise signal.

Further, the first histogram and the second histogram may be statistical data of the rising position of the reflection signal alone, or statistical data of the falling position of the reflection signal alone. Alternatively, the histogram can be created from a pair of data of the rising position and the falling position of the reflection signal by smoothing the pair of data of the rising position and the falling position of the reflection signal by interpolating between the pair of data of the rising position and the falling position of the reflection signal. That is, it is not necessary to create the histogram over the entire timeline.

(Another Example of Histogram Creation Method)

When the comparator is disposed respectively to the positive and negative sides of the reflection signal including the undershoot and the distance to object is to be correctly detected, the first histogram and the second histogram may be created by setting the positive-side binarized signal and the negative-side binarized signal as one set instead of creating the first histogram and the second histogram separately.

Figure 31:
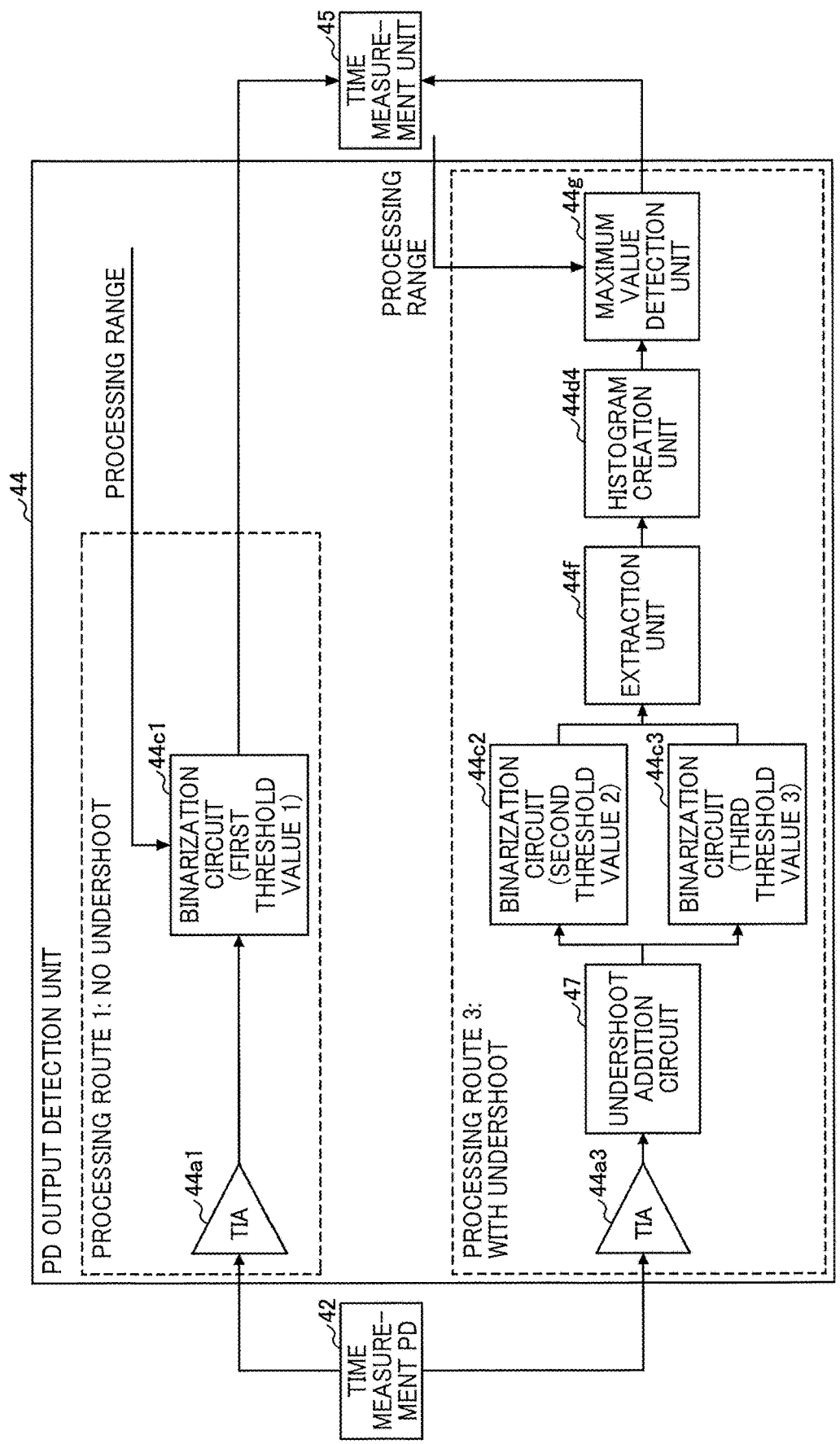
FIG. 31 illustrates an example of a configuration of a PD output detection unit having two processing routes according to an embodiment.

FIG. 31 illustrates an example of a configuration of the PD output detection unit 44 having two processing routes 1 and 3. In an example case of FIG. 31, the PD output detection unit 44 includes, for example, the processing route 1 and the processing route 3. The processing route 1 can be the same as in FIG. 26. On the other hand, in FIG. 31, the processing route 3 includes, for example, two binarization circuits 44c2 and 44c3, an extraction unit 44f, a histogram creation unit 44d4, and a maximum value detection unit 44g.

The binarization circuit 44c2 binarizes the reflection signal using the second threshold value, and the binarization circuit 44c3 binarizes the reflection signal using the third threshold value. Then, the extraction unit 44f determines whether the reflection signal equal to or greater than the second threshold value and the reflection signal equal to or less than the third threshold value are continuous along the timeline. The reflection signals are not required to be completely continuous. It is suffice if the reflection signal equal to or less than the third threshold value is detected within a pre-set time period after the reflection signal equal to or greater than the second threshold value is detected.

If the extraction unit 44f determines the reflection signal equal to or greater than the second threshold value and the reflection signal equal to or less than the third threshold value are continuous along the timeline, the histogram creation unit 44d4 votes that an object exists at a specific time when the reflection signal equal to or greater the second threshold value is detected. The histogram creation unit 44d4 (an example of third histogram creation unit) creates one histogram (third histogram) based on the "N" reflection signals acquired for the "N" times of laser irradiation.

Figure 32A:
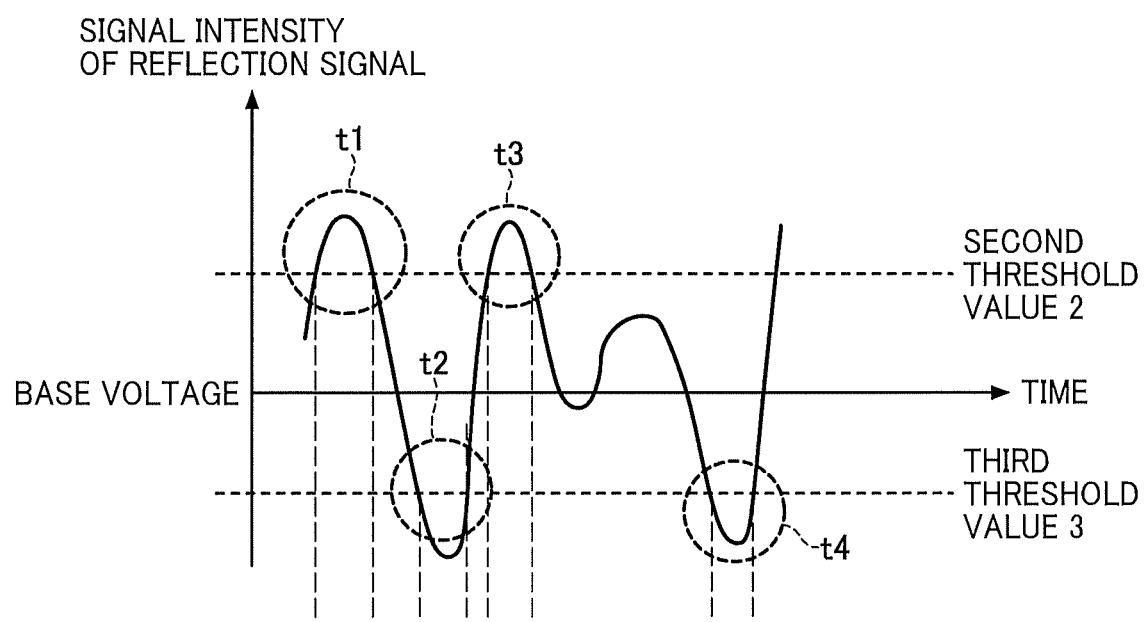
FIGS. 32A and 32B illustrate an example of a histogram created by a histogram creation unit of FIG. 31 according to an embodiment.
Figure 32B:
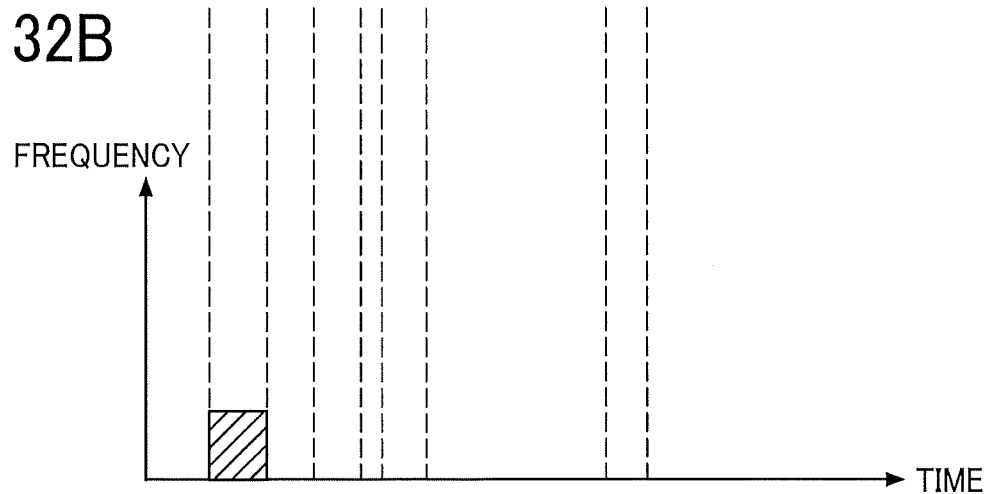

FIG. 32 illustrates an example of a histogram created by the histogram creation unit 44d4 of FIG. 31. FIG. 32A schematically illustrates a reflection signal, and FIG. 32B illustrates a histogram. At time "t1", the reflection signal becomes equal to or greater than the second threshold value, and at the time "t2", the reflection signal becomes equal to or less than the third threshold value. Since the time "t1" and the time "t2" are continuous or consecutive (within a given time period), the histogram frequency is increased by one at the time "t1".

On the other hand, at the time "t3", the reflection signal becomes equal to or greater than the second threshold value, and at the time "t4" the reflection signal becomes equal to or less than the third threshold value. But, since the time "t3" and the time "t4" are not continuous (not within the given time period), the histogram frequency is not increased at the time "t3" (or time "t4").

Referring back to FIG. 31, the maximum value detection unit 44g detects the time indicating the frequency of the maximum value, and transmits the detected time to the time measurement unit 45. In the method illustrated in FIG. 32, if one signal level exceeds the second threshold value, and a next signal level right-after the one signal level becomes the third threshold value or less, the reflection signal is determined as non-noise signal with a higher probability, in which the distance to object can be measured without considering the design value of the CR circuit. However, the design value of the CR circuit can be considered.

FIG. 33 is an example of a flowchart illustrating a procedure of processing by the PD output detection unit 44 employed for the configuration illustrated in FIG. 31.

Step S301: The extraction unit 44f extracts a reflection signal that is equal to or less than the third threshold value, which continues from a reflection signal that becomes equal to or greater than the second threshold value along the timeline.

Step S302: Then, the histogram creation unit 44d4 creates a histogram using the extraction result of the reflection signal obtained in step S301 by irradiating the laser light for "N" times.

Step S303: Then, the maximum value detection unit 44g acquires, from the histogram, a time range corresponding to the processing range acquired from the stereo image processing unit 250.

S304: Then, the maximum value detection unit 44g determines a specific time in which the frequency becomes the maximum value in the processing range.

In the configuration of FIG. 31, the histogram may be voted at the rising position of the reflection signal corresponding to the second threshold value alone (a position crossing the second threshold value from below to above of the second threshold value), or at the falling position of the reflection signal corresponding to the third threshold value alone (a position crossing the third threshold value from above to below of the third threshold value). Alternatively, the histogram can be created from a pair of data of the rising position crossing the second threshold value and the falling position of the reflection signal crossing the third threshold value by smoothing the pair of data of the rising position and the falling position of the reflection signal by interpolating between the pair of data of the rising position and the falling position of the reflection signal.

(Issue Caused by Undershoot Processing)

As described above, the undershoot processing is effective in measuring the distance to the object from the weak reflection signal, but the undershoot processing may cause inconvenience. That is, when the undershoot signal is generated in the reflection signal, it becomes difficult to separate each one of objects lined in a row. The objects lined in the row means that a plurality of objects (e.g., person and vehicle) exist in the row in the same direction when viewed from the laser radar ranging unit 120.

Figure 34:
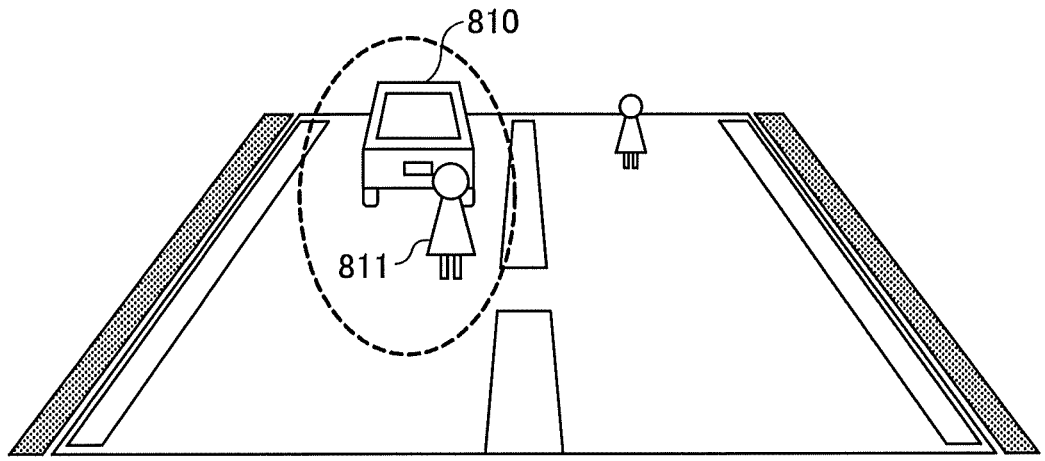
FIG. 34 is a diagram illustrating an example of objects lined in a row.

FIG. 34 illustrates an example of objects lined in the row when viewed from the laser radar ranging unit 120. In an example case of FIG. 34, since a pedestrian 811 exists at the rear side of a vehicle 810, the pedestrian 811 and the vehicle 810 are lined in the row when viewed from the laser radar ranging unit 120. When the distance between a plurality of objects lined in the row is close one another, the undershoot of a reflection signal of a nearby object and the undershoot of a reflection signal of a far-side object may overlap, resulting in the distortion of shape of reflection signal.

Figure 35:
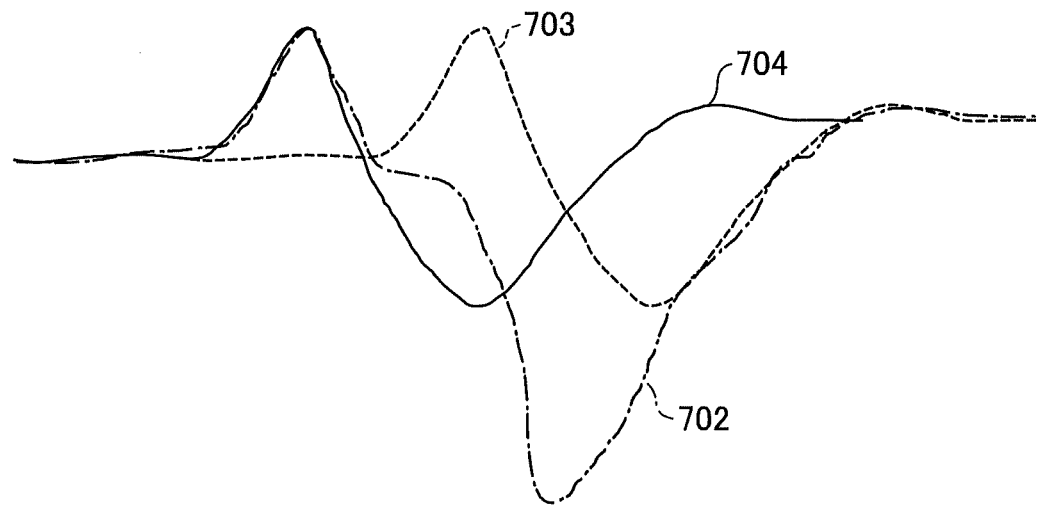
FIG. 35 illustrates an example of reflection signals of objects lined in a row having received a undershoot processing according to an embodiment.

FIG. 35 illustrates an example of reflection signals of objects lined in the row having received the undershoot processing. FIG. 35 is an example of reflection signals illustrating a disadvantage of the undershoot-processed reflection signal, which are different from reflection signals used for the correct objection detection. As illustrated in FIG. 35, a peak of a reflection signal 703 of the vehicle 810 and a undershoot portion of a reflection signal 704 of the pedestrian 811 cancel with each other, resulting into a loss of the peak of the reflection signal 703 of the vehicle 810. That is, the peak of the reflection signal 703 of the vehicle 810 (i.e. far-side object) may be completely lost, and the shape of a reflection signal 702 acquired resultantly becomes greatly different from the desired reflection signal.

As described above, in the embodiment, since the processing route 1 does not perform the undershoot processing, the processing route 1 is not suitable for detecting the peak corresponding to the object using extremely weak reflection signals, but the processing route 1 is suitable for detecting the peak corresponding to each one of objects lined in the row.

(Procedure)

Figure 36:
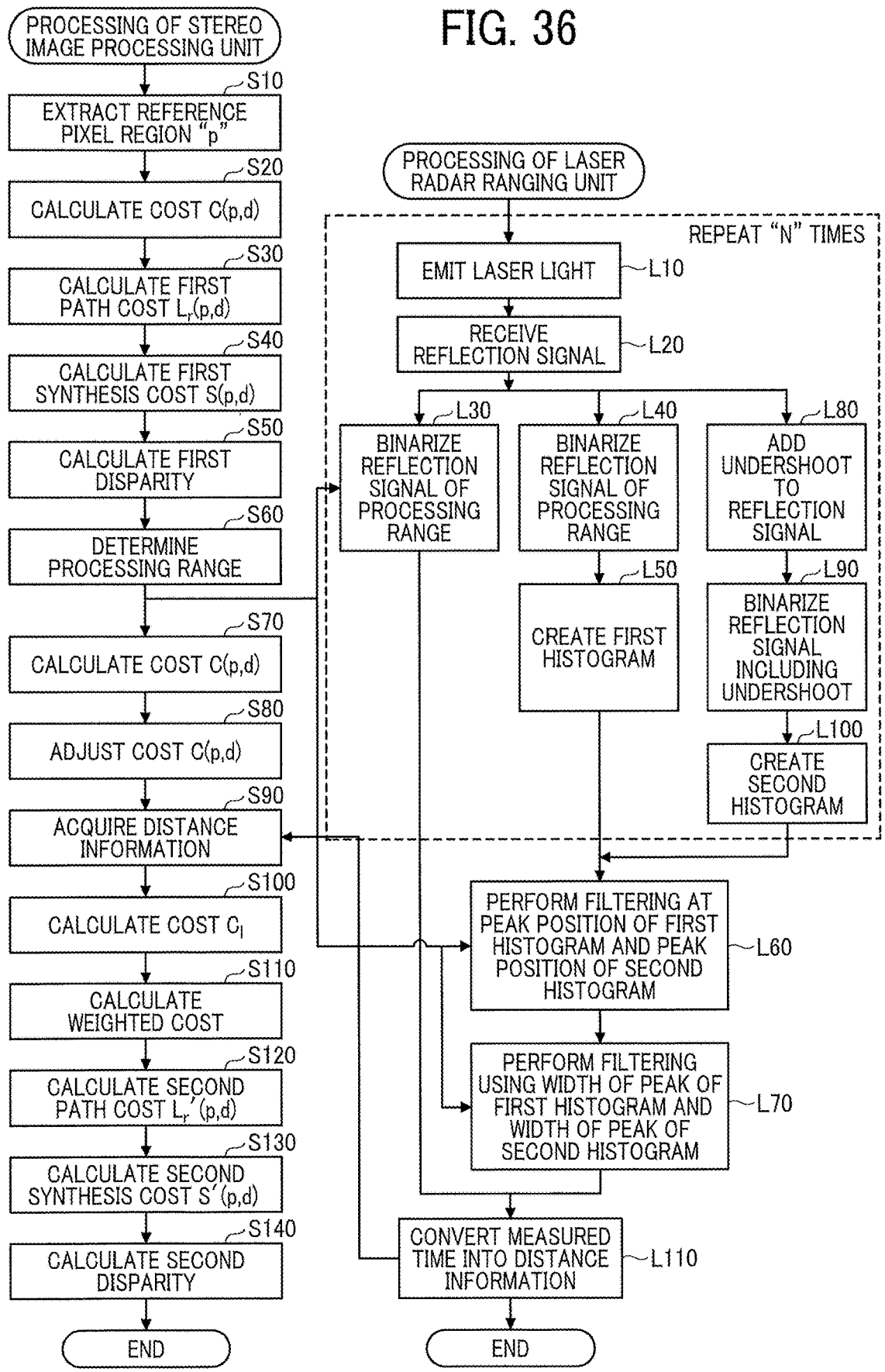
FIG. 36 is an example of a flowchart illustrating a flow of process of generating disparity image using a stereo image processing unit and a laser signal processing unit according to an embodiment.

FIG. 36 is an example of a flowchart illustrating a flow of process of generating disparity images using the stereo image processing unit and the laser signal processing unit. The flowchart of FIG. 36 illustrates the processing of calculating the disparity of one reference pixel region "p" corresponding to the irradiation position where the laser light is irradiated by the laser radar ranging unit 120. Therefore, when generating the disparity images, the stereo image processing unit 250 and the laser signal processing unit 240 perform the processing of the flowchart illustrated in FIG. 36 for each reference pixel region.

Hereinafter, a description is given of the processing of the stereo image processing unit 250 with reference to FIG. 36.

The reference image acquisition unit 801 acquires the reference image "Ib" and then extracts the reference pixel region "p" (step S10).

Then, the cost C calculation unit 803 calculates the cost C(p,d) based on a pixel value of the specific pixel region 511 corresponding to the position of the shift amount "d" in the comparative image "Ia" acquired by the comparative image acquisition unit 802 and a pixel value of the reference pixel region "p" (step S20).

Then, the first path cost calculation unit 1001 calculates each of the first path cost Lr(p,d) based on the cost C(p,d) (step S30).

Then, the first synthesis cost S calculation unit 1002 calculates the first synthesis cost S(p,d) based on each of the first path cost Lr(p,d) (step S40).

Then, the first disparity calculation unit 713 calculates the shift amount (first disparity) in which the first synthesis cost S(p, d) becomes the minimum (step S50). Then, the first disparity calculation unit 713 extracts the corresponding pixel region from the comparative image "Ia," and acquires a calculation result of disparity (first disparity) of the extracted corresponding pixel region and the reference pixel region "p."

Further, to perform the calculation faster or perform the calculation in simple manner, the block matching alone may be performed (the processing up to step S20 alone is performed). Alternatively, the machine learning (deep learning) can be used for performing the calculation faster or performing the calculation in simple manner.

Then, the range determination unit 714 determines the processing range to be used by the laser signal processing unit 240 for processing the received laser light signal, based on a result of the disparity calculation (step S60). Further, the range determination unit 714 notifies the determined processing range to the laser signal processing unit 240.

Thus, the laser signal processing unit 240 detects a signal indicating reflection from the object, and calculates the distance information "$Z_l$" to the object.

Then, the cost C calculation unit 1403 calculates the cost C(p,d) based on the pixel value of the specific pixel region 511 corresponding to the position of the shift amount "d" in the comparative image "Ia" acquired by the comparative image acquisition unit 1402 and the pixel value of the reference pixel region "p" (step S70).

Then, the cost C adjustment unit 1404 adjusts the calculated cost C(p,d) based on the reliability Q(p) to calculate the adjusted cost C'(p,d) (step S80).

Then, the distance information acquisition unit 1411 acquires, from the laser radar ranging unit 120, the distance information "$Z_l$" indicating the distance to object in a real space corresponding to the position of the reference pixel region "p" (step S90).

Then, the cost $C_l$ calculation unit 1412 calculates the cost Cl based on the distance information "$Z_l$" acquired by the distance information acquisition unit 1411 (step S100).

Then, the weight addition unit 1420 adds a weight to the adjusted cost C'(p,d) calculated by the cost C adjustment unit 1404, and the cost $C_l$(p,d) calculated by the cost $C_l$ calculation unit 1412 to calculate a weighted cost (step S110).

Then, the second path cost calculation unit 1501 calculates each of the second path cost Lr'(p,d) using the weighted cost (step S120).

Then, the second synthesis cost S' calculation unit 1502 calculates the second synthesis cost S'(p,d) based on each of the second path cost Lr'(p,d) (step S130).

Then, the second disparity calculation unit 723 calculates the shift amount "dmin," where the second synthesis cost S'(p,d) becomes the minimum, to extract the corresponding pixel region from the comparative image "Ia" (step S140). Then, the second disparity calculation unit 723 acquires a re-calculation result of disparity (second disparity) of the extracted corresponding pixel region and the reference pixel region "p."

Hereinafter, a description is given of the processing of the laser radar ranging unit 120 with reference to FIG. 36.

The irradiation optical system 20 irradiates or emits the laser light, such as a pulse light (step L10).

Then, the light receiving optical system 30 receives light, including a reflection light of an object and other light (step L20).

Then, the processing routes 1 to 3 of the PD output detection unit 44 process the reflection signals in parallel. At first, the current voltage converter 44a3 of the processing route 3 converts the current of reflection signal into a voltage signal, and then the undershoot addition circuit 47 adds the undershoot to the reflection signal (step L80).

Further, the current voltage converter 44*al* of the processing route 1 converts the current of reflection signal into a voltage signal, and then the binarization circuit 44*c*1 (first binarization unit) of the processing route 1 binarizes the reflection signal in the processing range of the processing route 1 (step L30).

Further, the current voltage converter 44*a*2 of the processing route 2 converts the current of reflection signal into a voltage signal, and then the binarization circuit 44*c*2 of the processing route 2 binarizes the reflection signal in the processing range of the processing route 2 (step L40). The processing range can be determined at this stage.

Then, the histogram creation unit 44*d*2 of the processing route 2 creates a first histogram from the binarized signals obtained by binarizing the reflection signal (step L50).

Since the similar processing is also performed in the processing route 3, the current voltage converter 44*a*3 of the processing route 3 converts the current of reflection signal into a voltage signal, and then the binarization circuit 44*c*3 of the processing route 3 binarizes the reflection signal including the undershoot (step L90). The processing range can be determined at this stage.

Then, the histogram creation unit 44*d*3 of the processing route 3 creates a second histogram from the binarized signals obtained by binarizing the reflection signal (step L100). The processing in steps L10 to L100 (excluding L60 and L70) is repeated for "N" times.

Then, while considering the processing range, the time determination unit 44*e* of the processing route 2 performs the filtering at a peak position of the first histogram of the processing route 2 and a peak position of the second histogram of the processing route 3 as described above (step L60).

Further, while considering the processing range, the time determination unit 44*e* of the processing route 2 performs the filtering using a width of the peak of the first histogram of the processing route 2 and a width of the peak of the second histogram of the processing route 3 (step L70). The time that is filtered by performing the filtering in steps L60 and/or L70 become the TOF of the laser light reflected from the object. Further, the filtering can be performed using at least any one of steps L60 and L70 alone.

Then, the time measurement unit 45 converts the measured time (TOF) into the distance information "$Z_i$" (step L110). Then, the laser signal processing unit 240 transmits the distance information "$Z_i$" and the irradiation direction of the laser light to the stereo image processing unit 250. For example, if an object exists at the nearby side, the time obtained by the processing route 1 (TOF) is converted into the distance information "$Z_i$", and if an object exists at the far side, the time obtained by the processing route 2 (TOF) is converted into the distance information "$Z_i$." Further, if a plurality of objects exists in the same direction, the time can be measured for the number of objects.

Further, the method of reflecting the LiDAR detection result into the disparity can use the method illustrated in FIG. 36 and other methods. The other methods will be described later with reference to FIGS. 38 and 39.

(Procedure)

Figure 37:
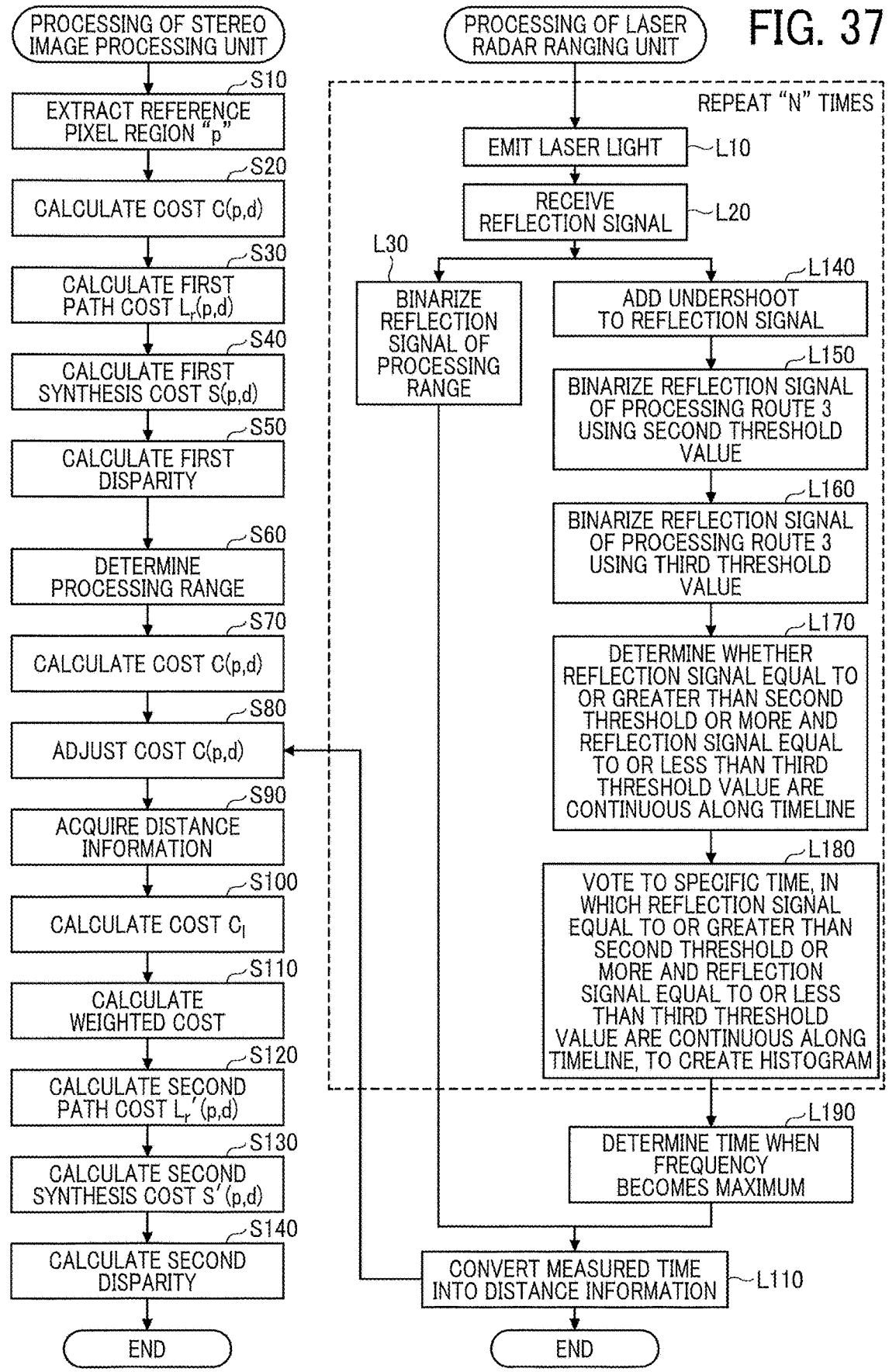
FIG. 37 is another example of a flowchart illustrating a flow of process of generating disparity image using a stereo image processing unit and a laser signal processing unit according to an embodiment.

Hereinafter, a description is given of the operation procedure of the PD output detection unit 44 having the configuration of FIG. 31 with reference to FIG. 37. FIG. 37 is another example of a flowchart illustrating a flow of process of generating the disparity images using the stereo image processing unit and the laser signal processing unit. In the description of FIG. 37, the difference from FIG. 36 will be described.

In FIG. 37, the processing of the processing route 3 differs from the processing of the processing route 3 in FIG. 36.

The current voltage converter 44*a*3 of the processing route 3 converts the current of reflection signal into a voltage signal, and then the undershoot addition circuit 47 adds an undershoot to the reflection signal (step L140).

Then, the binarization circuit 44*c*2 of the processing route 3 binarizes the reflection signal of the processing route 3 using the second threshold value (step L150).

Similarly, the binarization circuit 44*c*3 binarizes the reflection signal of the processing route 3 using the third threshold value (step L160).

Then, the extraction unit 44*f* of the processing route 3 determines or identifies a specific time in which a reflection signal equal to or greater than the second threshold and a reflection signal equal to or less than the third threshold value are continuous along the timeline (step L170).

Then, the histogram creation unit 44*d*4 of the processing route 3 votes to the specific time (bin), in which the reflection signal equal to or greater than the second threshold and the reflection signal equal to or less than the third threshold value are continuous along the timeline, to create a histogram (step L180). The processing in steps L10 to L180 is repeated for "N" times.

Then, the maximum value detection unit 44*g* determines a specific time when the frequency becomes the maximum value (step L190). The subsequent processing is the same as in FIG. 36.

(Another Method of Reflecting LiDAR Detection Result to Disparity)

In an example case of FIG. 16, the weight addition unit 1420 performs the fusion by adding the weight to the distance information of the laser radar ranging unit 120 and the cost of the stereo image processing unit 250, but is not thereto. For example, the detection result of the laser radar ranging unit 120 can be fused with the cost of the stereo image processing unit 250 converted into the distance space.

Figure 38:
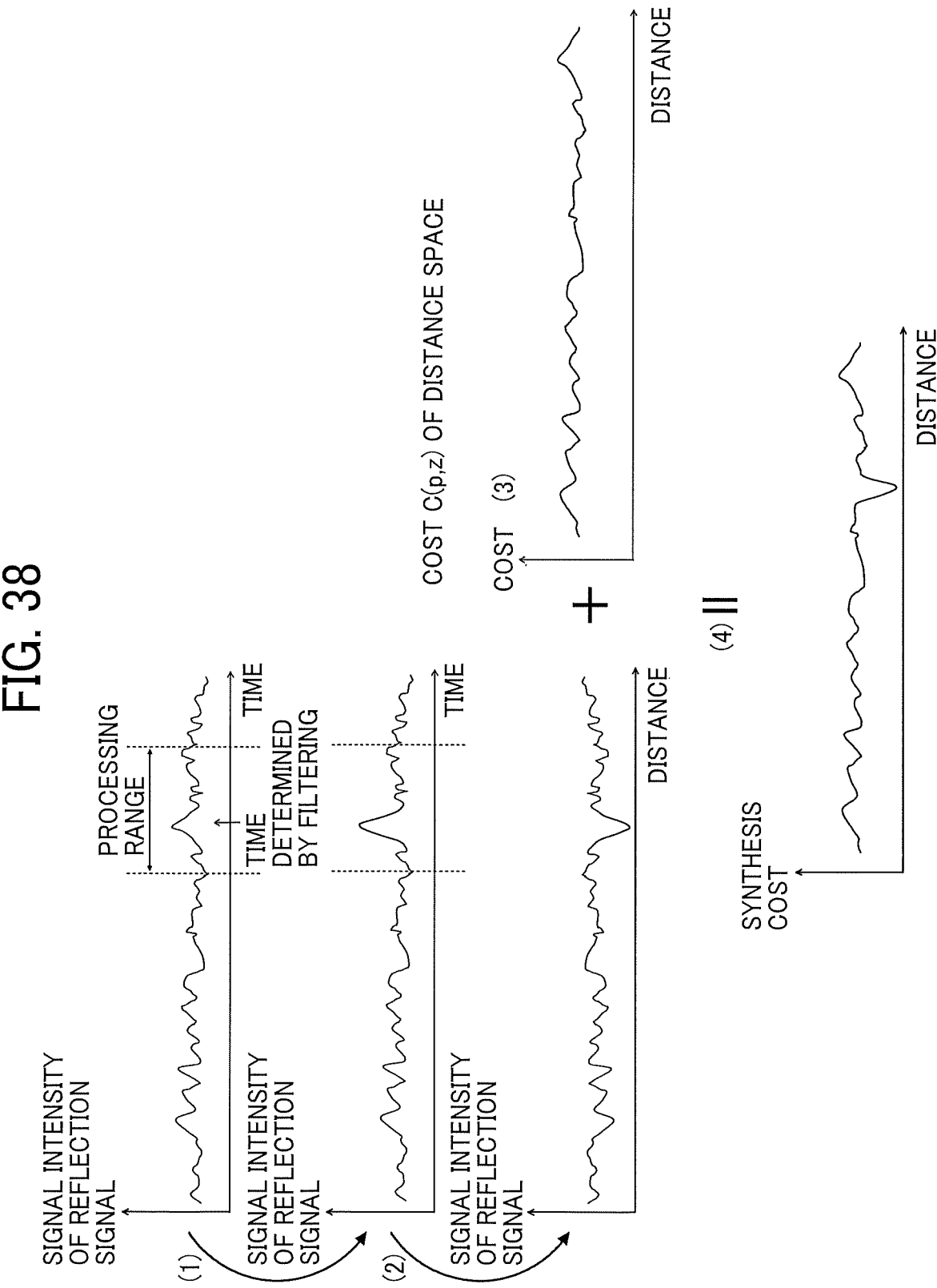
FIG. 38 illustrates an example of method of calculating a disparity based on a distance space according to an embodiment.

FIG. 38 illustrates an example of method of calculating the disparity based on a distance space.

(1) When the time can be determined by the filtering performed in steps L60 and L70 in FIG. 36, the laser signal processing unit 240 increases the reflection signal at the corresponding time intentionally. The reflection signal may be analog signal or digital signal.

(2) Then, the laser signal processing unit 240 reverses the reflection signal up and down. That is, original values of the reflection signal are converted into values that are symmetrical with respect to a given reference value (e.g., mean value, base voltage). At this time, the time axis is converted into the distance axis.

(3) Then, the stereo image processing unit 250 converts the cost $C(p,d)$ of the disparity space calculated from the stereo image into the cost $C(p,z)$ of the distance space.

(4) Then, the stereo image processing unit 250 acquires or obtains the synthesis cost by adding the analog signal of (2) and the cost $C(p,z)$ of (3).

By finding the minimum value of the synthesis cost, the disparity can be obtained.

Figure 39:
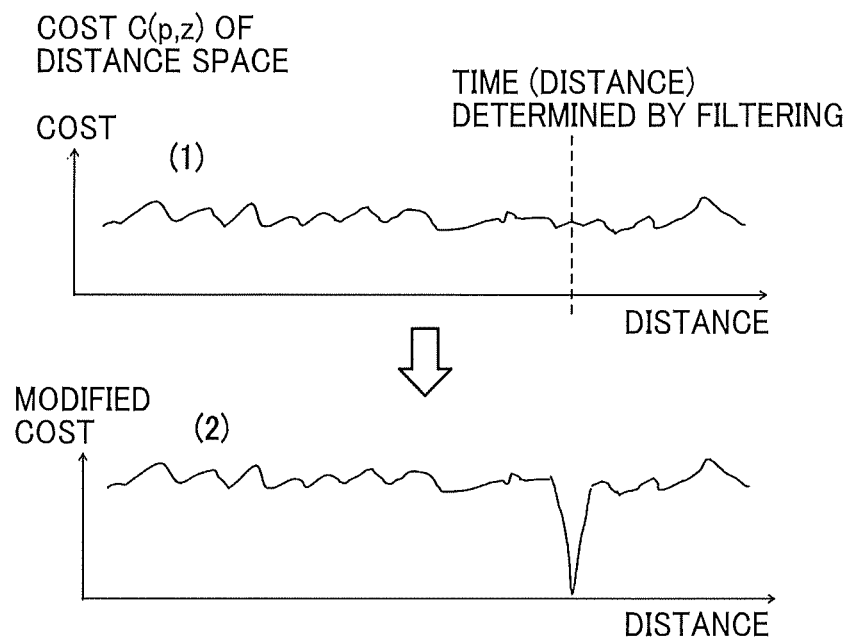
FIG. 39 illustrate another example of method of calculating disparity based on a distance space, which is a simple method.

FIG. 39 illustrates another example of method of calculating the disparity based on a distance space, which is a simple method.

(1) The stereo image processing unit 250 converts the cost $C(p,d)$ of the disparity space calculated from the stereo image into the cost $C(p,z)$ of the distance space.

(2) Then, the stereo image processing unit 250 reduces the cost value for a pre-set value at a distance of the cost $C(p,z)$ corresponding to the specific time determined by the filtering in steps L60 and L70 to obtain a modified cost. By finding the minimum value of the modified cost, the disparity can be obtained.

(Example of Mounting on Vehicle)

Figure 40:
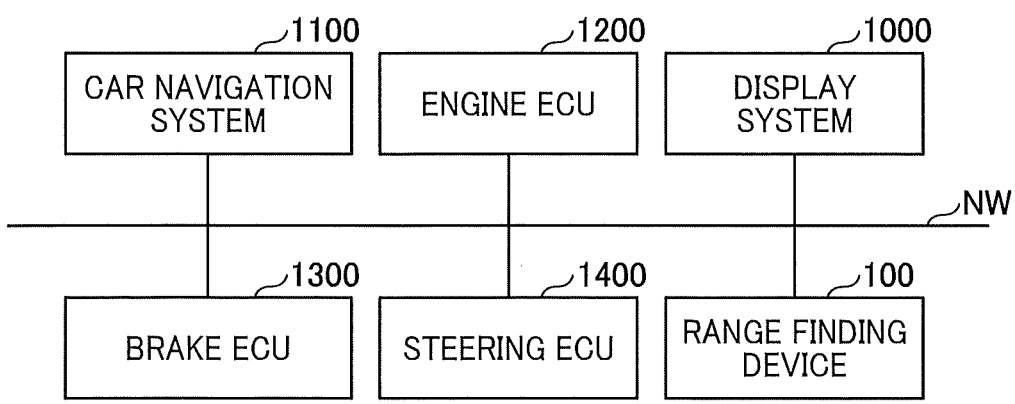
FIG. 40 illustrates an example of a configuration of a vehicle mounted with a range finding device according to an embodiment.

FIG. 40 illustrates an example of a configuration of the vehicle 140 mounted with the range finding device 100. The vehicle 140 includes, for example, a car navigation system 1100, an engine electronic control unit (ECU) 1200, a display system 1000, a brake ECU 1300, a steering ECU 1400, which communicate each other via an in-vehicle network NW, such as controller area network (CAN) bus.

The car navigation system 1100 including, for example, global navigation satellite system (GNSS), such as global positioning system (GPS), detects the current location of the vehicle 140 and displays the position of the vehicle 140 on an electronic digital map. Further, the car navigation system 1100 receives an input of departure site and destination site, searches a route from the departure site to the destination site, displays the route on an electronic digital map, and guides a change of traveling direction to a vehicle occupant using audio voice, characters (displayed on the display), or animation before changing the traveling direction. Further, the car navigation system 1100 can be configured to communicate with one or more servers via a cellular phone network or the like. In this case, the server can transmit the electronic digital map to the vehicle 140 and perform a route search.

The engine ECU 1200 performs various operations, such as determining the ideal fuel injection amount, controlling the advance angle and the retard angle of the ignition timing, and controlling the valve mechanism, based on information receiving from each sensor and condition of the vehicle 140. Further, the engine ECU 1200 determines the necessity of shifting by referring to a map in which a change profile of the shift speed is defined based on a relationship between the vehicle speed and the accelerator opening degree. The engine ECU 1200 uses these functions to perform the acceleration and deceleration control when the vehicle 140 is traveling after a preceding vehicle. Further, an electric motor may be used with the engine, or the electric motor alone may be used as power engine.

The brake ECU 1300 controls the braking force for each wheel of the vehicle 140 even without the brake pedal operation by the vehicle occupant, using anti-lock braking system (ABS) control, the braking control when the vehicle 140 is traveling after a preceding vehicle, the automatic braking based on time-to-collision (TTC) with an obstacle, and the control of the stopping state of the vehicle 140 when starting the engine of the vehicle 140 on a sloped road surface.

The steering ECU 1400 detects the steering direction and the steering amount of the steering wheel by the vehicle occupant, and controls the power steering by adding a steering torque to the steering direction. Further, the steering ECU 1400 performs the steering operation without the steering operation of the steering wheel by the vehicle occupant, such as the steering ECU 1400 controls the steering in a direction to avoid a deviation from a traveling lane, to keep the vehicle at the center of the traveling lane, or to avoid a collision course to an obstacle.

As described above, the range finding device 100 can narrow the target processing range of the reflection signal received by the laser radar ranging unit 120 based on the processing range used for detecting the object that is obtained by the stereo camera, with which the probability of detecting the noise erroneously as the object can be reduced. However, if the reflection signal is too weak with respect to the surrounding noise signals, it is difficult to identify the object even if the target processing range of the reflection signal is narrowed. Therefore, the undershoot is generated intentionally in the reflection signal, and then the reflection signal is binarized using a plurality of threshold values (e.g., second threshold value, third threshold value) set on the opposite sides of the base voltage to easily detect the reflection signal coming from the object.

Further, when the object is irradiated with the laser light for a plurality of times, the reflection signal coming from the object appears in similar positions, and the histogram of binarized signals of the reflection pulse is created to detect a peak of the reflection signal coming from the object based on a shape of the reflection signal appearing at the same position for a plurality of times. This improves the accuracy of detecting the distance to object even if only the very weak reflection signal is received because the object is being at a far distance, and/or the object is a black colored object.

Further, when the undershoot is intentionally generated when a plurality of objects are lined in a row, the undershoot is intentionally generated in the reflection signal coming from a nearby object overlaps with the reflection signal coming from a far-side object, in which the separation of the plurality of objects lined in the row becomes difficult. To cope with this situation, the hardware configuration having the undershoot processing route and the processing route without the undershoot processing can be used to separate the plurality objects lined in the row. That is, the reflection signal including the undershoot can be mainly used for detecting the object at a far side, and the reflection signal not including the undershoot can be used to detect the plurality objects lined in the row.

As to the above described embodiment, the light signal detection device, the range finding device, and the detection method can improve the range fining or detecting accuracy even when a reflection signal from an object is weak.

Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Further, in the above described embodiment, the cost C is calculated for the pixel region, but is not limited thereto. For example, the cost C can be calculated for each pixel. In other words, it is assumed that the above described "pixel region" includes one or more pixels.

Further, in the above described embodiment, the stereo camera unit 110 and the laser radar ranging unit 120 are constructed integrally, but is not limited thereto. For example, the stereo camera unit 110 and the laser radar ranging unit 120 can be constructed as separate units.

Further, in the above described embodiment, the laser signal processing unit 240 mainly extracts the peak from the analog signal, and the stereo image processing unit 250 processes the digital signal, but is not limited thereto. For example, the laser signal processing unit 240 can be configured to convert the reflection signal, received from the light receiving element 235, into the digital signal immediately after receiving the reflection signal, and to extract the peak from the digital signal.

Further, in the above described embodiment, the laser signal processing unit 240 and the stereo image processing unit 250 are constructed by a dedicated integrated circuit, but is not limited thereto. For example, the function of the embodiment may be implemented by executing the program codes of the software implementing the functions of the laser signal processing unit 240 and the stereo image processing unit 250, recorded on a storage medium, by using an information processing apparatus.

Further, in the above described embodiment, the distance information calculated by the laser signal processing unit 240 is input to the stereo image processing unit 250 to re-calculate the disparity, but the distance information can be used for any purpose other than the re-calculation of disparity.

Further, in the above described embodiment, the range finding device 100 is mounted on the vehicle 140. However, the mounting of the range finding device 100 is not limited to the vehicle 140, but can be a motorcycle, a bicycle, a wheelchair, an agriculture machine for farming, or the like. Alternatively, the range finding device 100 can be mounted on any movable apparatus, such as autonomous mobile robot. Further, the range finding device 100 can be mounted on a drone or other flight apparatus. Alternatively, the range finding device 100 can be mounted on industrial robots or the like installed in as factory automation (FA).

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. A light signal detection device comprising:
an irradiation unit configured to emit irradiation light towards an object a plurality of times;
a light receiving optical system configured to receive a reflection signal of the irradiation light that is reflected from the object for the plurality of times that the irradiation light is emitted towards the object; and
circuitry configured to:
binarize the received reflection signal using a first threshold value based on whether the reflection signal is equal to or greater than the first threshold value;
binarize the received reflection signal using a second threshold value based on whether the reflection signal is equal to or greater than the second threshold value, the second threshold value having a value similar to a noise signal value;
generate an undershoot in the reflection signal;
binarize the reflection signal including the undershoot using a third threshold value, based on whether the reflection signal including the undershoot is equal to or less than the third threshold value, the third threshold value being set smaller than a base voltage of the reflection signal;
measure a time difference between a time at which the irradiation unit emits the irradiation light and a time at which a reflection signal that is equal to or greater than either of the first threshold value or the second threshold value is received;
create a first histogram by voting an indicator indicating that the reflection signal is coming from the object based on the signals binarized using the second binarization value; and
create a second histogram by voting an indicator indicating that the reflection signal is coming from the object based on the signals binarized using the third binarization value, wherein
the reflection signals are binarized along the timeline,
in response to binarizing the reflection signal using the second binarization value and the third binarization value along a timeline, the circuitry determines a time at which a reflection signal that is equal to or greater than the second threshold value caused by a reflection from the object based on the binarizing of the reflection signal using the second threshold value and the binarizing of the reflection signal using the third threshold value, and
in a case where the first histogram and the second histogram have a given relationship, the circuitry determines a position indicating a peak of the first histogram as the time of receiving the reflection signal that becomes equal to or greater than the second threshold value caused by the reflection from the object.

2. The light signal detection device according to claim 1, wherein
the second threshold value is a positive value set larger than the base voltage of the reflection signal, and
the third threshold value is a negative value set smaller than the base voltage of the reflection signal.

3. The light signal detection device, according to claim 2, wherein the circuitry is further configured to:
in a case where the reflection signal binarized using the second threshold value satisfies a given relationship with the reflection signal binarized using the third threshold value, determine a time at which the reflection signal binarized using the second threshold value satisfies a given relationship with the reflection signal binarized using the third threshold value is received is set as the time at which the reflection signal that is equal to or greater than the second threshold value is received.

4. The light signal detection device according to claim 1, wherein the circuitry is further configured to:
in a case where a distance between a position of a peak of the first histogram and a position of a peak of the second histogram satisfy a given condition, determine the position of the peak in the first histogram as the specific time of receiving the specific reflection signal that becomes equal to or greater than the second threshold value caused by the reflection from the object.

5. The light signal detection device according to claim 1, wherein the circuitry is further configured to:
in a case where a width of the peak of the first histogram and a width of the peak of the second histogram satisfy a given condition, determine the position of the peak in the first histogram as the specific time of receiving the specific reflection signal that becomes equal to or greater than the second, threshold value caused by the reflection from the object.

6. The light signal detection device according to claim 1, wherein
the given condition is determined by a design value of the circuitry.

7. The light signal detection device according to claim 6, wherein the circuitry is further configured to:
determine the reflection signal equal to or less than the third threshold value set smaller than the base voltage within a given time period starting from a time when the reflection signal is determined to be equal to or greater than the second threshold value set larger than the base voltage, create a third histogram by voting an indicator indicating that the reflection is caused by the object at the time when determining the reflection signal is equal to or greater than the second threshold value, and determine a time when a frequency in the third histogram becomes the maximum.

8. A range finding device comprising:

the light signal detection device according to claim 1, and a stereo image processing unit configured to generate matching evaluation values of a plurality of image data captured by using a stereo camera and to generate a processing range based on the generated matching evaluation values, wherein the light signal detection device obtains, from the stereo image processing unit, the processing range to be used for determining a specific time range, wherein the light signal detection device determines the specific time range corresponding to the processing range, and outputs distance information that is converted from time information of the specific time range, to the stereo image processing unit, wherein the stereo image processing unit integrates the distance information received from the light signal detection device and distance information determined from the matching evaluation values.

9. A movable apparatus comprising the light signal detection device of claim 1.

10. A method comprising:

emitting, using an, irradiation unit, irradiation light towards an object a plurality of times;

receiving, using a light, receiving optical system, a reflection signal of the irradiation light that is reflected from the object for the plurality of times that the irradiation light is emitted towards the object;

binarizing the received reflection signal using a first threshold value based on whether the reflection signal is equal to or greater than the first threshold value;

binarizing the received reflection signal using a second threshold value based on whether the reflection signal is equal to or greater than the second threshold value, the second threshold value having a value similar to a noise signal value;

generating an undershoot in the reflection signal;

binarizing the reflection signal including the undershoot using a third threshold value, based on whether the reflection signal including the undershoot is equal to or less than the third threshold value, the third threshold value being set smaller than a base voltage of the reflection signal;

measuring a time difference between a time at which the irradiation unit emits the irradiation light and a time at which a reflection signal that is equal to or greater than either of the first threshold value or the second threshold value is received;

creating a first histogram by voting an indicator indicating that the reflection signal is coming from the object based on the signals binarized using the second binarization value; and creating a second histogram by voting an indicator indicating that the reflection signal is coming from the object based on the signals binarized using the third binarization value, wherein the reflection signals are binarized along the timeline, in response to binarizing the reflection signal using the second binarization value and the third binarization value along a timeline, determining a time at which a reflection signal that is equal to or greater than the second threshold value caused by a reflection from the object based on the binarizing of the reflection signal using the second threshold value and the binarizing of the reflection signal using the third threshold value, and in a case where the first histogram and the second histogram have a given relationship, determining a position indicating a peak of the first histogram as the time of receiving the reflection signal that becomes equal to or greater than the second threshold value caused by the reflection from the object.

11. A non-transitory computer readable storage medium storing one or more instructions that, when performed by one or more processors, cause the one or more processors to execute a method comprising:

emitting, using an irradiation unit, irradiation light towards an object a plurality of times;

receiving, using a light receiving optical system, a reflection signal of the irradiation light that is reflected from the object for the plurality of times that the irradiation light is emitted towards the object;

binarizing the received reflection signal using a first threshold value based on whether the reflection signal is equal to or greater than the first threshold value;

binarizing the received reflection signal using a second threshold value based on whether the reflection signal is equal to or greater than the second threshold value, the second threshold value having a value similar to a noise signal value;

generating an undershoot in the reflection signal;

binarizing the reflection signal including the undershoot using a third threshold value, based on whether the reflection signal including the undershoot is equal to or less than the third threshold value, the third threshold value being set smaller than a base voltage of the reflection signal;

measuring a time difference between a time at which the irradiation unit emits the irradiation light and a time at which a reflection signal that is equal to or greater than either of the first threshold value or the second threshold value is received;

creating a first histogram by voting an indicator indicating that the reflection signal is coming from the object based on the signals binarized using the second binarization value; and creating a second histogram by voting an indicator indicating that the reflection signal is coming from the object based on the signals binarized using the third binarization value, wherein the reflection signals are binarized along the timeline, in response to binarizing the reflection signal using the second binarization value and the third binarization value along a timeline, determining a time at which a reflection signal that is equal to or greater than the second threshold value caused by a reflection from the object based on the binarizing of the reflection signal using the second threshold value and the binarizing of the reflection signal using the third threshold value, and in a case where the first histogram and the second histogram have a given relationship, determining a position indicating a peak of the first histogram as the time of receiving the reflection signal that becomes equal to or greater than the second threshold value caused by the reflection from the object.

\* \* \* \* \*